United States Patent
Takaoka et al.

(10) Patent No.: US 10,743,315 B2
(45) Date of Patent: Aug. 11, 2020

(54) COMMUNICATION SYSTEM FOR TRANSFORMING SIGNALS BETWEEN TIME DOMAIN AND FREQUENCY DOMAIN USING A DEFINED DISCRETE FOURIER TRANSFORM SIZE

(71) Applicant: Sun Patent Trust, New York, NY (US)

(72) Inventors: Shinsuke Takaoka, Osaka (JP);
Masayuki Hoshino, Kanagawa (JP);
Kenichi Miyoshi, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 16/596,199

(22) Filed: Oct. 8, 2019

(65) Prior Publication Data
US 2020/0045701 A1 Feb. 6, 2020

Related U.S. Application Data

(63) Continuation of application No. 16/209,172, filed on Dec. 4, 2018, now Pat. No. 10,484,994, which is a
(Continued)

(30) Foreign Application Priority Data

Sep. 22, 2008 (JP) ................. 2008-242716
Sep. 1, 2009 (JP) ................. 2009-201740

(51) Int. Cl.
*H04W 72/04* (2009.01)
*G06F 17/14* (2006.01)
(Continued)

(52) U.S. Cl.
CPC ...... *H04W 72/0453* (2013.01); *G06F 17/141* (2013.01); *H04J 1/00* (2013.01);
(Continued)

(58) Field of Classification Search
CPC . H04W 72/0453; H04W 88/08; G06F 17/141; H04J 1/00; H04J 4/005;
(Continued)

(56) References Cited

U.S. PATENT DOCUMENTS 3,925,648 A 12/1975 Speiser et al.
9,042,213 B2 5/2015 Takaoka et al.
(Continued)

FOREIGN PATENT DOCUMENTS

RU 2 256 934 C1 7/2005
WO 2008/081876 A1 12/2007

OTHER PUBLICATIONS

3GPP TSG RAN WG1 #53, "LTE-A-Requirements," R1-081841, Agenda Item: 6.1, Nokia, Nokia Siemens Networks, Kansas City, MO, May 5-9, 2008, pp. 1-8.
(Continued)

*Primary Examiner* — Omar J Ghowrwal
(74) *Attorney, Agent, or Firm* — Seed IP Law Group LLP

(57) ABSTRACT

A communication system includes a communication apparatus and a base station. The communication apparatus includes a Discrete Fourier Transform (DFT) transformer which transforms a time-domain signal into a frequency-domain signal with a DFT size that is a product of powers of a plurality of values; a mapper which maps the frequency-domain signal on a plurality of frequency bands, each frequency band being located at a position separate from position(s) of other(s) of the plurality of frequency bands; and a signal generator which generates a single carrier-frequency division multiple access (SC-FDMA) time-domain signal from the mapped signal. The base station includes a receiver which receives the SC-FDMA time-domain signal; a combiner which generates the frequency-domain signal from the SC-FDMA time-domain signal; and
(Continued)

a transformer which transforms the frequency-domain signal into the time-domain signal with an inverse Discrete Fourier Transform (IDFT) having the DFT size.

9 Claims, 27 Drawing Sheets

Related U.S. Application Data continuation of application No. 16/012,519, filed on Jun. 19, 2018, now Pat. No. 10,178,674, which is a continuation of application No. 15/678,948, filed on Aug. 16, 2017, now Pat. No. 10,028,281, which is a continuation of application No. 15/337,985, filed on Oct. 28, 2016, now Pat. No. 9,775,155, which is a continuation of application No. 14/979,109, filed on Dec. 22, 2015, now Pat. No. 9,516,648, which is a continuation of application No. 14/694,960, filed on Apr. 23, 2015, now Pat. No. 9,258,075, which is a continuation of application No. 14/072,668, filed on Nov. 5, 2013, now Pat. No. 9,042,213, which is a continuation of application No. 13/119,813, filed as application No. PCT/JP2009/004741 on Sep. 18, 2009, now Pat. No. 8,605,571.

(51) Int. Cl.

| | | |
|---|---|---|
| *H04J 1/00* | (2006.01) | |
| *H04J 4/00* | (2006.01) | |
| *H04L 27/26* | (2006.01) | |
| *H04J 11/00* | (2006.01) | |
| *H04L 5/00* | (2006.01) | |
| *H04W 88/08* | (2009.01) | |

(52) U.S. Cl.
CPC ............ *H04J 4/005* (2013.01); *H04J 11/00* (2013.01); *H04L 5/0041* (2013.01); *H04L 27/2602* (2013.01); *H04L 27/2628* (2013.01); *H04L 27/2636* (2013.01); *H04W 88/08* (2013.01); *Y10S 370/916* (2013.01)

(58) Field of Classification Search
CPC .. H04J 11/00; H04L 27/2602; H04L 27/2636; H04L 5/0041; H04L 27/2628; H04L 27/26; Y10S 370/916
See application file for complete search history.

(56) References Cited

U.S. PATENT DOCUMENTS

| 9,258,075 | B2 | 2/2016 | Takaoka et al. |
|---|---|---|---|
| 9,504,040 | B2 | 11/2016 | Nishio et al. |
| 9,516,648 | B2 | 12/2016 | Takaoka et al. |
| 10,028,281 | B2 | 7/2018 | Takaoka et al. |
| 10,178,674 | B2 | 1/2019 | Takaoka et al. |
| 2004/0120409 | A1 | 6/2004 | Yasotharan et al. |
| 2006/0095491 | A1 | 5/2006 | Abe |
| 2008/0043671 | A1 | 2/2008 | Moon et al. |
| 2010/0098177 | A1 | 4/2010 | Hamaguchi et al. |

OTHER PUBLICATIONS

3GPP TSG RAN WG1 #53, "LTE-A-Requirements," R1-081842, Agenda Item: 6.2, Nokia, Nokia Siemens Networks, Kansas City, MO, May 5-9, 2008, pp. 1-10.
3GPP TSG RAN WG1 #53bis, "Consideration on Multicarrier Transmission scheme for LTE-Adv uplink," R1-082398, Agenda Item: 12, Panasonic, Warsaw, Poland, Jun. 30-Jul. 4, 2008, pp. 1-3.
3GPP TSG RAN WG1 #54, "Uplink multiple access schemes for LTE-A," R1-082945, Agenda Item: 12, LG Electronics, Jeju, Korea, Aug. 18-22, 2008, pp. 1-12.
3GPP TSG RAN WG1 #55, "Performance Evaluation of Multi-Antenna SC-FDMA in LTE-A," R1-084471, Agenda Item: 11.2, Nortek Prague, Czech Republic, Nov. 10-14, 2008, pp. 1-3.
3GPP TSG RAN WG1 #57bis, "Codeword Shifting for Clustered DFT-S-OFDM and N x OFT-S-OFDM for LTE-Advanced Uplink SU-MIMO," R1-092313, Agenda Item: 15.5, Alcatel-Lucent Shanghai Bell, Alcatel-Lucent, Los Angeles, CA, Jun. 29-Jul. 3, 2009, pp. 1-5.
Extended European Search Report, dated Aug. 20, 2013, for European Application No. 13175490.5, 8 pages.
Extended European Search Report, dated Aug. 21, 2013, for European Application No. 13175493.9, 8 pages.
International Search Report, dated Oct. 15, 2009, for International Application No. PCT/JP2009/004741, 2 pages.
Jeong et al., "Pilot Structures for the Uplink Single Carrier FDMA Transmission Systems," VTC Spring 2008—IEEE Vehicular Technology Conference, May 11-14, 2008, Singapore, Singapore, pp. 2552-2556.
Mashima et al., "A Study on Broadband Single Carrier Transmission Technique using Dynamic Spectrum Control," IEICE Technical Report, SIP2006-175, RCS2006-233, Jan. 2007, pp. 97-102.
Namba et al., "A Study on Dynamic Spectrum Control Considering PAPR," Proceedings of the 2008 IEICE General Conference, Mar. 18-21, 2008, p. 436.
Russian Office Action, dated Jul. 15, 2013, for Russian Application No. 2011110719/07 (015717), 5 pages.
Summons to attend oral proceedings, dated Aug. 19, 2019, for European Application No. 13175490.5-1231, 6 pages.
TSG RAN WG1 #47bis, "DFT size for uplink transmissions," R1-070461, Agenda Item: 6.2, Ericsson, Sorrento, Italy, Jan. 15-19, 2007, 3 pages.
TSG RAN WG1 #55, "Summary of email discussion on Uplink transmission scheme," R1-084375, Agenda Item: 11.2, Ericsson, Prague, Czech Republic, Nov. 10-14, 2008, pp. 1-6.

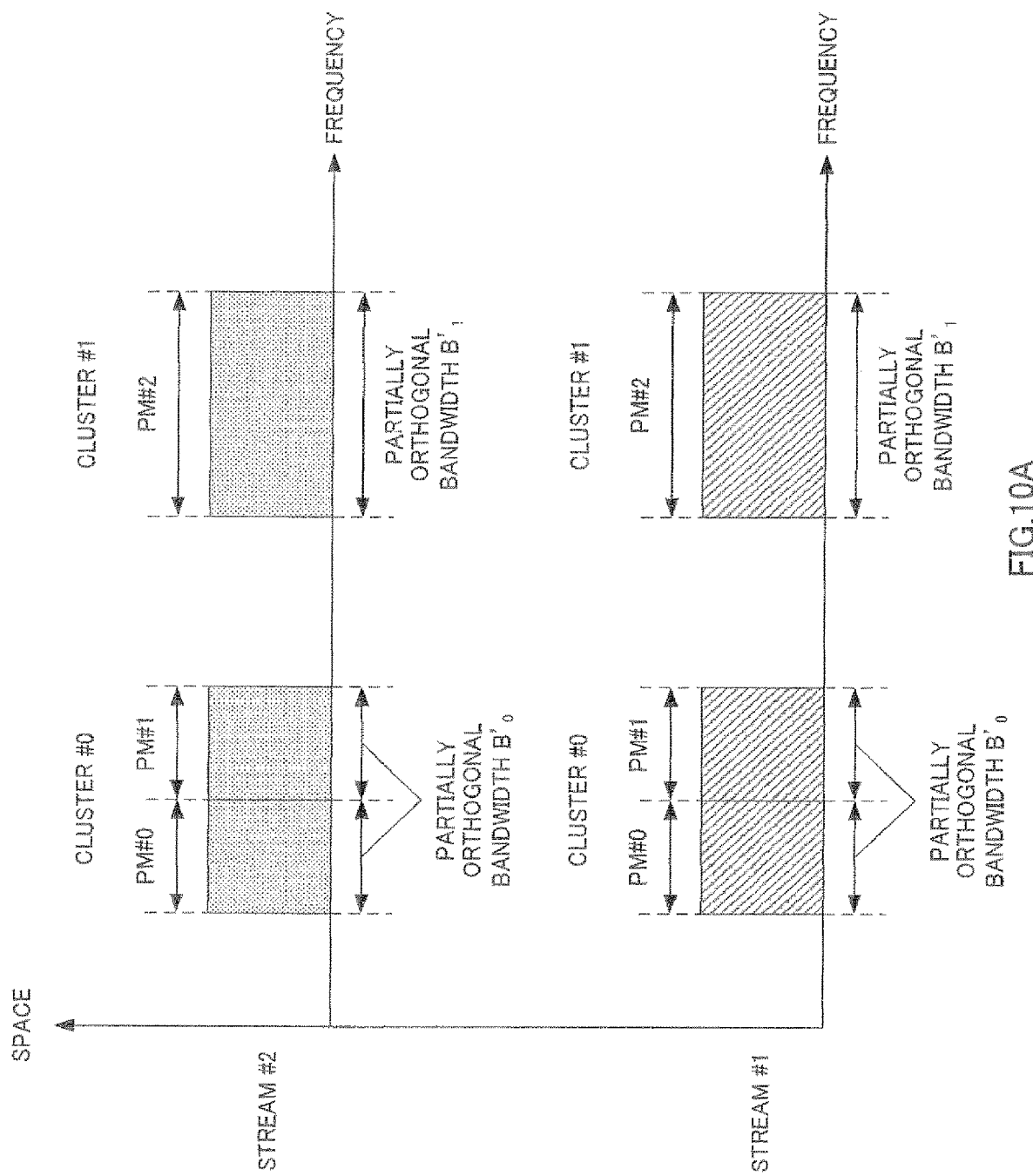

| NUMBER | COMBINATION OF $d_0$, $d_1$ AND $d_2$ ($d_0$, $d_1$, $d_2$) | MULTIPLIER $p_0$ (=$2^{d_0} * 3^{d_1} * 5^{d_2}$) | CLUSTER SIZE $N' = p_0 X$ (SUBCARRIER) |
|---|---|---|---|
| #0 | (0, 0, 0) | 1 | 12 |
| #1 | (1, 0, 0) | 2 | 24 |
| #2 | (2, 0, 0) | 4 | 48 |
| #3 | (1, 1, 0) | 6 | 72 |
| #4 | (3, 0, 0) | 8 | 96 |
| #5 | (2, 1, 0) | 12 | 144 |
| #6 | (4, 0, 0) | 16 | 192 |
| #7 | (3, 1, 0) | 24 | 288 |
| #8 | (1, 1, 1) | 30 | 360 |
| #9 | (5, 0, 0) | 32 | 384 |
| ... | ... | ... | ... |

FIG. 14

COMMUNICATION SYSTEM FOR TRANSFORMING SIGNALS BETWEEN TIME DOMAIN AND FREQUENCY DOMAIN USING A DEFINED DISCRETE FOURIER TRANSFORM SIZE

BACKGROUND

Technical Field

The present invention relates to a radio communication apparatus and a signal division method.

Description of the Related Art

In 3GPP LTE (3rd Generation Partnership Project Long Term Evolution), active studies are underway on standardization of a mobile communication standard to realize low-delay and high-speed transmission.

To realize low-delay and high-speed transmission, OFDM (Orthogonal Frequency Division Multiplexing) is adopted as a downlink (DL) multiple access scheme and SC-FDMA (Single-Carrier Frequency Division Multiple Access) using DFT (Discrete Fourier Transform) precoding is adopted as an uplink (UL) multiple access scheme.

SC-FDMA using DFT precoding uses a DFT matrix (precoding matrix or DFT sequence) represented by, for example, an N×N matrix. Here, N is the size of DFT (the number of DFT points). Furthermore, in an N×N DFT matrix, N (N×1) column vectors are orthogonal to each other in DFT size N. SC-FDMA using DFT precoding forms an SC-FDMA signal (spectrum) by spreading and code-multiplexing a symbol sequence using this DFT matrix.

Furthermore, standardization of LTE-Advanced (or IMT (International Mobile Telecommunication)-Advanced) to realize higher-speed communication than LTE has started. In LTE-Advanced, a radio communication base station apparatus (hereinafter referred to as "base station") and a radio communication terminal apparatus (hereinafter referred to as "terminal") which are communicable using a wideband of, for example, 40 MHz or higher are expected to be introduced to realize higher-speed communication.

As for an LTE uplink, uplink frequency resource allocation is limited to such allocation that SC-FDMA signals are mapped to continuous frequency bands in a localized manner to maintain single-carrier characteristics (e.g. low PAPR (Peak-to-Average Power Ratio) characteristics) of a transmission signal for realizing high coverage.

However, when frequency resource allocation is limited as described above, vacancy is produced in uplink shared frequency resources (e.g. PUSCH (Physical Uplink Shared CHannel)) and the efficiency of the use of frequency resources becomes worse. Thus, as a prior art for improving the efficiency of the use of frequency resources, clustered SC-FDMA (C-SC-FDMA) is proposed which divides an SC-FDMA signal into a plurality of clusters and maps the plurality of clusters to discontinuous frequency resources (e.g. see non-patent literature 1).

In C-SC-FDMA of the above prior art, a terminal generates C-SC-FDMA signals by dividing an SC-FDMA signal (spectrum) generated through DFT processing into a plurality of clusters. The terminal then maps the plurality of clusters to discontinuous frequency resources (subcarriers or resource blocks (RB)). On the other hand, a base station applies frequency domain equalization (FDE) processing to the received C-SC-FDMA signals (plurality of clusters) and combines the plurality of clusters after the equalization. The base station then applies IDFT (Inverse Discrete Fourier Transform) processing to the combined signal and thereby obtains a time domain signal.

C-SC-FDMA can allocate frequency resources among a plurality of terminals more flexibly than SC-FDMA by mapping the plurality of clusters to a plurality of discontinuous frequency resources, and can thereby improve the efficiency of the use of frequency resources and multiuser diversity effect. Furthermore, C-SC-FDMA has a smaller PAPR than that of OFDMA (Orthogonal Frequency Division Multiple Access), and can thereby expand uplink coverage more than OFDMA.

Furthermore, a C-SC-FDMA configuration can be easily realized by only adding a component that divides an SC-FDMA signal (spectrum) into a plurality of clusters to the terminal and adding a component that combines a plurality of clusters to the base station in the conventional SC-FDMA configuration.

CITATION LIST

Non-Patent Literature

NPL 1
R1-081842, "LTE-A Requirements, Agenda Item 6.2: LTE-A Proposals for evolution," 3GPP RAN WG1 #53, Kansas City, Mo., USA, May 5-9, 2008.

BRIEF SUMMARY

Technical Problem

According to the above prior art, the base station divides an SC-FDMA signal (spectrum) of each terminal with an arbitrary frequency according to a state of availability of uplink frequency resources and a condition of the propagation path between a plurality of terminals and the base station, allocates a plurality of clusters thereby generated to a plurality of uplink frequency resources respectively and reports information showing the allocation result to the terminals. The terminal divides the SC-FDMA signal (spectrum) which is the output of DFT processing with an arbitrary bandwidth, maps the plurality of clusters to a plurality of uplink frequency resources allocated by the base station respectively and thereby generates C-SC-FDMA signals.

However, since a wide uplink radio frequency band (wideband radio channel) is frequency selective, the frequency correlation between channels through which a plurality of clusters mapped to different discontinuous frequency bands propagate decreases. Thus, even when the base station equalizes C-SC-FDMA signals (a plurality of clusters) through FDE processing, the equalization channel gain (that is, frequency channel gain after FDE weight multiplication) may considerably differ among the plurality of clusters. Therefore, the equalization channel gain may drastically change at a combining point (that is, the point of division at which the terminal divides the SC-FDMA signal) of the plurality of clusters. That is, a discontinuous point may occur in a variation (that is, envelope of reception spectrum) in the equalization channel gain at the combining point of the plurality of clusters.

Here, to keep minimal the loss of orthogonality of a DFT matrix in all frequency bands (that is, the sum of frequency bands to which a plurality of clusters are mapped) to which C-SC-FDMA signals are mapped, the equalization channel gain in all frequency bands to which the plurality of clusters are mapped needs to be a slow variation. Thus, when a discontinuous point occurs in a variation of the equalization channel gain at a combining point of the plurality of clusters as in the above described prior art, the orthogonality of the DFT matrix is considerably destroyed in the frequency band to which the C-SC-FDMA signals are mapped. Therefore, the C-SC-FDMA signals are more impacted by inter-symbol interference (ISI) caused by the loss of orthogonality of the DFT matrix. Especially when high-level M-ary modulation such as 64 QAM whose Euclidian distance between signal points is very short is used, the C-SC-FDMA signals are more impacted by ISI, and therefore deterioration of transmission characteristics is greater. Furthermore, as the number of clusters (the number of fractions of SC-FDMA signal) increases, the number of discontinuous points between clusters increases, and therefore ISI caused by the loss of orthogonality of the DFT matrix further increases.

The present invention has been implemented in view of such problems and it is therefore an object of the present invention to provide a radio communication apparatus and a signal division method capable of reducing ISI caused by the loss of orthogonality of a DFT matrix even when an SC-FDMA signal is divided into a plurality of clusters and the plurality of clusters are mapped to discontinuous frequency bands respectively, that is, when C-SC-FDMA is used.

Solution to Problem

A radio communication apparatus of the present invention adopts a configuration including a conversion section that generates a frequency domain signal by applying DFT processing to a symbol sequence using a DFT matrix, a division section that divides the signal with a partially orthogonal bandwidth corresponding to a partially orthogonal vector length of some of a plurality of column vectors constituting the DFT matrix and generates a plurality of clusters and a mapping section that maps the plurality of clusters to a plurality of discontinuous frequency bands respectively.

A signal division method of the present invention divides a frequency domain signal with a partially orthogonal bandwidth corresponding to a partially orthogonal vector length of some of a plurality of column vectors constituting a DFT matrix used to convert a time domain symbol sequence to the frequency domain signal and generates a plurality of clusters.

Advantageous Effects of Invention

When dividing an SC-FDMA signal into a plurality of clusters and mapping the plurality of clusters to discontinuous frequency bands (when using C-SC-FDMA), the present invention can reduce ISI caused by the loss of orthogonality of a DFT matrix.

BRIEF DESCRIPTION OF THE SEVERAL VIEWS OF THE DRAWINGS

FIG. 10A is a diagram showing precoding processing according to Embodiment 2 of the present invention;

FIG. 14 is a diagram showing a relationship between a multiplier and a cluster size according to Embodiment 4 of the present invention;

DETAILED DESCRIPTION

Hereinafter, embodiments of the present invention will be described in detail with reference to the accompanying drawings. A case will be described below where a terminal provided with a radio communication apparatus according to the present invention transmits a C-SC-FDMA signal to a base station.

Embodiment 1

Figure 1:
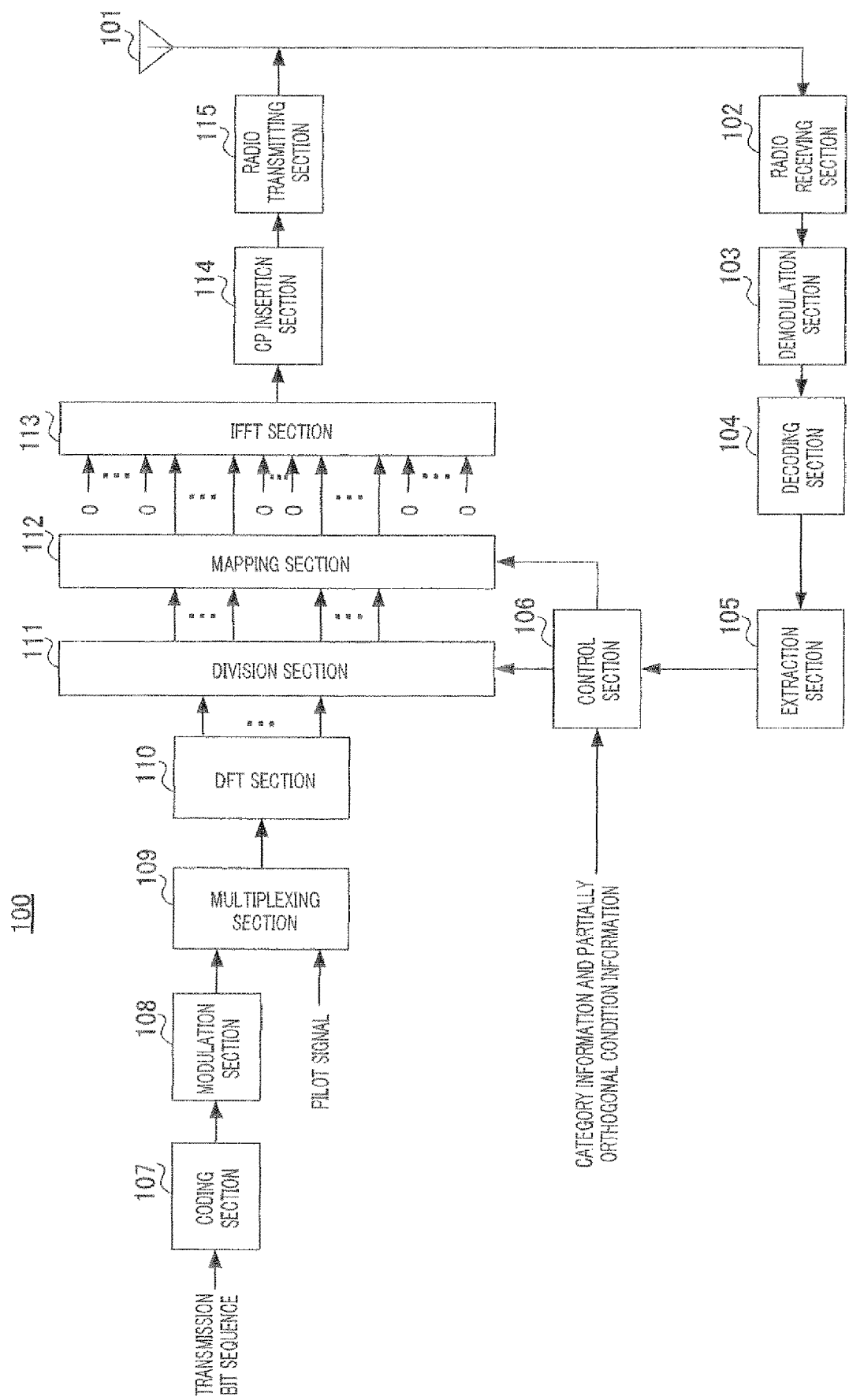
FIG. 1 is a block diagram of a terminal according to Embodiment 1 of the present invention.

FIG. 1 shows a configuration of terminal 100 according to the present embodiment.

In terminal 100, radio receiving section 102 receives a control signal transmitted from a base station (not shown) via antenna 101, applies reception processing such as down-conversion and A/D conversion to the control signal and outputs the control signal subjected to the reception processing to demodulation section 103. This control signal includes frequency resource information showing uplink frequency resources allocated to each terminal and MCS information showing MCS (Modulation and channel Coding Scheme) set in each terminal.

Demodulation section 103 demodulates the control signal and outputs the demodulated control signal to decoding section 104.

Decoding section 104 decodes the control signal and outputs the decoded control signal to extraction section 105.

Extraction section 105 extracts frequency resource information directed to terminal 100 included in the control signal inputted from decoding section 104 and outputs the extracted frequency resource information to control section 106.

Control section 106 receives category information of the terminal including a DFT size (the number of DFT points) of a DFT matrix to be used in DFT section 110 and partially orthogonal condition information showing a partially orthogonal condition of a C-SC-FDMA signal as input and also receives frequency resource information reported from the base station from extraction section 105 as input.

Control section 106 calculates the number of clusters generated by division section 111 by dividing an SC-FDMA signal (that is, the output of DFT section 110) and the cluster size showing a bandwidth of each cluster based on DFT size information (category information) showing the DFT size of the terminal, partially orthogonal condition information and frequency resource information reported from the base station. Suppose it is determined in advance between the base station and the terminal that when an SC-FDMA signal (spectrum) is divided into a plurality of clusters, the SC-FDMA signal (spectrum) is divided in order from a lower frequency portion of the spectrum (smaller output number of DFT section 110) or from a higher frequency portion of the spectrum (larger output number of DFT section 110). Control section 106 calculates frequency resources to which C-SC-FDMA signals (a plurality of clusters) of terminal 100 are mapped based on the calculated number of clusters and the cluster size. For example, control section 106 calculates frequency resources to which clusters are mapped in order from a cluster of a lower frequency (cluster with a smaller output number of DFT section 110) or a cluster of a higher frequency (cluster with a larger output number of DFT section 110) of the plurality of clusters generated through division. Control section 106 then inputs cluster information including the calculated number of clusters and cluster size to division section 111 and outputs mapping information showing frequency resources to which C-SC-FDMA signals (a plurality of clusters) of terminal 100 are mapped to mapping section 112.

Coding section 107 encodes a transmission bit sequence and outputs the coded transmission bit sequence to modulation section 108.

Modulation section 108 modulates the transmission bit sequence inputted from coding section 107 to generate a symbol sequence and outputs the symbol sequence generated to multiplexing section 109.

Multiplexing section 109 multiplexes pilot signals and the symbol sequence inputted from modulation section 108. Multiplexing section 109 outputs the symbol sequence multiplexed with the pilot signals to DFT section 110. For example, a CAZAC (Constant Amplitude Zero Auto Correlation) sequence may be used as the pilot signals. Furthermore, although FIG. 1 adopts a configuration in which the pilot signals and the symbol sequence are multiplexed before applying DFT processing, a configuration in which the pilot signals and the symbol sequence are multiplexed after applying the DFT processing may also be adopted.

DFT section 110 generates frequency domain signals (SC-FDMA signals) by applying DFT processing to the time domain symbol sequence inputted from multiplexing section 109 using a DFT matrix. DFT section 110 outputs the generated SC-FDMA signals (spectrum) to division section 111.

Division section 111 divides the SC-FDMA signal (spectrum) inputted from the DFT section 110 into a plurality of clusters according to the number of clusters and the cluster size indicated in the cluster information inputted from control section 106. To be more specific, division section 111 generates a plurality of clusters by dividing the SC-FDMA signal (spectrum) with a bandwidth (partially orthogonal bandwidth) corresponding to a length (vector length) of some of the plurality of column vectors constituting the DFT matrix used in DFT section 110 and partially orthogonal to each other. Division section 111 then outputs C-SC-FDMA signals made up of the plurality of clusters generated to mapping section 112. Details of the method of dividing the SC-FDMA signal (spectrum) in division section 111 will be described later.

Mapping section 112 maps the C-SC-FDMA signals (a plurality of clusters) inputted from division section 111 to frequency resources (subcarriers or RBs) based on mapping information inputted from control section 106. For example, mapping section 112 maps the plurality of clusters making up the C-SC-FDMA signals to a plurality of discontinuous frequency bands respectively. Mapping section 112 then outputs the C-SC-FDMA signals mapped to the frequency resources to IFFT section 113.

IFFT section 113 generates a time-domain C-SC-FDMA signal by performing IFFT on the plurality of frequency bands inputted from mapping section 112 to which the C-SC-FDMA signals are mapped. Here, IFFT section 113 inserts 0's in frequency bands other than the plurality of frequency bands to which the C-SC-FDMA signals (plurality of clusters) are mapped. IFFT section 113 then outputs the time-domain C-SC-FDMA signal to CP (Cyclic Prefix) insertion section 114.

CP insertion section 114 adds the same signal as that at the end of the C-SC-FDMA signal inputted from IFFT section 113 to the head of the C-SC-FDMA signal as a CP.

Radio transmitting section 115 applies transmission processing such as D/A conversion, amplification and up-conversion to the C-SC-FDMA signal and transmits the signal subjected to the transmission processing to the base station via antenna 101.

On the other hand, the base station performs FDE processing of multiplying the C-SC-FDMA signals (a plurality of clusters) transmitted from each terminal by an FDE weight and combines the C-SC-FDMA signals (the plurality of clusters) after the FDE processing in the frequency domain. The base station obtains a time domain signal by applying IDFT processing to the combined C-SC-FDMA signal.

Furthermore, the base station generates channel quality information (e.g. CQI: Channel Quality Indicator) of each terminal by measuring an SINR (Signal-to-Interference plus Noise power Ratio) for each frequency band (e.g. subcarrier) between each terminal and the base station using pilot signals transmitted from each terminal. The base station then schedules allocation of uplink frequency resources (e.g. PUSCH) of each terminal using CQI and QoS (Quality of Service) or the like of a plurality of terminals. The base station then reports frequency resource information showing the uplink frequency resource allocation result (that is, the scheduling result) of each terminal to each terminal. For example, PF (Proportional Fairness) may be used as an algorithm used when the base station allocates frequency resources to each terminal.

Furthermore, the base station controls the number of clusters and the cluster size using the DFT size and partially orthogonal condition as in the case of control section 106 of terminal 100 and combines the C-SC-FDMA signals (the plurality of clusters) based on the number of clusters and the cluster size.

Next, details of the SC-FDMA signal (spectrum) division method by division section 111 will be described.

Here, the SC-FDMA signal which is the output of DFT section 110 is configured by applying orthogonal frequency spreading to each symbol of a symbol sequence in a frequency band corresponding to the DFT size (column vector length) of the DFT matrix and code-multiplexing each symbol after the orthogonal frequency spreading. Here, assuming the DFT size is N, the DFT matrix used in DFT section 110 can be expressed by N×N matrix $F=[f_0, f_1, \ldots, f_{N-1}]$. Furthermore, $f_i$ (i=0 to N−1) is an N×1 column vector having $(1/\sqrt{N})\exp(-j2\pi(i*k)/N)$ (k=0 to N−1) as a k-th element.

Furthermore, all column vectors $f_i$ (i=0 to N−1) are orthogonal to each other in DFT size N. That is, DFT section 110 multiplies N symbols (e.g. symbols #0 to #N−1) constituting the symbol sequence by respective column vectors $f_i$ (i=0 to N−1) of the DFT matrix, and thereby makes all symbols (symbols #0 to #N−1) orthogonal to each other in an orthogonal bandwidth (that is, bandwidth to which N symbols are mapped) corresponding to column vector length N.

Figure 2:
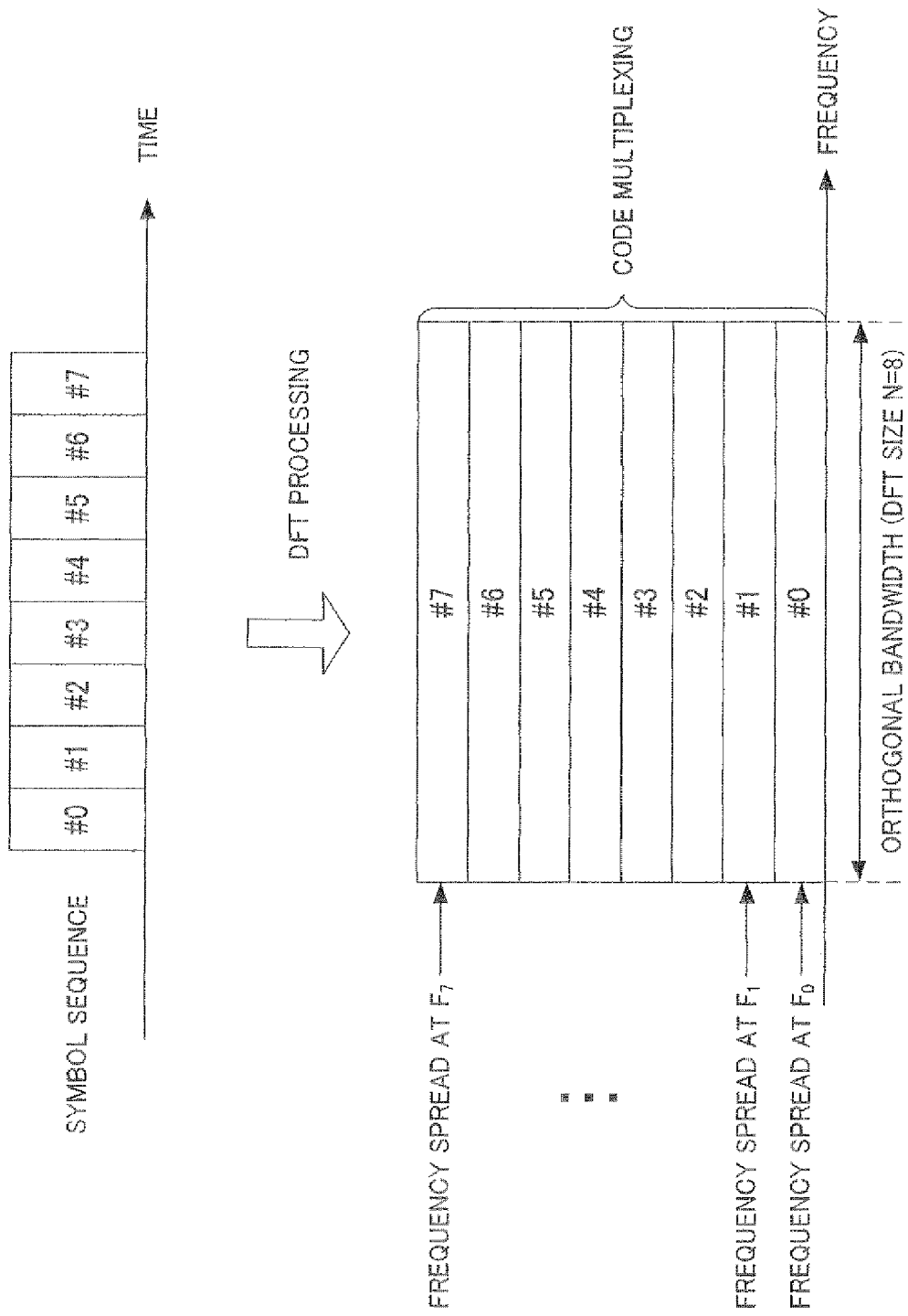
FIG. 2 is a diagram showing DFT processing according to Embodiment 1 of the present invention.
Figure 3:
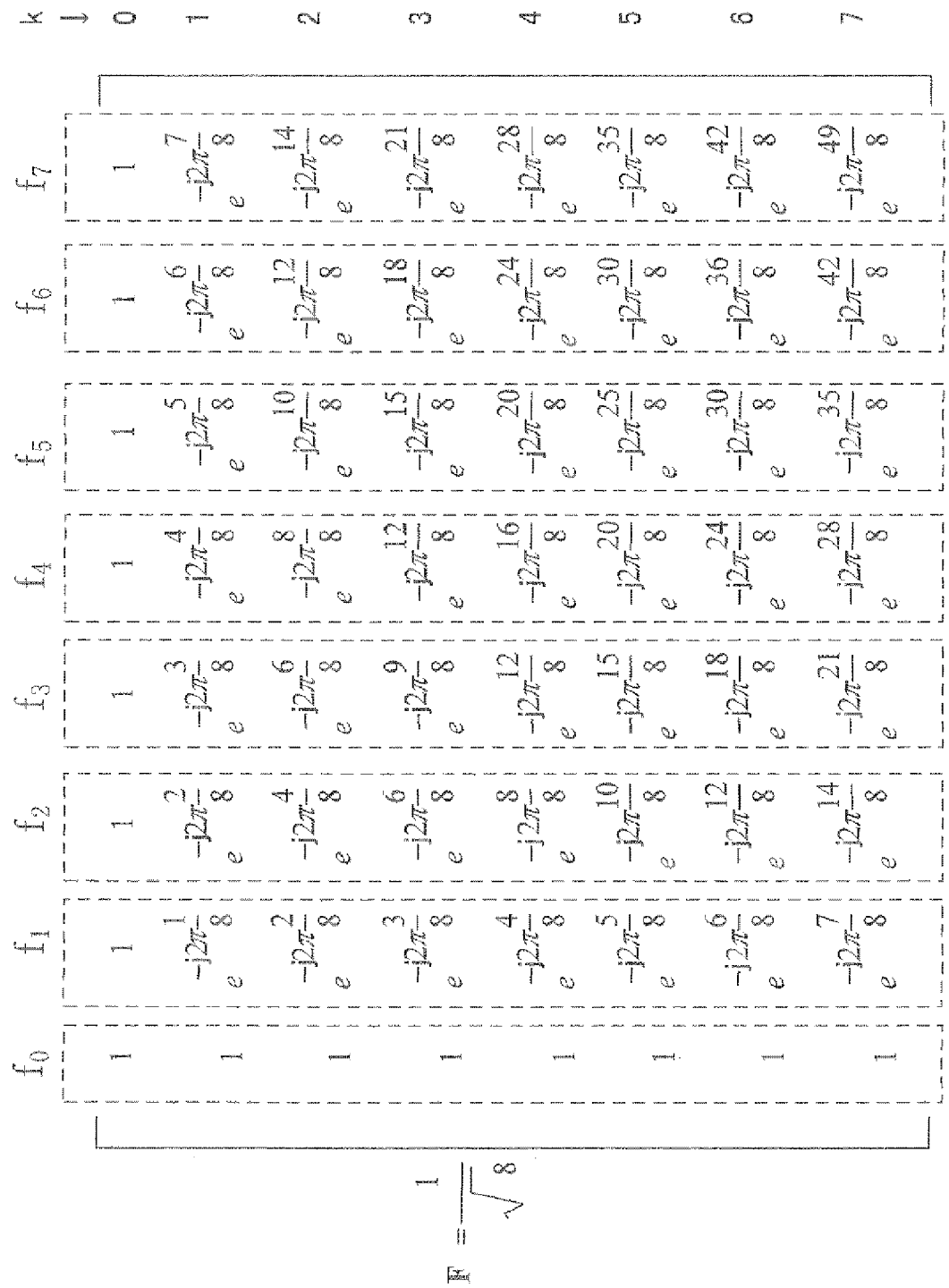
FIG. 3 is a diagram showing an example of DFT matrix according to Embodiment 1 of the present invention.

For example, in the case of DFT size N=8, a symbol sequence made up of eight symbols #0 to #7 as shown in the upper part of FIG. 2 is inputted to DFT section 110. As shown in the lower part of FIG. 2, DFT section 110 frequency-spreads symbols #0 to #7 with column vectors $f_0$ to $f_7$ of the DFT matrix respectively. DFT section 110 then code-multiplexes frequency-spread symbols #0 to #7. This allows an SC-FDMA signal having an orthogonal bandwidth corresponding to DFT size N to be obtained. Furthermore, FIG. 3 shows an example of DFT matrix when DFT size N=8. That is, column vector $f_i$ (i=0 to 7) is an 8×1 column vector which has $(1/\sqrt{8})\exp(-j2\pi(i*k)/8)$ as a k-th (where k=0 to 7) element. Furthermore, column vectors $f_0$ to $f_7$ are orthogonal to each other in DFT size N=8.

Here, column vector $f_i$ of DFT matrix F is not only orthogonal to all other column vectors in DFT size N but also partially orthogonal to some other column vectors in vector length N' (where N'<N) which is less than DFT size (column vector length) N. To be more specific, there is a relationship shown in following equation 1 (partially orthogonal condition) between vector length N' where arbitrary two different column vectors $f_i$ and $f_{i'}$ (where i'≠i) of the plurality of column vectors constituting the DFT matrix are partially orthogonal to each other and DFT size (column vector length) N of DFT matrix F. Here, I is a non-zero integer that satisfies |I|<|i−i'|.

[1]

$$N' = \frac{|I|}{|i-i'|}N \qquad \text{(Equation 1)}$$

A partially orthogonal condition of column vector $f_1$ (that is, i=1) and column vector $f_5$ (that is, i'=5) shown in FIG. 3 will be described as an example. Since |I|<|i−i'|=|−4|=4, |I| takes a value of one of 1, 2 and 3.

Figure 4A:
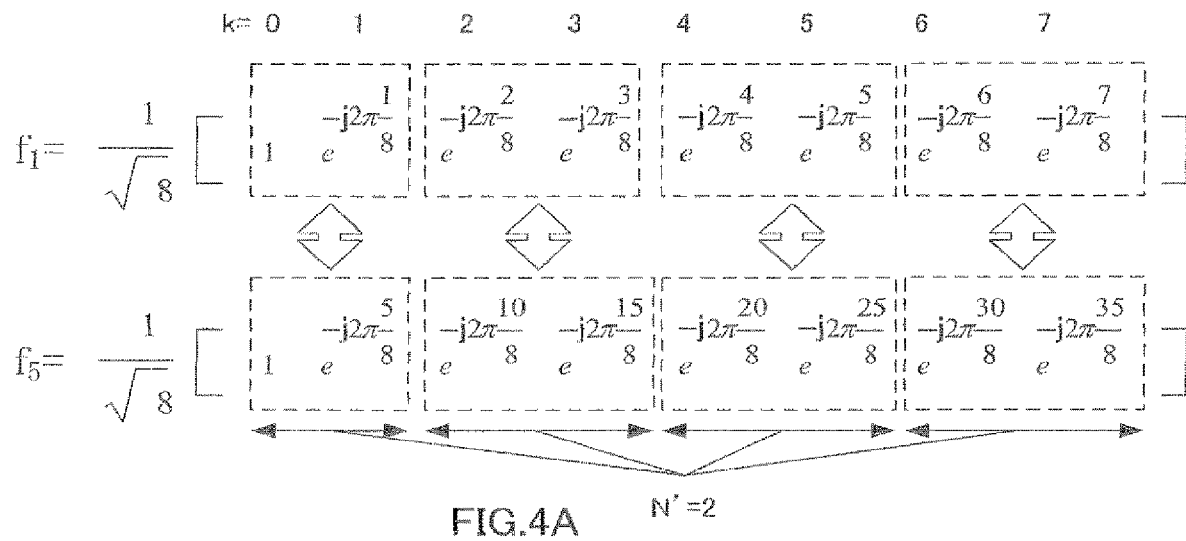
FIG. 4A is a diagram showing a partially orthogonal relationship according to Embodiment 1 of the present invention (when |I|=1)

When |I|=1, vector length N'=2 from equation 1. Thus, as shown in FIG. 4A, column vector $f_1$ and column vector $f_5$ are partially orthogonal in vector length N'=2, that is, between two elements. For example, as shown in FIG. 4A, column vector $f_1$ and column vector $f_5$ are partially orthogonal between two elements; the 0-th (k=0) element and first (k=1) element and partially orthogonal between two elements; second (k=2) element and third (k=3) element. The same applies to the fourth (k=4) to seventh (k=7) elements.

Figure 4B:
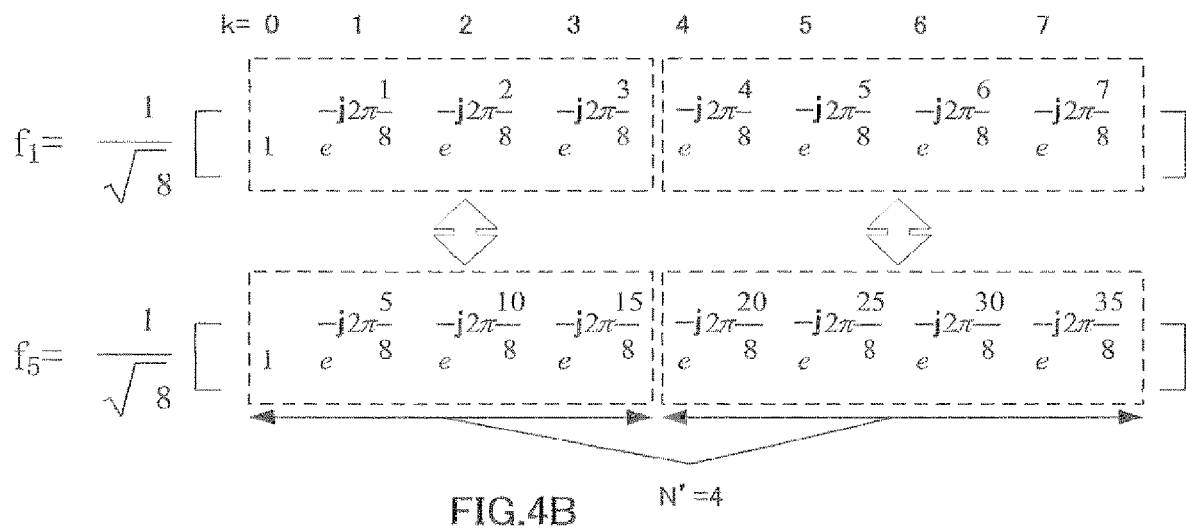
FIG. 4B is a diagram showing a partially orthogonal relationship according to Embodiment 1 of the present invention (when |I|=2)

Likewise, when |I|=2, vector length N'=4 from equation 1. Thus, as shown in FIG. 4B, column vector $f_1$ and column vector $f_5$ are partially orthogonal in vector length N'=4, that is, between four elements. For example, as shown in FIG. 4B, column vector $f_1$ and column vector $f_5$ are partially orthogonal between four elements of the 0-th (k=0) element to third (k=3) element and partially orthogonal between four elements of the fourth (k=4) element to seventh (k=7) element.

Figure 4C:
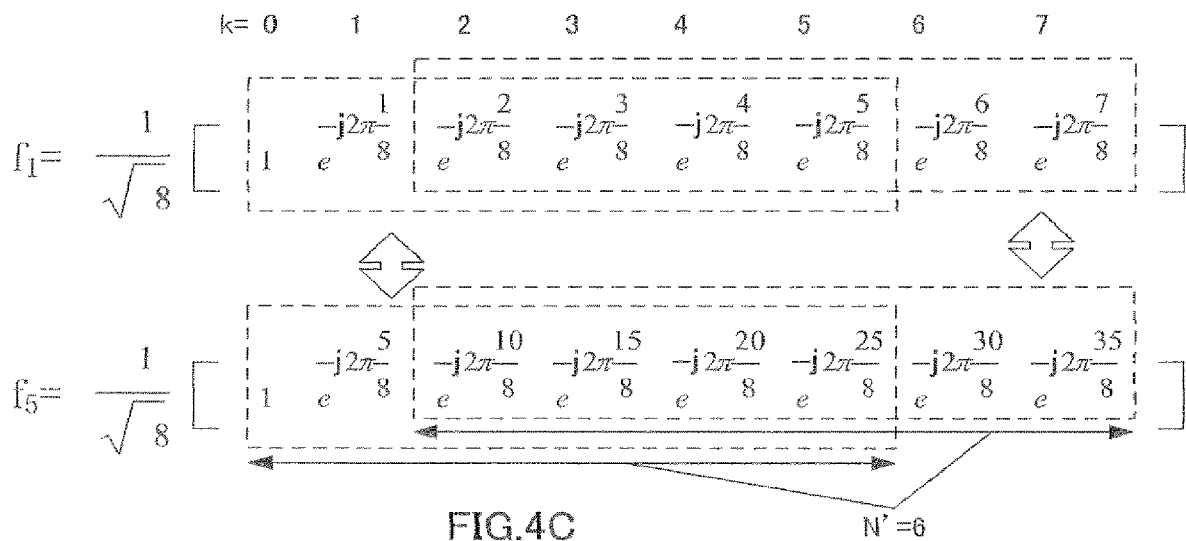
FIG. 4C is a diagram showing a partially orthogonal relationship according to Embodiment 1 of the present invention (when |I|=3)

Furthermore, when |I|=3, vector length N'=6 from equation 1. Thus, as shown in FIG. 4C, column vector $f_1$ and column vector $f_5$ are partially orthogonal in vector length N'=6, that is, between six elements. For example, as shown in FIG. 4C, column vector $f_1$ and column vector $f_5$ are partially orthogonal between six elements of the 0-th (k=0)

element to fifth (k=5) element and partially orthogonal between six elements of the second (k=2) element to seventh (k=7) element.

Here, bandwidth (that is, orthogonal bandwidth of the DFT matrix) B corresponding to DFT size N of the DFT matrix is represented by $N*B_{sub}$. Here, $B_{sub}$ shows an orthogonal frequency spacing (subcarrier spacing). Similarly, partially orthogonal bandwidth B' corresponding to vector length N' (where N'<N) where column vector $f_i$ and column vector are partially orthogonal to each other is represented by $N'*B_{sub}$. Thus, the relationship (partially orthogonal condition) between the orthogonal bandwidth of the DFT matrix, that is, total bandwidth (orthogonal bandwidth) B used for transmission of an SC-FDMA signal and partially orthogonal bandwidth B' can be expressed by following equation 2.

$$B' = N'B_{sub} = \frac{|I|}{|i-i'|} NB_{sub} = \frac{|I|}{|i-i'|} B \quad \text{(Equation 2)}$$

Thus, not only column vectors $f_i$ (i=0 to N−1) are orthogonal to each other in DFT size N of the DFT matrix but also there are column vectors having an orthogonal relationship in vector length N' which is less than DFT size N.

As described above, when the SC-FDMA signal is divided into a plurality of clusters, the respective clusters are mapped to discontinuous frequency bands, and therefore a drastic variation (discontinuous point) of an equalization channel gain is likely to occur at a combining point of clusters. On the other hand, a variation in the equalization channel gain becomes slower in each cluster by performing FDE processing. That is, even when a drastic variation of the equalization channel gain (discontinuous point) occurs (when orthogonality of the DFT matrix in an orthogonal bandwidth of the DFT matrix is lost), it is possible to reduce ISI by maintaining orthogonality within clusters.

Thus, in the present embodiment, division section 111 divides the SC-FDMA signal (spectrum) with partially orthogonal bandwidth B' ($=N*B_{sub}$) corresponding to vector length N' having a partially orthogonal relationship with column vector length N of the DFT matrix.

Hereinafter, SC-FDMA signal division methods 1-1 to 1-4 will be described.

<Division Method 1-1>

According to the present division method, division section 111 divides an SC-FDMA signal with partially orthogonal bandwidth B' ($=N'*B_{sub}$) corresponding to vector length N' calculated according to equation 1.

In the following descriptions, suppose the number of clusters is 2, one cluster size is partially orthogonal bandwidth B' that satisfies equation 2 (or equation 1), and the other cluster size is differential bandwidth B"(=B−B') between orthogonal bandwidth B and partially orthogonal bandwidth B'. Furthermore, suppose DFT size N is 8.

Figure 5A:
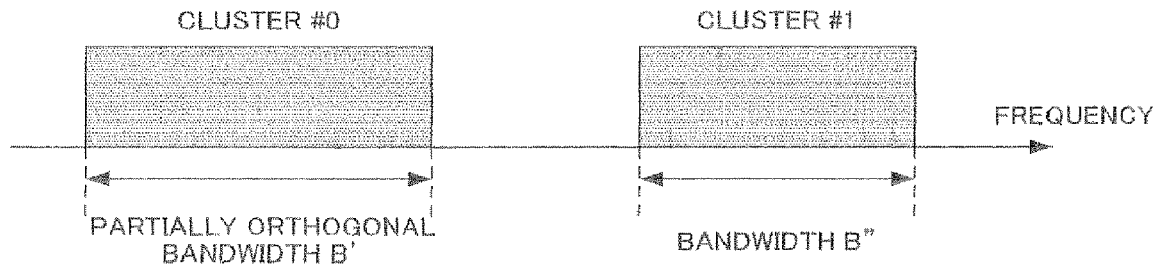
FIG. 5A is a diagram showing division processing and mapping processing according to Embodiment 1 of the present invention.

Thus, division section 111 divides the SC-FDMA signal (spectrum) inputted from DFT section 110 into two clusters; cluster #0 and cluster #1 as shown in FIG. 5A. To be more specific, division section 111 divides the SC-FDMA signal having orthogonal bandwidth B with partially orthogonal bandwidth B' calculated according to equation 2. In other words, division section 111 divides the SC-FDMA signal with partially orthogonal bandwidth B' corresponding to vector length N' calculated according to equation 1. Thus, division section 111 generates cluster #0 having partially orthogonal bandwidth B' and cluster #1 having bandwidth B" (=B−B') which is the difference between orthogonal bandwidth B and partially orthogonal bandwidth B'.

As shown in FIG. 5A, mapping section 112 then maps cluster #0 and cluster #1 to two discontinuous frequency bands respectively.

Figure 5B:
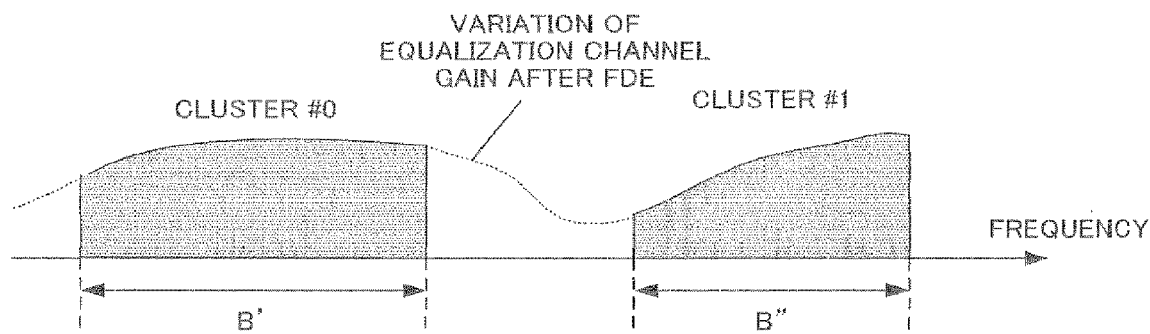
FIG. 5B is a diagram showing a signal after FDE according to Embodiment 1 of the present invention.

On the other hand, the base station receives a C-SC-FDMA signal made up of cluster #0 and cluster #1 shown in FIG. 5A. The base station applies FDE processing to the C-SC-FDMA signal and thereby obtains a C-SC-FDMA signal after the FDE as shown in FIG. 5B. The base station then combines cluster #0 and cluster #1 after the FDE shown in FIG. 5B and thereby generates a signal having orthogonal bandwidth B (=B'+B") of the DFT matrix as shown in FIG. 5C.

Figure 5C:
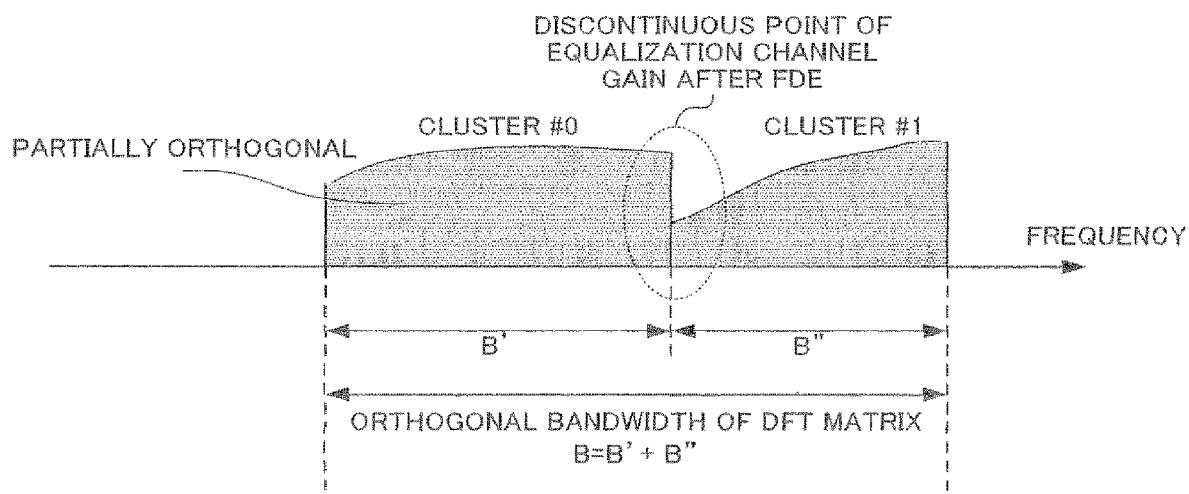
FIG. 5C is a diagram showing a signal after combining according to Embodiment 1 of the present invention.

As shown in FIG. 5C, the variation of the equalization channel gain becomes discontinuous at a combining point between cluster #0 and cluster #1. On the other hand, the variation of the equalization channel gain is slow in each cluster. Thus, ISI between multiplexed symbols corresponding to column vectors $f_i$ and $f_i'$ that satisfy equation 2 or equation 1 (that is, between partially orthogonal multiplexed symbols) is reduced in cluster #0. Thus, in cluster #0 (that is, cluster having partially orthogonal bandwidth B'), it is possible to reduce ISI caused by a drastic variation of the equalization channel gain at the combining point (dividing point of the SC-FDMA signal) between cluster #0 and cluster #1.

Thus, according to the present division method, although a variation of the equalization channel gain becomes discontinuous at a combining point of a plurality of clusters, it is possible to reduce the loss of orthogonality between multiplexed symbols in a cluster having a partially orthogonal bandwidth. Therefore, according to the present division method, it is possible to reduce ISI caused by a drastic variation of the equalization channel gain even when the SC-FDMA signal is divided into a plurality of clusters.

<Division Method 1-2>

According to the present division method, division section 111 divides the SC-FDMA signal with partially orthogonal bandwidth B' corresponding to vector length N' in which $(|I|/|i-i'|)^{-1}$ in equation 1 is 2 or more and less than N and at the same time one of divisors of N.

This will be described more specifically below. Here, suppose DFT size N is 12 and the number of clusters is 2.

When N=12, divisors of N=12, which are 2 or more and less than 12, are 2, 3, 4 and 6. Thus, division section 111 selects one of $(|I|/|i-i'|)^{-1}$=2, 3, 4, 6 which is the reciprocal of $(|I|/|i-i'|)$ shown in equation 1. That is, division section 111 selects one of vector lengths N'=6, 4, 3 and 2 according to equation 1. That is, column vector $f_i$ and column vector $f_{i'}$ that satisfy $(|I|/|i-i'|)$=½, ⅓, ¼ and ⅙ respectively in equation 1 are partially orthogonal in vector lengths N'=6, 4, 3 and 2 respectively.

When, for example, dividing column vector $f_i$ (i=0 to 11) with vector length N'=6 (that is, when $(|I|/|i-i'|)^{-1}$=2), division section 111 assumes vector length N' of cluster #0 to be 6 and assumes vector length N" of cluster #1 to be 6 (=N−N'=12−6). That is, division section 111 divides the SC-FDMA signal having orthogonal bandwidth B ($=N*B_{sub}=12B_{sub}$) into cluster #0 having partially orthogonal bandwidth B' ($=N'*B_{sub}=6B_{sub}$) and cluster #1 having bandwidth B" ($=N"*B_{sub}=6B_{sub}$). The same applies to cases where vector length N'=4, 3, 2.

Thus, combination (N', N") of vector lengths of two clusters (cluster #0 and cluster #1) including the cluster of vector length N' calculated using the present division method is one of (6, 6), (4, 8), (3, 9) and (2, 10). That is, all combinations of vector lengths of the two clusters are integers. Therefore, while the DFT size (the number of DFT points) of the DFT matrix takes an integer value of 0 to N−1, vector length N' and vector length N"=(N−N') that divide column vector $f_i$ can always be integer values without becoming fractions. In other words, partially orthogonal bandwidth B' that divides orthogonal bandwidth B(=N*$B_{sub}$) can always be limited to an integer multiple of $B_{sub}$.

Thus, according to the present division method, it is possible to improve affinity between DFT processing of outputting an SC-FDMA signal using DFT size N, which is an integer value, and division processing of dividing the SC-FDMA signal, which is the output of the DFT processing, into a plurality of clusters while obtaining effects similar to those of division method 1.

<Division Method 1-3>

According to the present division method, division section 111 divides the SC-FDMA signal with partially orthogonal bandwidth B' corresponding to vector length N', which is a multiple of a prime number.

This will be described more specifically below. For example, division section 111 assumes vector length N' to be multiple $a_0x_0$ (where coefficient $a_0$ is an integer equal to or greater than 1) of prime number $x_0$. Here, suppose DFT size N is 12 and the number of clusters is 2. Furthermore, suppose prime number $x_0$=3 and coefficient $a_0$=3.

Thus, division section 111 assumes vector length N' of cluster #0 to be 9 (=3×3) and vector length N" of cluster #1 to be 3 (=N−N'=12−9). That is, division section 111 divides the SC-FDMA signal having orthogonal bandwidth B (=N*$B_{sub}$=12$B_{sub}$) corresponding to DFT size N=12 into cluster #0 having partially orthogonal bandwidth B' (=N'*$B_{sub}$=9$B_{sub}$) corresponding to vector length N'=9 and cluster #1 having bandwidth B" (=N"*$B_{sub}$=3$B_{sub}$) corresponding to vector length N"=3.

Here, in cluster #0 of vector length N'=9 which is multiple $a_0x_0$ of prime number $x_0$=3, there is a column vector which is orthogonal (hierarchically orthogonal) in vector length 3, 6, 9. For example, in real parts and imaginary parts of column vectors $f_0$ to $f_{11}$ shown in FIG. 6, their respective waveforms are orthogonal to each other in vector length 3, 6, 9 between column vectors $f_0$ and $f_4$, between column vectors $f_0$ and $f_8$, and between column vectors $f_4$ and $f_8$. Here, only an orthogonal relationship among vector lengths which are multiples of prime number $x_0$=3 is shown. For example, between column vectors $f_4$ and $f_8$, vector length 3 matches a one-cycle portion of column vector $f_4$ and a two-cycle portion of column vector $f_8$, vector length 6 matches a two-cycle portion of column vector $f_4$ and a four-cycle portion of column vector $f_8$ and vector length 9 matches a three-cycle portion of column vector $f_4$ and a six-cycle portion of column vector $f_8$.

That is, column vectors $f_0$, $f_4$ and $f_8$ of 12 column vectors $f_0$ to $f_{11}$ in cluster #0 (vector length N'=9) have a hierarchically orthogonal relationship in which those column vectors are orthogonal to each other in a cycle of vector length 3, 6, 9. Thus, in cluster #0 (vector length N'=9), ISI is reduced between column vectors $f_0$, $f_4$ and $f_8$ (e.g. multiplexed symbols #0, #4, #8) of 12 column vectors $f_0$ to $f_{11}$ (e.g. multiplexed symbols #0 to #11) shown in FIG. 6.

Thus, according to the present division method, division section 111 divides the SC-FDMA signal with partially orthogonal bandwidth B' corresponding to vector length N' which is multiple $a_0x_0$ of prime number $x_0$, and can thereby generate a cluster including more multiplexed symbols which are hierarchically orthogonal in a cycle of a multiple ($x_0$, 2$x_0$, . . . , $a_0x_0$) of prime number $x_0$. That is, it is possible to produce more multiplexed symbols (column vectors) which are partially orthogonal to each other in cluster size of clusters generated by dividing the SC-FDMA signal. In other words, by reducing multiplexed symbols (column vectors) which are not partially orthogonal to each other in cluster size of clusters generated by dividing the SC-FDMA signal, it is possible to reduce ISI caused by the loss of orthogonality between multiplexed symbols which are not partially orthogonal to each other.

Furthermore, according to the present division method, coefficient $a_0$ is the only information that needs to be reported from the base station to terminal 100 as control information on the division of the SC-FDMA signal (spectrum), and it is thereby possible to reduce the amount of information required to report the control information.

A case has been described in the present division method where division section 111 divides the SC-FDMA signal with partially orthogonal bandwidth B' corresponding to vector length N' which is a multiple of one prime number. However, in the present invention, for example, division section 111 may also divide the SC-FDMA signal with partially orthogonal bandwidth B' corresponding to vector length N' which is a multiple of a product of two or more prime numbers.

For example, division section 111 assumes vector length N' to be a multiple (e.g. $b_0(x_0*x_1)$) (where $b_0$ is an integer equal to or greater than 1) of a product (e.g. $x_0*x_1$) of at least two prime numbers (two or more prime numbers) of prime numbers $x_0$, $x_1$, $x_2$, . . . . Thus, the cluster having partially orthogonal bandwidth B' corresponding to vector length N'=$b_0(x_0*x_1)$ can include multiplexed symbols (column vectors) which are hierarchically partially orthogonal to each other in a cycle of a multiple ($x_0$, 2$x_0$, . . . , $b_0x_0$) of prime number $x_0$ and multiplexed symbols (column vectors) which are hierarchically partially orthogonal to each other in a cycle of a multiple ($x_1$, 2$x_1$, . . . , $bdx_1$) of prime number $x_1$. That is, as the minimum division unit (e.g. $x_0*x_1$) of the SC-FDMA signal increases, it is possible to increase the number of multiplexed symbols (column vectors) which are partially orthogonal to each other in cluster size with the cluster having partially orthogonal bandwidth B' corresponding to vector length N'=$b_0(x_0*x_1)$. It is thereby possible to further reduce ISI caused by the loss of orthogonality between multiplexed symbols (column vectors).

When two or more prime numbers are selected, it is preferable to select prime numbers in order from a smaller prime number (2, 3, 5, 7, . . . ). Thus, it is possible to produce more multiplexed symbols (column vectors) which are hierarchically orthogonal to each other in a cycle of a multiple of a prime number in a cluster having partially orthogonal bandwidth B' and further reduce ISI caused by the loss of orthogonality between multiplexed symbols (column vectors).

<Division Method 1-4>

In the present division method, division section 111 divides an SC-FDMA signal having partially orthogonal bandwidth B' corresponding to vector length N' which is a power of a prime number.

This will be described more specifically below. For example, division section 111 assumes column vector length N' to be power $x_0^{a0}$ (where $a_0$ is an integer equal to or greater than 1) of prime number $x_0$. Here, suppose DFT size N is 12 and the number of clusters is 2 as in the case of division method 1-3. Furthermore, suppose prime number $x_0=2$ and coefficient $a_0=3$.

Thus, for example, division section 111 assumes vector length N' of cluster #0 to be 8 ($=2^3$) and assumes vector length N" of cluster #1 to be 4 ($=N-N'=12-8$). That is, division section 111 divides an SC-FDMA signal having orthogonal bandwidth B ($=N*B_{sub}=12B_{sub}$) corresponding to DFT size N=12 into cluster #0 having partially orthogonal bandwidth B' ($=N'*B_{sub}=8B_{sub}$) corresponding to vector length N'=8 and cluster #1 having bandwidth B" ($=N''*B_{sub}=4B_{sub}$) corresponding to vector length N"=4.

Figure 6:
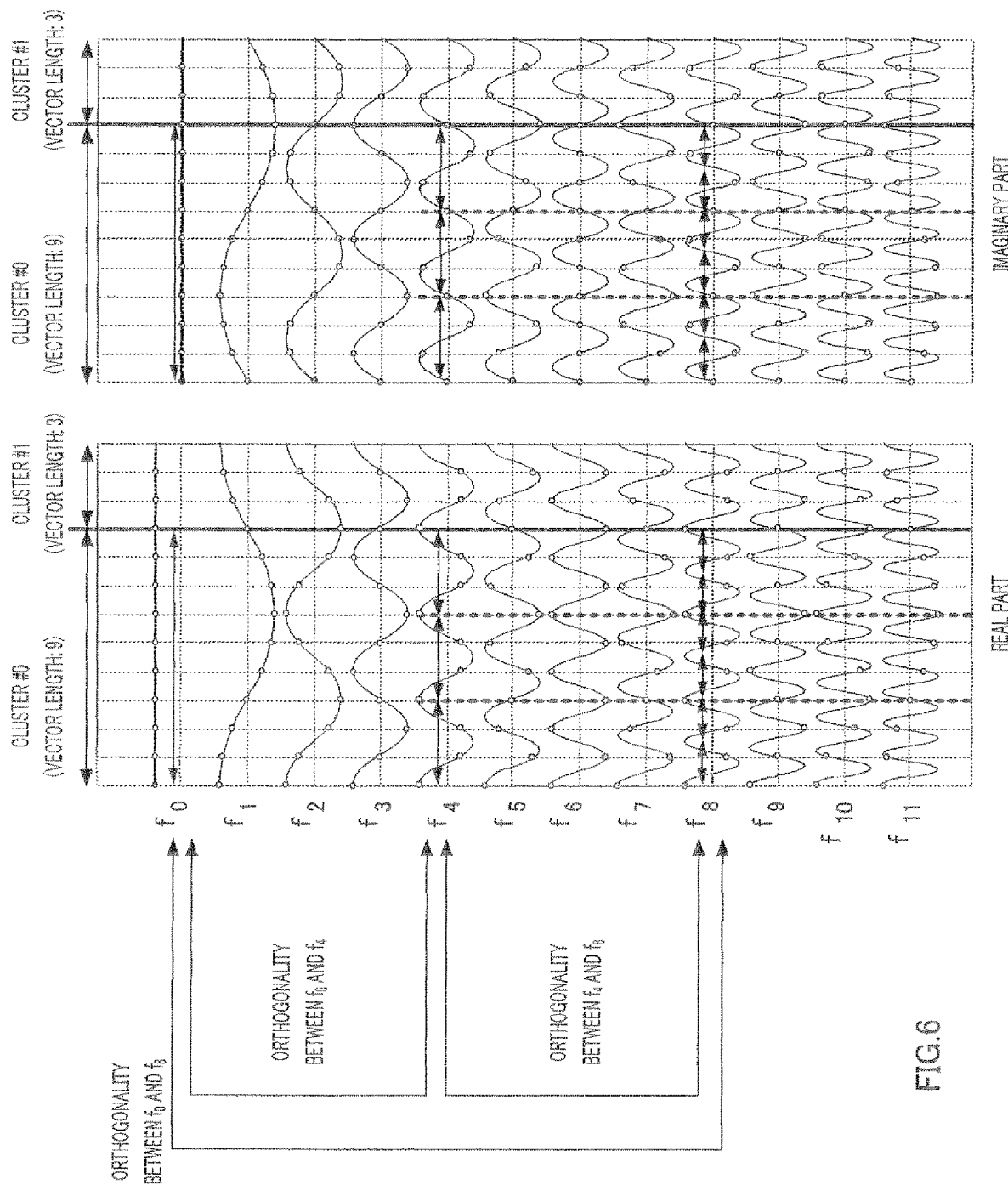
FIG. 6 is a diagram showing an orthogonal relationship of column vectors according to Embodiment 1 of the present invention.
Figure 7:
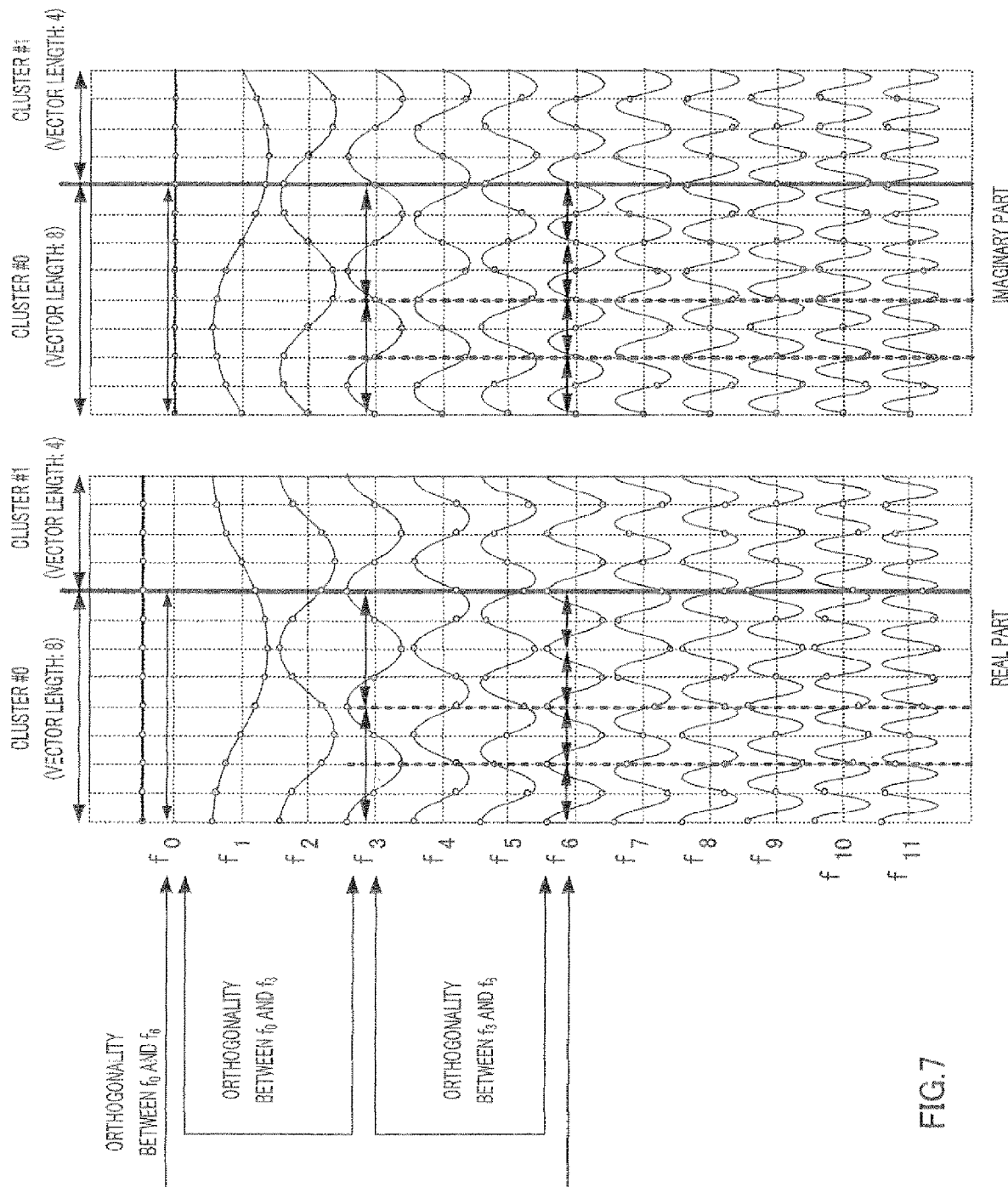
FIG. 7 is a diagram showing an orthogonal relationship of column vectors according to Embodiment 1 of the present invention.

Here, there are column vectors which are orthogonal to each other in vector lengths of 2, 4, 8 in cluster #0 having vector length N'=8 which is power $x_0^{a0}$ of prime number $x_0=2$. For example, in real parts and imaginary parts of column vectors $f_0$ to $f_{11}$ shown in FIG. 7, their respective waveforms are orthogonal to each other in vector length 2, 4, 8 between column vectors $f_0$ and $f_3$, between column vectors $f_0$ and $f_6$ and between column vectors $f_3$ and $f_6$ as in the case of division method 1-3 (FIG. 6). Here, only an orthogonal relationship between vector lengths which are powers of prime number $x_0=2$ is shown.

That is, column vectors $f_0$, $f_3$, $f_6$ of 12 column vectors $f_0$ to $f_{11}$ in cluster #0 (vector length N'=8) have a hierarchic orthogonal relationship in which those column vectors are orthogonal to each other in a cycle of vector length 2, 4, 8. Thus, in cluster #0 (vector length N'=8), ISI is reduced between column vectors $f_0$, $f_3$, $f_6$ (e.g. multiplexed symbols #0, #3, #6) of 12 column vectors $f_0$ to $f_{11}$ (e.g. multiplexed symbols #0 to #11) shown in FIG. 7.

Thus, according to the present division method, division section 111 divides the SC-FDMA signal with partially orthogonal bandwidth B' corresponding to vector length N' which is power $x_0^{a0}$ of prime number $x_0$, and can thereby generate clusters including more multiplexed symbols (column vectors) which are hierarchically orthogonal in a cycle of a power $(x_0, x_0^2, \ldots, x_0^{a0})$ of prime number $x_0$. Thus, it is possible to reduce ISI caused by the loss of orthogonality between multiplexed symbols (column vectors) which are not partially orthogonal to each other in cluster size of clusters generated by dividing the SC-FDMA signal as in the case of division method 1-3.

Furthermore, according to the present division method, coefficient $a_0$ is the only information that needs to be reported from the base station to terminal 100 as control information on the division of the SC-FDMA signal (spectrum) and it is thereby possible to reduce the amount of information required to report the control information as in the case of division method 1-3.

A case has been described in the present division method where division section 111 divides the SC-FDMA signal with partially orthogonal bandwidth B' corresponding to vector length N' which is a power of one prime number. However, in the present invention, for example, division section 111 may also divide the SC-FDMA signal with a partially orthogonal bandwidth B' corresponding to vector length N' which is a power of a product of two or more prime numbers.

For example, division section 111 assumes vector length N' to be a power (e.g.)$(x_0*x_1)^{b0}$ (where $b_0$ is an integer equal to or greater than 1) of a product (e.g. $x_0*x_1$) of at least two prime numbers (two or more prime numbers) of prime numbers $x_0, x_1, x_2, \ldots$. Thus, the cluster having partially orthogonal bandwidth B' corresponding to vector length $N'=(x_0*x_1)^{b0}$ can include multiplexed symbols (column vectors) which are hierarchically partially orthogonal to each other in a cycle of a power $(x_0, x_0^2, \ldots, x_0^{b0})$ of prime number $x_0$ and multiplexed symbols (column vectors) which are hierarchically partially orthogonal to each other in a cycle of a power $(x_1, x_1^2, \ldots, x_1^{b0})$ of prime number $x_1$. That is, as the minimum division unit (e.g. $x_0*x_1$) of the SC-FDMA signal increases, it is possible to increase the number of multiplexed symbols (column vectors) which are partially orthogonal to each other in cluster size of the cluster having partially orthogonal bandwidth B' corresponding to vector length $N'=(x_0*x_1)^{b0}$. It is thereby possible to further reduce ISI caused by the loss of orthogonality between multiplexed symbols (column vectors).

Furthermore, in the present invention, division section 111 may also assume vector length N' to be a multiple (e.g.)$p_0(x_0*x_1)^{b0}$. (where $p_0$ is an integer equal to or greater than 1) of a power (e.g.)$(x_0*x_1)^{b0}$ of a product (e.g. $x_0*x_1$) of at least two prime numbers (two or more prime numbers) of prime numbers $x_0, x_1, x_2, \ldots$. Effects similar to those of the present division method may be obtained in this case, too.

Furthermore, in the present invention, division section 111 may also assume vector length N' to be product $x_0^{c0}*x_1^{c1}* \ldots$ of at least two (two or more) powers $x_0^{c0}$, $x_1^{c1}, \ldots$ ($c_0, c_1, \ldots$ is an integer equal to or greater than 0, where, at least one of $c_0, c_1, \ldots$ is an integer equal to or greater than 1) of prime numbers $x_0, x_1, \ldots$. Effects similar to those of the present division method may be obtained in this case, too. Here, in FFT (Fast Fourier Transform) that realizes processing equivalent to that of DFT by a smaller amount of calculations, a product of a power of a certain value may be used as the FFT size (the number of FFT points). Thus, when using FFT as a substitute for DFT, it is possible to improve affinity between FFT processing and division processing of the SC-FDMA signal by using a product of powers of prime numbers $x_0^{c0}*x_1^{c1}* \ldots$ as vector length N' for dividing column vector length N. Furthermore, division section 111 may also assume vector length N' to be multiple $p_0 (x_0^{c0}*x_1^{c1}* \ldots )$ (where $p_0$ is an integer equal to or greater than 1) of a product of powers of prime numbers $x_0^{c0}*x_1^{c1}* \ldots$.

When two or more prime numbers are selected, it is preferable to select prime numbers in order from a smaller prime number (2, 3, 5, 7, ... ). It is thereby possible to produce more multiplexed symbols (column vectors) which are hierarchically partially orthogonal to each other in a cycle of a power of a prime number in clusters having partially orthogonal bandwidth B' and further reduce ISI caused by the loss of orthogonality between multiplexed symbols (column vectors).

SC-FDMA signal division methods 1-1 to 1-4 through division section 111 have been described so far.

Thus, even when dividing an SC-FDMA signal into a plurality of clusters and mapping the plurality of clusters to discontinuous frequency bands respectively, the present embodiment can reduce ISI caused by the loss of orthogonality of the DFT matrix by dividing the SC-FDMA signal with a partially orthogonal bandwidth.

Thus, the present embodiment reduces ISI caused by the loss of orthogonality of the DFT matrix, and can thereby improve transmission characteristics without deteriorating data transmission efficiency even when using high-level M-ary modulation such as 64 QAM which has a very short Euclidian distance between signal points.

A case has been described in the present embodiment where a terminal divides an SC-FDMA signal into a plurality of clusters so that a bandwidth of one cluster (here, cluster #0) is a partially orthogonal bandwidth. However, the terminal in the present invention may also divide the SC-FDMA signal into a plurality of clusters using one of division methods 1-1 to 1-4 so that bandwidths of all of the plurality of clusters are partially orthogonal bandwidths. Thus, it is possible to increase the number of multiplexed symbols having a partially orthogonal relationship with each other in all clusters and thereby reduce ISI cluster by cluster.

Figure 8:
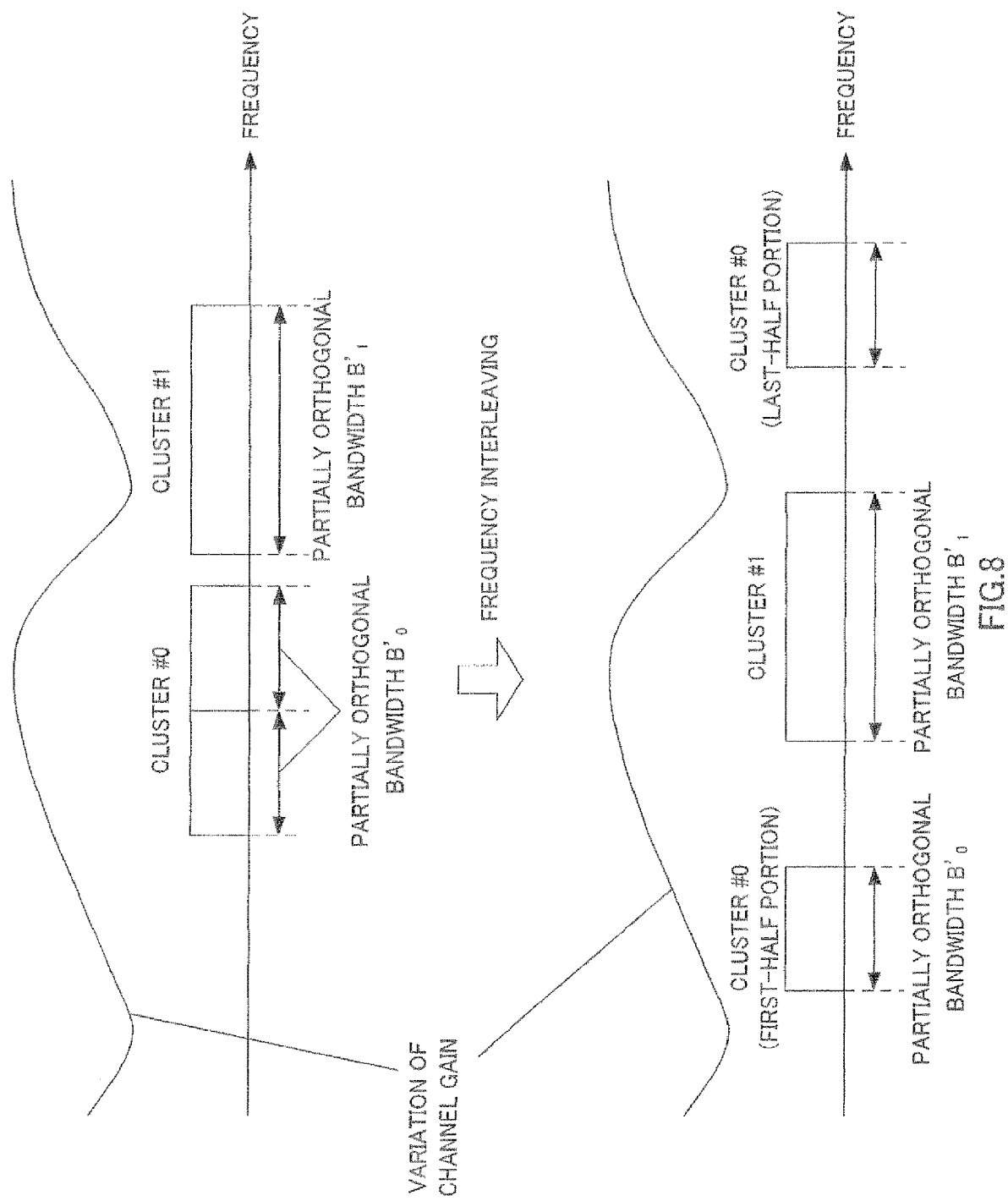
FIG. 8 is a diagram showing frequency interleaving processing according to Embodiment 1 of the present invention.

Furthermore, in the present embodiment, the terminal may perform frequency interleaving for each frequency band (or cluster) having a partially orthogonal bandwidth as shown in FIG. 8. To be more specific, when division section 111 divides the SC-FDMA signal into cluster #0 and cluster #1 as shown in the upper part of FIG. 8, an interleaving section (not shown) performs frequency interleaving in units of partially orthogonal bandwidth. That is, the interleaving section performs frequency interleaving on a first-half portion of cluster #0 having partially orthogonal bandwidth $B_0'$, a last-half portion of cluster #0 having partially orthogonal bandwidth $B_0'$ and cluster #1 having partially orthogonal bandwidth $B_1'$. Thus, it is possible to further improve the frequency diversity effect while reducing the loss of orthogonality in the clusters as in the case of the present embodiment.

Furthermore, a case has been described in the present embodiment where the base station reports only frequency resource information to terminal 100 every time the base station communicates with terminal 100 and terminal 100 calculates cluster information (the number of clusters and the cluster size) based on category information and partially orthogonal condition information (equation 1 and equation 2) reported beforehand. However, in the present invention, for example, the base station may report all frequency resource information and cluster information (the number of clusters and the cluster size) to terminal 100 every time the base station communicates with terminal 100 and terminal 100 may divide the SC-FDMA signal based on the received frequency resource information and cluster information.

Furthermore, for example, the base station may also report frequency resource information showing frequency bands allocated in consideration of the number of clusters and the cluster size to terminal 100. To be more specific, the base station (scheduler of the base station) performs scheduling and thereby performs allocation processing of allocating frequency bands of partially orthogonal bandwidth B' that includes a frequency band of terminal 100 showing a maximum SINR in a certain frequency band (subcarrier) and satisfies equation 2 (or equation 1) on terminal 100. That is, the base station allocates frequency bands of partially orthogonal bandwidth B' calculated according to equation 2 (or equation 1) to a plurality of clusters constituting a C-SC-FDMA signal of terminal 100. The base station allocates frequency resources of the C-SC-FDMA signal made up of a plurality of clusters having a partially orthogonal bandwidth by repeatedly performing the above described allocation processing in different frequency bands. The base station then reports frequency resource information showing the frequency resource allocation result of the C-SC-FDMA signal of terminal 100 to terminal 100. The base station also performs the above described frequency resource allocation processing on terminals other than terminal 100. This allows the base station to schedule the allocation of frequency resources to all terminals locating in the cell of the base station. Furthermore, terminal 100 may map the C-SC-FDMA signal according to the frequency band shown in the frequency resource information reported from the base station. This allows terminal 100 to divide SC-FDMA into a plurality of clusters, map the plurality of clusters to frequency bands having a partially orthogonal bandwidth and can thereby have effects similar to those of the present embodiment.

Embodiment 2

The present embodiment will describe a case where MIMO (Multi-Input Multi-Output) transmission, which is one of transmission techniques for realizing high-speed, large-volume data transmission, is used. The MIMO transmission technique provides a plurality of antennas for both a base station and a terminal, provides a plurality of propagation paths (streams) in a space between radio transmission/reception, spatially multiplexes the respective streams, and can thereby increase throughput.

Figure 9:
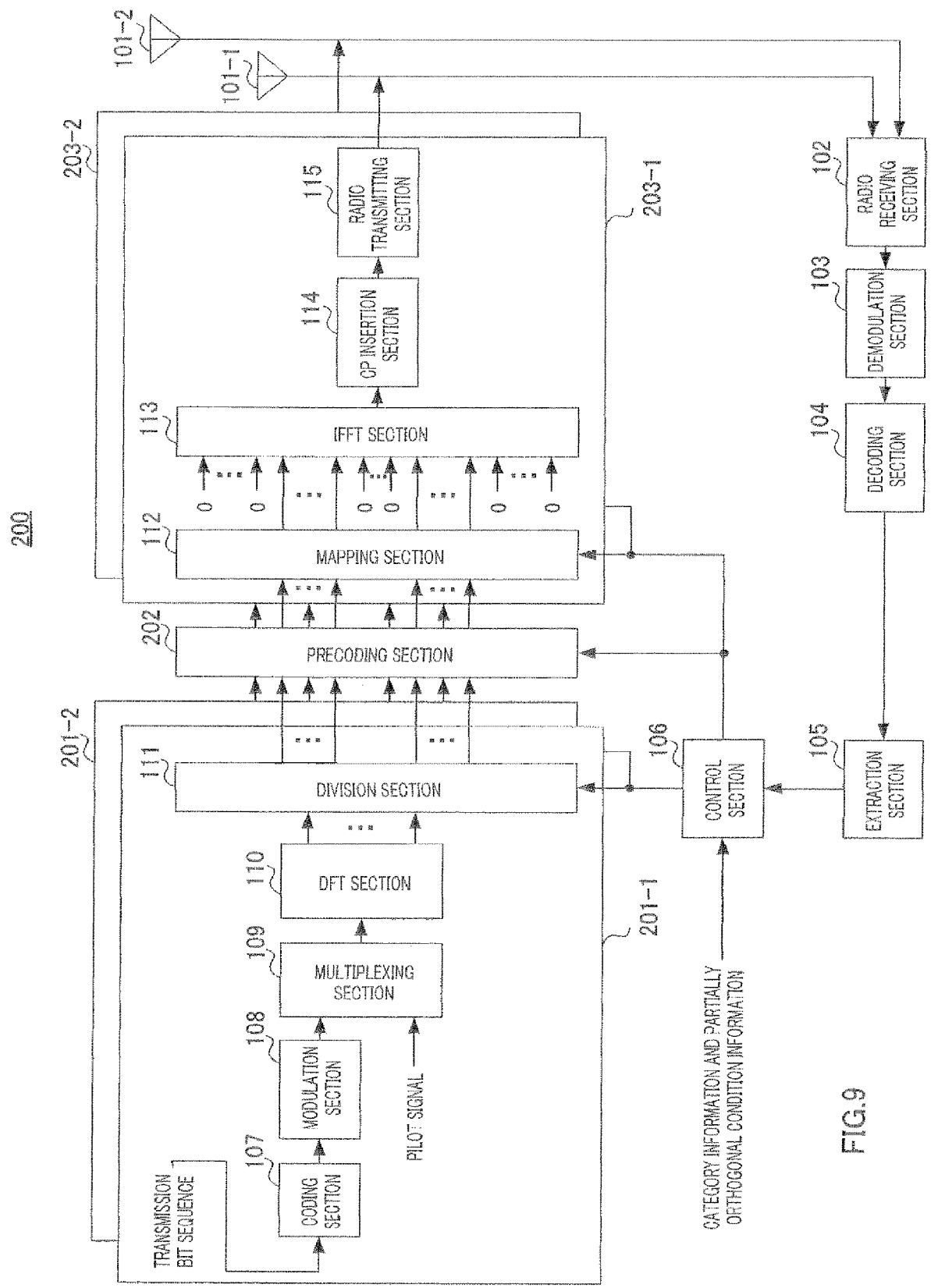
FIG. 9 is a block diagram of a terminal according to Embodiment 2 of the present invention.

This will be described more specifically below. FIG. 9 shows a configuration of terminal 200 according to the present embodiment. Terminal 200 is provided with two antennas (antennas 101-1 and 101-2) that transmit C-SC-FDMA signals (a plurality of clusters) using two streams (stream #1 and stream #2).

Furthermore, terminal 200 includes C-SC-FDMA processing sections 201-1 and 201-2 made up of coding section 107, modulation section 108, multiplexing section 109, DFT section 110 and division section 111, respectively provided for antennas 101-1 and 101-2.

Furthermore, terminal 200 also includes transmission processing sections 203-1 and 203-2 made up of mapping section 112, IFFT section 113, CP insertion section 114 and radio transmitting section 115, respectively provided for antennas 101-1 and 101-2.

C-SC-FDMA processing sections 201-1 and 201-2 generate C-SC-FDMA signals (a plurality of clusters) by applying processing similar to that by coding section 107 to division section 111 in Embodiment 1 to transmission bit sequences inputted respectively. C-SC-FDMA processing sections 201-1 and 201-2 then output the C-SC-FDMA signals generated to precoding section 202 respectively.

Precoding section 202 receives different spatial precoding matrixes (PM) for each identical frequency band having a partially orthogonal bandwidth or for each identical cluster of the partially orthogonal bandwidth from control section 106 as input. That is, precoding section 202 uses the same spatial precoding matrix for each identical frequency band having a partially orthogonal bandwidth or for each identical cluster having a partially orthogonal bandwidth. Here, precoding information showing the spatial precoding matrix is reported from a base station to terminal 200. For example, the precoding information shows a number indicating each spatial precoding matrix and control section 106 may calculate each spatial precoding matrix based on the number indicated in the precoding information.

Precoding section 202 multiplies the C-SC-FDMA signals inputted from C-SC-FDMA processing sections 201-1 and 201-2 by the spatial precoding matrix respectively. Here, precoding section 202 multiplies the C-SC-FDMA signals mapped to frequency bands having the same partially orthogonal bandwidth or clusters having the same partially orthogonal bandwidth by the same spatial precoding matrix in each of the plurality of streams. Precoding section 202 then outputs the precoded C-SC-FDMA signals to corresponding transmission processing sections 203-1 and 203-2 for each stream.

Transmission processing sections 203-1 and 203-2 apply processing similar to that of mapping section 112 to radio transmitting section 115 of Embodiment 1 to the precoded C-SC-FDMA signals inputted respectively and transmit the C-SC-FDMA signals after the transmission processing to the base station via antennas 101-1 and 101-2 respectively.

Next, details of the precoding processing by precoding section 202 of terminal 200 will be described.

First, a case will be described where the same spatial precoding matrix is used for each partially orthogonal band. For example, in FIG. 10A, each division section 111 (FIG. 9) of C-SC-FDMA processing sections 201-1 and 201-2 divides an SC-FDMA signal into cluster #0 having a bandwidth twice partially orthogonal bandwidth $B_0'$ and cluster #1 having partially orthogonal bandwidth Br.

Therefore, precoding section 202 multiplies cluster #0 and cluster #1 transmitted by the same spatial precoding matrix for every partially orthogonal bandwidth using stream #1 and stream #2. To be more specific, as shown in FIG. 10A, precoding section 202 uses the same spatial precoding matrix PM #0 for both stream #1 and stream #2 in one partially orthogonal bandwidth $B_0'$ of cluster #0 and uses the same spatial precoding matrix PM #1 for both stream #1 and stream #2 in the other partially orthogonal bandwidth $B_0'$. Furthermore, precoding section 202 uses the same spatial precoding matrix PM #2 for both stream #1 and stream #2 in cluster #1 having partially orthogonal bandwidth $B_1'$.

Next, a case will be described where the same spatial precoding matrix is used for each cluster. For example, in FIG. 10B, each division section 111 (FIG. 9) of C-SC-FDMA processing sections 201-1 and 201-2 divides an SC-FDMA signal into cluster #0 having partially orthogonal bandwidth $B_0'$ and cluster #1 having partially orthogonal bandwidth $B_1'$.

Figure 10B:
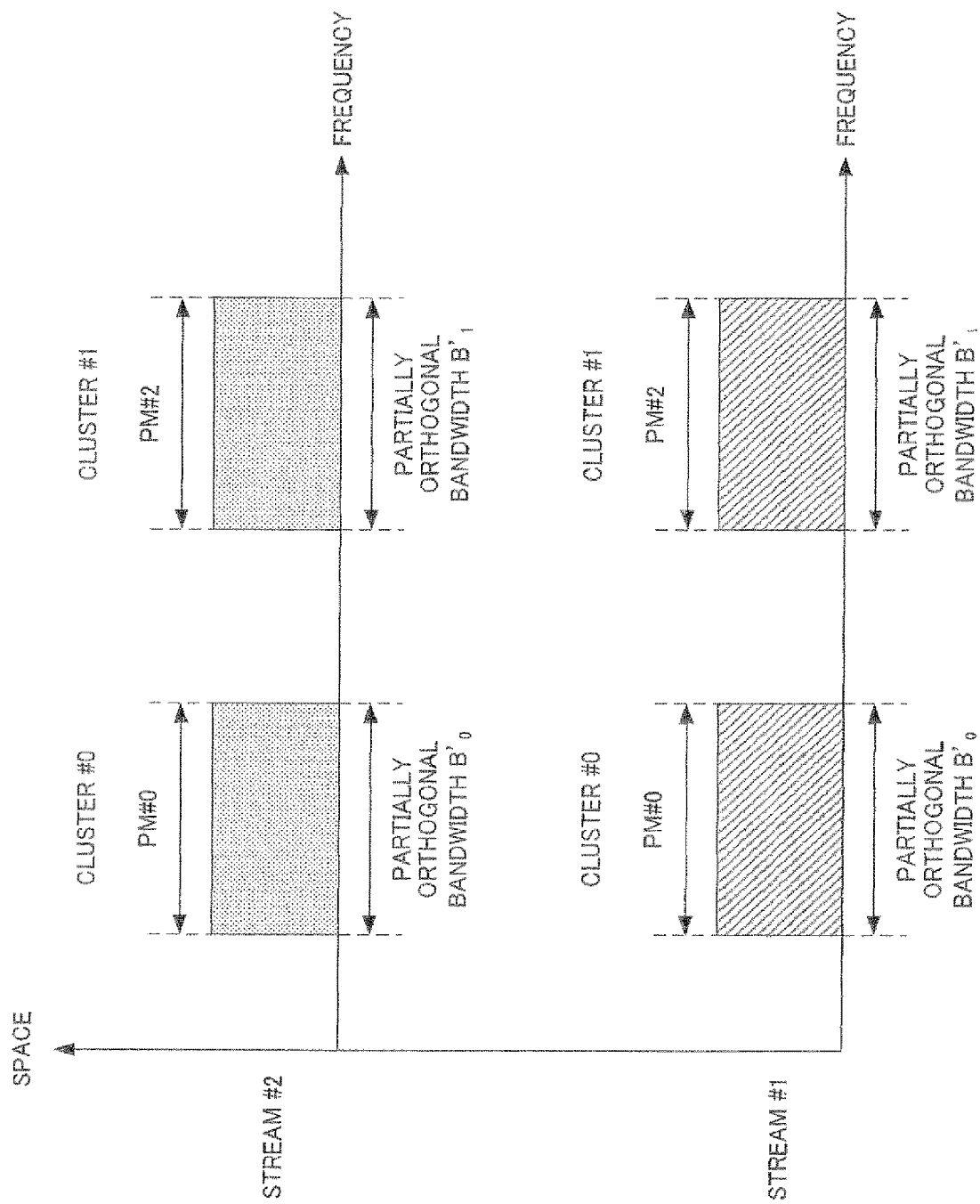
FIG. 10B is a diagram showing precoding processing according to Embodiment 2 of the present invention.

Precoding section 202 then multiplies cluster #0 and cluster #1 transmitted using stream #1 and stream #2 by the same spatial precoding matrix for each cluster. To be more specific, as shown in FIG. 10B, precoding section 202 uses the same spatial precoding matrix PM #0 for both stream #1 and stream #2 in cluster #0 having partially orthogonal bandwidth $B_0'$. Furthermore, precoding section 202 uses the same spatial precoding matrix PM #2 for both stream #1 and stream #2 in cluster #1 having partially orthogonal bandwidth $B_1'$.

Thus, for example, in FIG. 10A, between cluster #0 of stream #1 and cluster #1 of stream #2, it is possible to reduce ISI by maintain orthogonality between multiplexed symbols (column vectors) in the respective clusters in the frequency domain as in the case of Embodiment 1, while in the spatial domain, it is possible to maintain orthogonality between them using spatial precoding matrixes (e.g. unitary matrixes) orthogonal to each other. That is, it is possible to further reduce ISI between cluster #0 of stream #1 and cluster #1 of stream #2 (that is, between clusters transmitted with different frequency bands and different streams). The same applies between cluster #1 of stream #1 and cluster #0 of stream #2.

That is, when using the MIMO transmission technique, it is possible to reduce ISI between different streams and between different frequency bands by using the same spatial precoding matrix for each identical partially orthogonal bandwidth (or each cluster) in different streams.

By this means, the present embodiment can reduce ISI in the frequency domain by dividing the SC-FDMA signal with a partially orthogonal bandwidth as in the case of Embodiment 1 and further reduce ISI in the spatial domain by using a spatial precoding matrix for each partially orthogonal bandwidth.

Although a case has been described in the present embodiment where two streams are used, the number of streams is not limited to two but the present invention may also be applied to cases where three or more streams are used.

Furthermore, the present embodiment is applicable to both single user (SU)-MIMO transmission (that is, MIMO transmission between a plurality of antennas of one base station and a plurality of antennas of one terminal) and multiuser (MU)-MIMO transmission (that is, MIMO transmission between a plurality of antennas of one base station and a plurality of antennas of a plurality of terminals).

Figure 11:
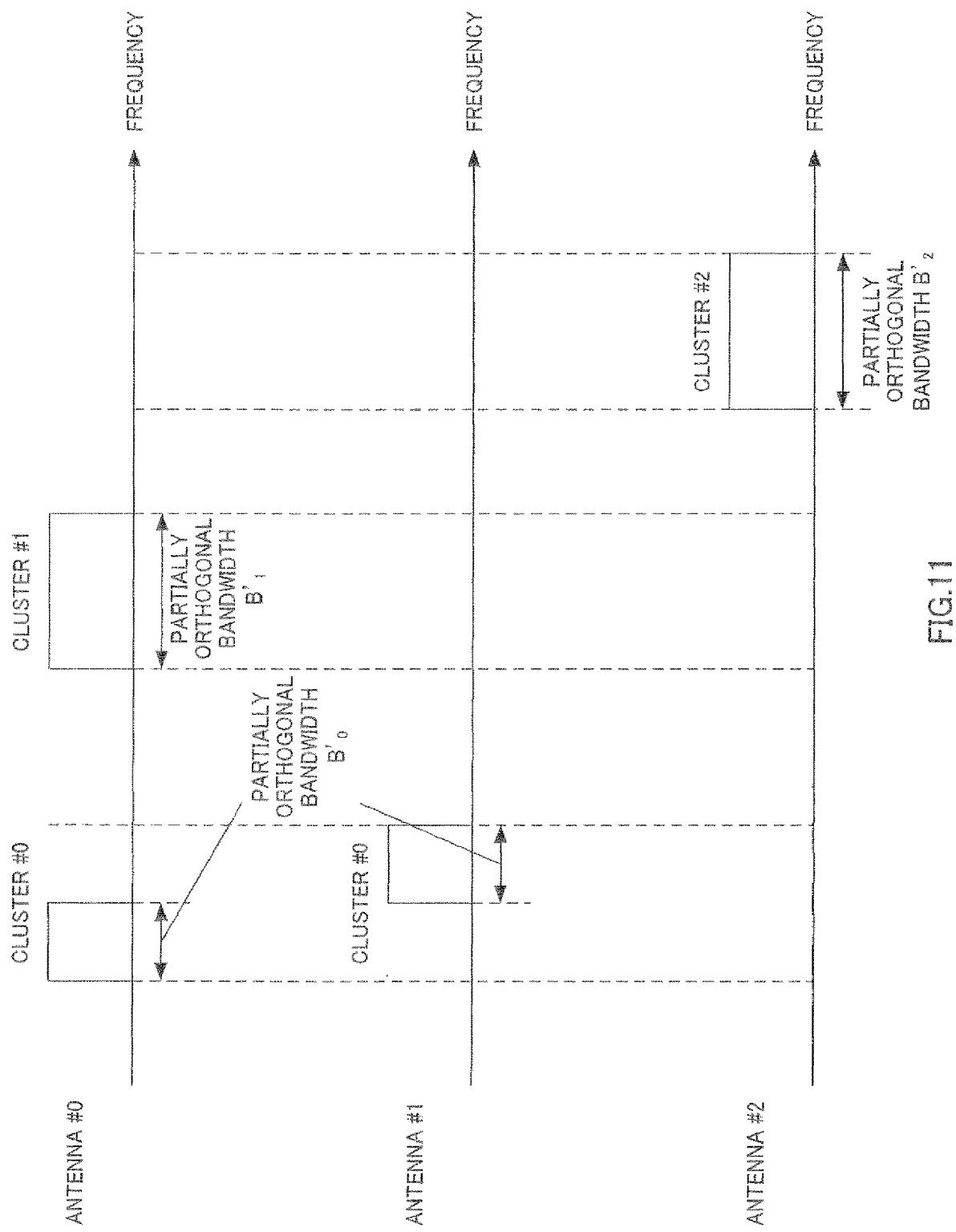
FIG. 11 is a diagram showing processing using FSTD according to Embodiment 2 of the present invention.

Furthermore, in the present embodiment, when FSTD (Frequency Switched Transmit Diversity) is used, the terminal may switch between transmitting antennas for each frequency band (or cluster) having a partially orthogonal bandwidth. For example, as shown in FIG. 11, when the number of transmitting antenna is 3 (antennas #0 to #2) and the number of clusters is 3 (clusters #0 to #2), the first half part of cluster #0 having partially orthogonal bandwidth $B_0'$ may be transmitted from antenna #0, the second half part of cluster #0 having partially orthogonal bandwidth $B_0'$ may be transmitted from antenna #1, cluster #1 having partially orthogonal bandwidth $B_1'$ may be transmitted from antenna #0 and cluster #2 having partially orthogonal bandwidth $B_2'$ may be transmitted from antenna #2. Thus, by switching between transmitting antennas based on the unit of frequency bands (or clusters) having a partially orthogonal bandwidth in FSTD, it is possible to receive a fading variation which differs among frequency bands ($B_0'$ to $B_2'$) having partially orthogonal bandwidths. Therefore, it is possible to obtain a space diversity effect while maintaining orthogonality within a frequency band having partially orthogonal bandwidths.

Embodiment 3

A case has been described in Embodiment 2 where when FSTD (Frequency Switched Transmit Diversity) is used, a terminal switches between transmitting antennas for each frequency band (or cluster) having a partially orthogonal bandwidth. Furthermore, in this case, a case has been described where a plurality of clusters are mapped to non-continuous frequency bands when viewed in the frequency domain of all transmitting antennas. By contrast, in the present embodiment, when using FSTD that switches between transmitting antennas for each frequency band (or cluster) having a partially orthogonal bandwidth, a terminal maps a plurality of clusters to continuous frequency bands when viewed in the frequency domain of all transmitting antennas.

That is, when FSTD is used in Embodiment 2, as shown in FIG. 11, clusters having partially orthogonal bandwidths mapped to the respective antennas are mapped to non-continuous frequency bands and a plurality of clusters are mapped to non-continuous frequency bands when also viewed in frequencies of all antennas. To be more specific, there is an inter-antenna vacant frequency band between cluster #0 of antenna #1 and cluster #1 of antenna #0 in FIG. 11. Likewise, there is also an inter-antenna vacant frequency band between cluster #1 of antenna #0 and cluster #2 of antenna #2. Furthermore, in FIG. 11, no cluster is mapped to any inter-antenna vacant frequency band and a plurality of clusters are mapped to non-continuous frequency bands when also viewed in the frequency domain of all antennas.

Figure 12:
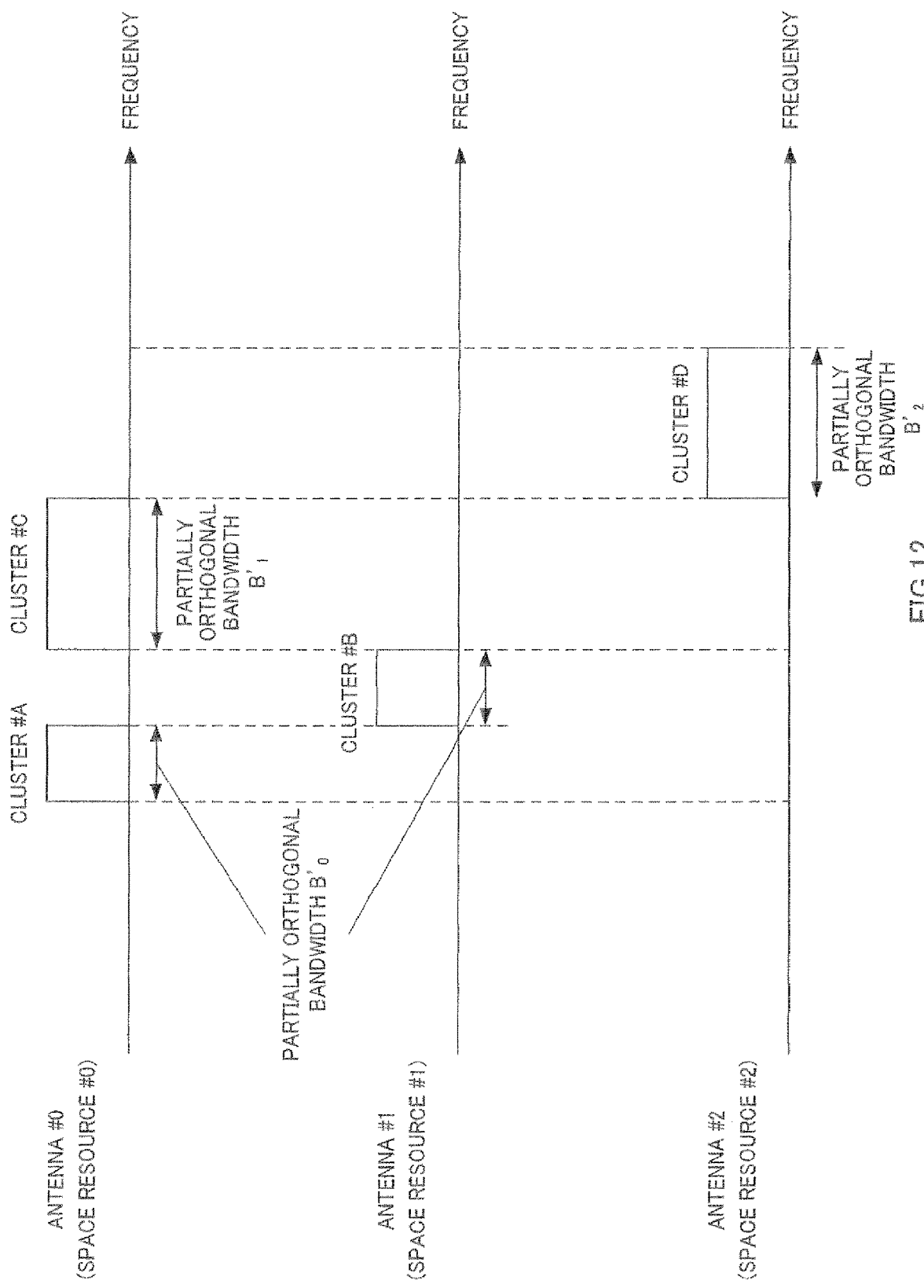
FIG. 12 is a diagram showing processing using FSTD according to Embodiment 3 of the present invention.

On the other hand, in the present embodiment, when FSTD is used, as shown in FIG. 12, clusters having partially orthogonal bandwidths to be mapped to the respective antenna (space resources) are mapped to non-continuous frequency bands as in the case of Embodiment 2. On the other hand, as shown in FIG. 12, a plurality of clusters having partially orthogonal bandwidths to be mapped to the respective antennas (space resources) are mapped to continuous frequency bands when viewed in the frequency domain of all antennas. That is, in FIG. 12, there is no vacant frequency band between any clusters; between cluster #A of antenna #0 (space resource #0) and cluster #B of antenna #1 (space resource #1), between cluster #B of antenna #1 (space resource #1) and cluster #C of antenna #0 (space resource #0) and between cluster #C of antenna #0 (space resource #0) and cluster #D of antenna #2 (space resource #2). That is, when viewed in the frequency domain of all antennas, a plurality of clusters having partially orthogonal bandwidths are mapped to continuous frequency bands.

That is, when viewed in the frequency domain of each antenna, even when C-SC-FDMA signals (a plurality of clusters having partially orthogonal bandwidths) are mapped to non-continuous frequency bands, if C-SC-FDMA signals are mapped to continuous frequency bands when viewed in the frequency domain of all antennas, it is possible to further obtain space diversity effects while maintaining orthogonality within a frequency band having partially orthogonal bandwidths as in the case of Embodiment 2. Furthermore, the receiving apparatus (base station) side can perform reception processing in the same way as when the transmitting apparatus (terminal) side transmits SC-FDMA signals to continuous frequency bands. Thus, according to the present embodiment, the receiving apparatus (base station) can obtain space diversity effects while maintaining orthogonality within a frequency band of partially orthogonal bandwidths without being aware of non-continuous mapping processing between antennas (between space resources) of the transmitting apparatuses.

Figure 13:
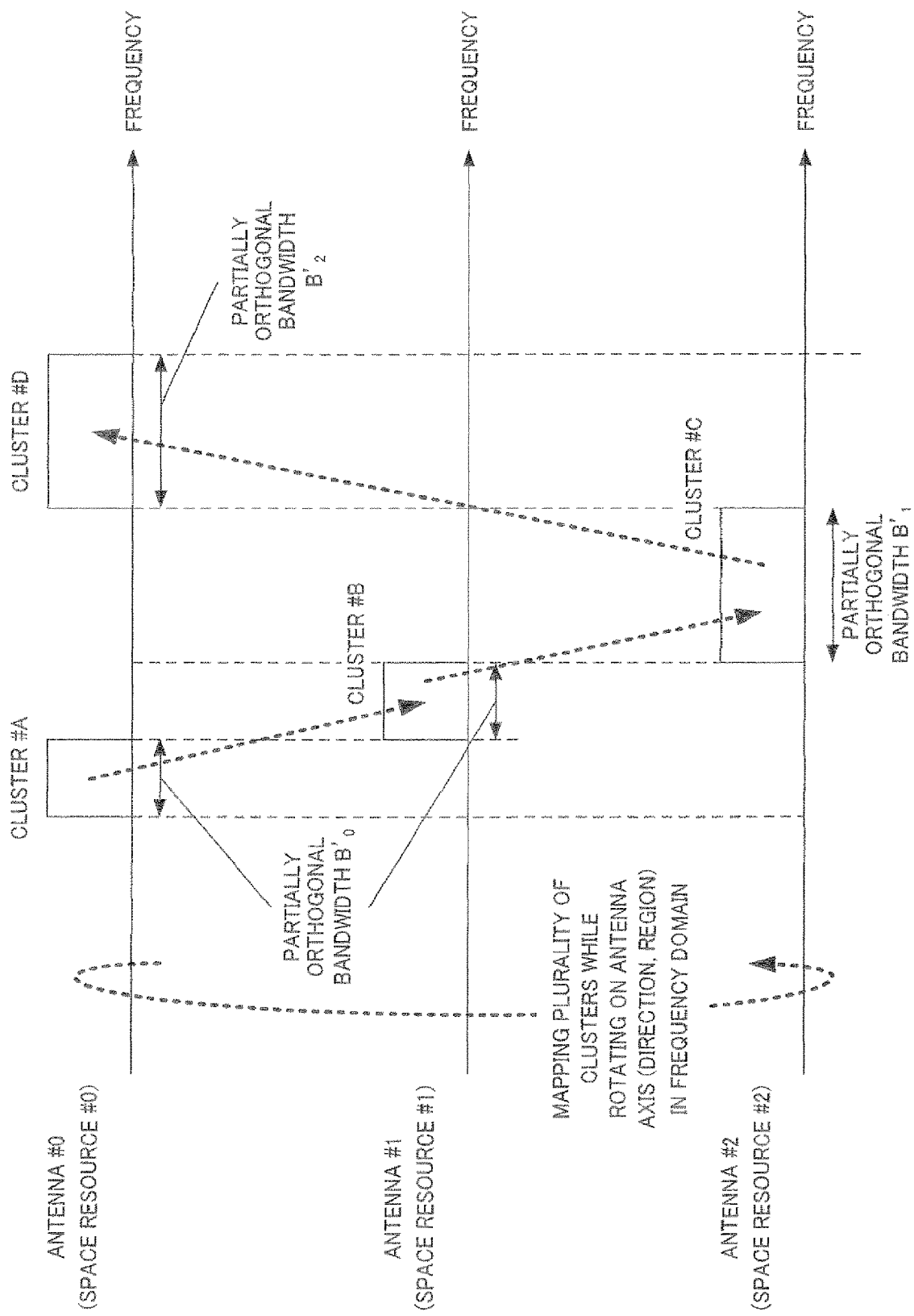
FIG. 13 is a diagram showing processing using FSTD according to Embodiment 3 of the present invention.

The present invention may also use a method of mapping a plurality of clusters having partially orthogonal bandwidths so as to rotate the antenna axis (or antenna direction, space resource region) in the frequency domain as the method of mapping the plurality of clusters having partially orthogonal bandwidths to the plurality of antennas. FIG. 13 shows a case where the terminal maps a plurality of clusters (clusters #A, #B, #C, #D) to antennas #0 to #2 (space resources #0 to #2) in such a way that the clusters rotate in the same direction of the antenna axis (or antenna direction, space resource region) in order from a low frequency to a high frequency. To be more specific, as shown in FIG. 13, the terminal maps cluster #A to antenna #0 (space resource #0), maps cluster #B to antenna #1 (space resource #1), maps cluster #C to antenna #2 (space resource #2) and maps cluster #D to antenna #0 (space resource #0). That is, in FIG. 13, the terminal maps clusters #A, #B, #C and #D so as to rotate in the same direction of the antenna axis (or antenna direction, space resource region) (that is, in the rotating direction in which the antenna number (space resource number) cyclically increases as the frequency increases) in order of antennas #0, #1, #2, #0, . . . . Furthermore, as shown in FIG. 13, four clusters #A, #B, #C and #D are mapped to continuous frequency bands when viewed in the frequency domain of all antennas as in the case of FIG. 12.

Thus, since the frequency domain of antennas (space resources) to which a plurality of clusters are mapped is set cyclically, only one piece of frequency resource allocation information (continuous frequency resources or non-continuous frequency resources) needs to be reported to the plurality of antennas as frequency resource allocation information when the plurality of clusters are mapped to the frequency domain of the plurality of antennas. Thus, it is possible to obtain effects similar to the present embodiment while reducing the amount of information required to allocate frequency resources to the respective antennas. By sharing information on the rotating direction on the antenna axis (space resource region) (e.g. the rotating direction in which the antenna number (space resource number, layer number) cyclically increases (decreases) as the frequency increases (decreases)) between the base station and the terminal, only one piece of frequency resource allocation information needs to be reported to the plurality of antennas as control information from the base station to the terminal.

FIG. 13 has described a case with the rotating direction in which the antenna number (space resource number) of the antenna to which each cluster is mapped cyclically increases as the frequency increases as an example. However, in the present invention, the rotating direction of the antenna axis (space resource region) in the frequency domain may also be a rotating direction in which the antenna number (space resource number, layer number) cyclically decreases as the frequency increases.

Furthermore, the rotating direction of the antenna axis (space resource region) may also be switched for every certain frequency band (subband unit made up of a plurality of subcarriers, resource block unit or resource block group unit or the like). Alternatively, the rotating direction of the antenna axis (space resource region) may also be switched for every certain time unit (symbol unit, slot unit, subframe unit or number of retransmissions is performed or the like). Alternatively, the rotating direction of the antenna axis (space resource region) may also be switched for every certain time-frequency unit made up of two-dimensional resources of the time domain and the frequency domain. For example, a frequency band allocated to a terminal may be divided into two portions and a plurality of clusters having partially orthogonal bandwidths may be mapped to a plurality of antennas in the rotating direction in which the antenna number of an antenna to which each cluster is mapped cyclically increases as the frequency increases in one frequency band and in the rotating direction in which the antenna number of an antenna to which each cluster is mapped cyclically decreases as the frequency increases in the other frequency band. Furthermore, when, for example, one codeword made up of a plurality of symbols is mapped over two slots (e.g. first slot and second slot), a plurality of clusters having partially orthogonal bandwidths may be mapped to a plurality of antennas in the rotating direction in which the antenna number of an antenna to which each cluster is mapped cyclically increases as the frequency increases in the first slot and in the rotating direction in which the antenna number of an antenna to which each cluster is mapped cyclically decreases as the frequency increases in the second slot. Thus, it is possible to increase randomness of channels in the frequency domain (or time domain) while maintaining a partially orthogonal relationship in each cluster and thereby further improve the diversity effect.

Furthermore, a case has been described in FIG. 13 where the antenna number of an antenna to which each cluster is mapped is rotated in the same direction of the antenna axis (or antenna direction, space resource region) in order from a lowest frequency and a plurality of clusters are mapped to the antennas (space resources). However, the present invention may also be adapted so that the antenna number of an antenna to which each cluster is mapped is rotated in the same direction of the antenna axis (or antenna direction, space resource region) in order from a higher frequency and a plurality of clusters are mapped to the antennas (space resources).

Furthermore, a case has been described in FIG. 13 where the terminal maps the clusters to a plurality of antennas over continuous frequency bands while rotating four clusters #A to #D among different antennas (antennas #0 to #2) as an example. However, in the present invention, the terminal may also map the clusters to non-continuous frequency bands over a plurality of antennas while rotating the plurality of clusters among different antennas in the same way as in FIG. 11. That is, in FIG. 13, there may be a vacant frequency band (frequency band to which no cluster is allocated) between any clusters; between cluster #A of antenna #0 and cluster #B of antenna #1, between cluster #B of antenna #1 and cluster #C of antenna #2 and between cluster #C of antenna #2 and cluster #D of antenna #0.

Embodiment 4

<Division method 1-4> of Embodiment 1 has described a case where division section 111 (FIG. 1) divides an SC-FDMA signal with partially orthogonal bandwidth B' corresponding to vector length N' in (1) to (5) shown below.

(1) Power of prime number $x_0$:

$N'=x_0^{a_0}$ (where $a_0$ is an integer equal to or greater than 1)

(2) Power of a product of at least two prime numbers (two or more prime numbers) of prime numbers $x_0$, $x_1$, $x_2$, ... :

$N'=(x_0*x_1)^{b_0}$ (where $b_0$ is an integer equal to or greater than 1)

(3) A multiple of a power of a product of at least two prime numbers (two or more prime numbers) of prime numbers $x_0$, $x_1$, $x_2$, ... :

$N'=p_0(x_0*x_1)^{b_0}$ (where $p_0$ is an integer equal to or greater than 1)

(4) A product of at least two (two or more) of powers $x_0^{c_0}$, $x_1^{c_1}$, ... ($c_0$, $c_1$, ... is an integer equal to or greater than 0, however at least one of $c_0$, $c_1$, ... is an integer equal to or greater than 1) of prime numbers $x_0$, $x_1$, ... :

$N'=x_0^{c_0}*x_1^{c_1}*\ldots$ (5) A multiple of a product of powers of prime numbers $x_0^{c_0}*x_1^{c_1}*\ldots$ :

$N'=p_0(x_0^{c_0}*x_1^{c_1}*\ldots)$ (where $p_0$ is an integer equal to or greater than 1)

Here, a product of prime numbers (e.g. $(x_0*x_1)$) or a product of powers of prime numbers (e.g. $(x_0^{c_0}*x_1^{c_1})$) is represented by a finite number of values equal to or greater than 2 (e.g. two numerical values of $x_0$ and $x_1$ or two numerical values of $x_0^{c_0}$ and $x_1^{c_1}$). That is, when a prime number which is the base of a power is represented by $x_i$ (i=0 to M−1) and the exponent of the power is represented by $c_i$ (i=0 to M−1), M becomes a finite value showing an integer of 2 or more.

The present embodiment is different from <division method 1-4> in Embodiment 1 in that coefficients of powers (that is, exponents of powers) $c_0$, $c_1$, ..., $c_{M-1}$ are made related to the bases of the powers (that is, prime numbers) $x_0$, $x_1$, ..., $x_{M-1}$ in the division method using vector length N' in above (4) and vector length N' in (5) described in <division method 1-4> of Embodiment 1.

To be more specific, when the base (prime number) of power is represented by $x_i$ (i=0 to M−1) and the exponent of the power thereof is represented by $c_i$ (i=0 to M−1), control section 106 (FIG. 1) of terminal 100 according to the present embodiment sets the value of $c_i$ corresponding to $x_i$ to a value equal to or smaller than the exponent of the power having a greater base for the product of powers $x_0^{c_0}*x_1^{c_1}*\ldots*x_{M-1}^{cM-1}$ as the value of $x_i$ increases. That is, when the base (prime number) of the power has a relationship of $x_i<x_{i'}$ (i≠i'), control section 106 sets exponent $c_i$ corresponding to base of power $x_i$ so as to be $c_i\geq c_{i'}$ (i≠i'). Therefore, when the bases of power have a relationship of $x_0<x_1<x_2<\ldots<x_{M-1}$, control section 106 sets exponents corresponding to the bases of powers so as to have a relationship of $c_0\geq c_1\geq c_2\geq\ldots\geq c_{M-1}$. Control section 106 calculates vector length $N'=x_0^{c_0}*x_1^{c_1}*\ldots*x_{M-1}^{cM-1}$ (corresponds to vector length N' in (4) of <division method 1-4>) or vector length $N'=p_0(x_0^{c_0}*x_1^{c_1}*\ldots*x_{M-1}^{cM-1})$ (corresponds to vector length N' in (5) of <division method 1-4>). Division section 111 then divides the SC-FDMA signal with vector length N' or partially orthogonal bandwidth B' corresponding thereto. That is, division section 111 divides the SC-FDMA signal with a partially orthogonal bandwidth corresponding to vector length N' where value of exponent $c_i$ of certain power $x_i^{ci}$ (i is one of 0 to (M−1)) among a plurality of powers ($x_0^{c_0}$, $x_1^{c_1}$, ..., $x_{M-1}^{cM-1}$) constituting a product ($x_0^{c_0}*x_1^{c_1}*\ldots*x_{M-1}^{cM-1}$) of powers representing vector length N' becomes equal to or smaller than value of exponent $c_{i'}$ of another power $x_{i'}^{ci'}$ having a smaller base than base $x_i$ of the certain power $x_i^{ci}$ (that is, a power corresponding to $x_{i'}<x_i$, where i'≠i) and becomes equal to or greater than value of exponent $c_{i''}$ of another power having a base greater than base $x_i$ of certain power $x_i^{ci}$ (that is, a power corresponding to $x_{i''}>x_i$, where i"≠i). Mapping section 112 maps the plurality of clusters generated by dividing the SC-FDMA signal to non-continuous frequency bands.

Thus, it is possible to increase the number of combinations of partially orthogonal column vectors having a shorter cycle in each cluster of a partially orthogonal band (length) represented by equation 1 and equation 2 and thereby further reduce ISI.

Hereinafter, a case will be described as an example where vector length N' ($=x_0^{c_0}*x_1^{c_1}*\ldots*x_1^{cM-1}$) in (4) of <division method 1-4> of Embodiment 1 is used. Here, suppose M=3 and the base of each power is $x_0$=2, $x_1$=3, $x_2$=5 (that is, $x_0\leq x_1<x_2$). Furthermore, a comparison will be made in the number of column vectors partially orthogonal to each other in clusters in the case where the exponent is $C_0<c_1<c_2$ (example 1) and $C_0\geq c_1\geq c_2$ (example 2, that is, the present embodiment).

First, a case with $c_0$=0, $c_1$=1, $c_2$=2 ($c_0<c_1<c_2$) will be described as example 1. In this case, terminal 100 divides an SC-FDMA signal and generates a cluster having vector length $N'=2^0*3^1*5^2=75$. Here, in the cluster of vector length N'=75, column vectors having cycles of 1, 3, 5, 15, 25 and 75 are partially orthogonal to each other. Therefore, the number of column vectors which are partially orthogonal to each other in the cluster is 6.

On the other hand, a case with $c_0$=2, $c_1$=1, $c_2$=1 will be described as a case in example 2 (that is, the present embodiment). In this case, terminal 100 divides an SC-FDMA signal and generates a cluster of vector length $N'=2^2*3^1*5^1=60$. Here, in the cluster of vector length N'=60, column vectors having cycles of 1, 2, 3, 4, 5, 6, 10, 12, 15, 20, 30 and 60 are partially orthogonal to each other. Therefore, the number of column vectors which are partially orthogonal to each other in the cluster is 12.

When example 1 is compared with example 2, in (example 2: the present embodiment), the cluster size (N'=60) of the cluster is smaller than the cluster size (N'=75) of the cluster in example 1, but it is possible to produce a greater number of column vectors which are partially orthogonal to each other in the cluster. That is, when the cluster size (here, vector length N') increases, it is generally possible to increase the number of column vectors of the DFT matrix which are partially orthogonal to each other in the cluster, whereas the present embodiment can increase the number of combinations of column vectors which have a shorter cycle and are partially orthogonal to each other in the cluster. Thus, even when the bandwidth of the cluster is narrow (even when the length of the cluster is short), the number of partially orthogonal vectors in the cluster can be increased. Therefore, compared to <division method 1-4> in Embodiment 1, the present embodiment can further reduce ISI caused by the loss of orthogonality of the DFT matrix in the cluster.

In the present invention, the division method using the relationship between the base of the power ($x_0 < x_1 < x_2 < \ldots < x_{M-1}$) and the exponent of the power ($c_0 \geq c_1 \geq c_2 \geq \ldots \geq c_{M-1}$) may be applied to all cluster sizes. When, for example, two clusters are generated from an SC-FDMA signal (spectrum) generated through DFT processing with N=420 points, the terminal may divide the SC-FDMA signal after setting the cluster sizes of the two clusters to 360 and 60 respectively and map the two clusters to non-continuous bands. Here, since 360 and 60 can be expressed by $360=2^3*3^2*5^1$ and $60=2^2*3^1*5^1$, both cluster sizes satisfy the condition (relationship between the base of the power ($x_0 < x_1 < x_2 < \ldots < x_{M-1}$) and the exponent of the power ($c_0 \geq c_1 \geq c_2 \geq \ldots \geq c_{M-1}$)) in the present embodiment. This makes it possible to increase the number of column vectors of the DFT matrix having a partially orthogonal relationship in all clusters and thereby further reduce ISI caused by the loss of orthogonality of the DFT matrix in all non-continuously allocated bands.

Furthermore, in the present invention, when, for example, the base of the power becomes $x_0 < x_1 < \ldots < x_{M'-1}$ and the exponent of the power becomes $c_0 \geq c_1 \geq \ldots \geq c_{M'-1}$, the terminal can set vector length N' ($=x_0^{c0}*x_1^{c1}* \ldots *x_{M'-1}^{cM'-1}<N$) to minimum division unit X when generating clusters. Here, M' is a finite number showing an integer equal to or greater than 2. The terminal (division section 111) may generate a plurality of clusters by dividing the SC-FDMA signal with a partially orthogonal bandwidth of multiple $p_0 X$ (where $p_0$ is an integer equal to or greater than 1) of minimum division unit X thereof.

Thus, it is possible to create (partially) orthogonal relationships in all clusters in a vector length of minimum division unit X where a greater number of column vectors in a partially orthogonal relationship can be secured. Furthermore, with a cluster having a cluster size of $p_0 X$ ($p_0 \geq 2$) greater than minimum division unit X, it is possible to create a number of partially orthogonal relationships greater than the number of column vectors which have a partially orthogonal relationship in the length of minimum division unit X between column vectors in the cluster. That is, it is possible to secure an ISI reduction effect obtained by minimum division unit X in all clusters generated by dividing the SC-FDMA signal. Furthermore, by sharing minimum division unit X between the base station and the terminal in this case, only multiplier $p_0$ may be reported from the base station to the terminal (or from the terminal to the base station) as control information on the division. This allows the amount of information required to report the control information to be reduced.

Furthermore, when setting minimum division unit X (vector length N')=$x_0^{c0}*x_1^{c1}* \ldots *x_{M'-1}^{cM'-1}$(<N) in generating clusters, dividing the SC-FDMA signal with multiple $p_0 X$ (where $p_0$ is an integer equal to or greater than 1) of minimum division unit X thereof and generating a plurality of clusters, the present invention may represent multiplier $p_0$ by a product of powers using a combination ($x_0, x_1, \ldots, x_{M'-1}$) of minimum division unit X and the same base of the power (prime number). That is, the present invention may also set multiplier $p_0$ represented by $p_0=x_0^{d0}*x_1^{d1}* \ldots *x_{M'-1}^{dM'-1}$ ($d_0, d_1, \ldots, d_{M'-1}$ is an integer equal to or greater than 0, where at least one of $d_0, d_1, \ldots, d_{M'-1}$ is an integer equal to or greater than 1). That is, the terminal (division section) divides the SC-FDMA signal with a partially orthogonal bandwidth corresponding to multiple $p_0 X$ calculated by multiplying minimum division unit X by multiplier $p_0$ represented by a product ($x_0^{d0}*x_1^{d1}* \ldots *x_{M'-1}^{dM'-1}$) of powers using a combination ($x_0, x_1, \ldots, x_{M'-1}$) of the same base as the combination ($x_0, x_1, \ldots, x_{M'-1}$) of a plurality of bases of powers constituting a product of powers ($x_0^{c0}*x_1^{c1}* \ldots *x_{M'-1}^{cM'-1}$) representing minimum division unit X. When multiplier $p_0$ is set in this way, the size of a cluster generated in a length (bandwidth) $p_0$ times minimum division unit X can be represented by $p_0 X = x_0^{(c0+d0)}*x_1^{(c1+d1)}* \ldots *x_{M'-1}^{(c(M'-1)+d(m'-1))}$. That is, in that cluster, it is possible to increase the number of combinations of hierarchically partially orthogonal column vectors in lengths of the power of $x_0$, power of $x_1$, $\ldots$, power of $x_{M'-1}$. By this means, it is possible to create partially orthogonal relationships between column vectors of the DFT matrix in a cycle of the power of $x_i$ (i=0 to M'-1) in all clusters generated by dividing the SC-FDMA signal and thereby further improve the ISI reduction effect in a cluster having a length (bandwidth) of $p_0 X$.

Furthermore, in the method of setting aforementioned multiplier $p_0 = x_0^{d0}*x_1^{d1}* \ldots *x_{M'-1}^{dM'-1}$ ($d_0, d_1, \ldots, d_{M'-1}$ is an integer equal to or greater than 0, where at least one of $d_0, d_1, \ldots, d_{M'-1}$ is an integer equal to or greater than 1) of the present invention, the terminal may set exponent $d_i$ corresponding to a plurality of powers constituting a product of powers representing multiplier $p_0$ to an equal value or a smaller value as the value of $x_i$ increases for the bases of powers ($x_0, x_1, \ldots, x_{M'-1}$) and the exponents of powers ($d_0, d_1, \ldots, d_{M'-1}$). That is, when the base of the power (prime number) of multiplier $p_0$ has a relationship of $x_i < x_{i'}$ (i≠i'), the terminal sets exponent $d_i$ corresponding to base $x_i$ so as to satisfy $d_i \geq d_{i'}$ (i≠i'). Therefore, when the base of the power of multiplier $p_0$ has a relationship of $x_0 < x_1 < x_2 < \ldots < x_{M'-1}$, the terminal may set multiplier $p_0$ so that the exponents have a relationship of $d_0 \geq d_1 \geq d_2 \geq \ldots \geq d_{M'-1}$. That is, the terminal (division section) divides the SC-FDMA signal with a partially orthogonal bandwidth corresponding to multiple $p_0 X$ calculated by multiplying minimum division unit X by multiplier $p_0$ where among a plurality of powers constituting a product of powers ($x_0^{d0}*x_1^{d1}* \ldots *x_{M'-1}^{dM'-1}$) representing multiplier $p_0$, exponent value $d_i$ of certain power $x_i^{di}$ becomes equal to or smaller than exponent value $d_{i'}$ of power $x_{i'}^{di'}$ having a smaller base than base $x_i$ of certain power $x_i^{di}$ (that is, power corresponding to $x_{i'} < x_i$, where i'≠i) and becomes equal to or greater than exponent value $d_{i''}$ of power $x_{i''}^{di''}$ having a greater base than base $x_i$ of certain power $x_i^{di}$ (that is, power corresponding to $x_{i''} > x_i$, where i''≠i)

This allows a relationship of $(c_0+d_0) \geq (c_1+d_1) \geq \ldots \geq (c_{M'-1}+d_{M'-1})$ to be created with a cluster whose length (bandwidth) can be represented by $p_0 X = x_0^{(c0+d0)} * x_1^{(c1+d1)} * \ldots * x_{M'-1}^{(cM'-1+dM'-1)}$. That is, in a cluster having a length (bandwidth) of $p_0 X$, it is possible to increase the number of combinations of column vectors which have a shorter cycle and are hierarchically partially orthogonal to each other. This makes it possible to create partially orthogonal relationships between column vectors of the DFT matrix even in a cycle of a power of $x_i$ (i=0 to M'−1) in all clusters generated by dividing an SC-FDMA signal and thereby further reduce ISI.

FIG. 14 shows cluster size N' assuming M=3 and minimum division unit $X=12=2^2 * 3^1 * 5^0$ (that is, $x_0(=2) < x_1(=3) < x_2(=5)$, $c_0(=2) \geq c_1(=1) \geq c_2(=0)$) wherein multiplier $p_0 = x_0^{d0} * x_1^{d1} * \ldots * x_{M'-1}^{dM'-1}$ has a relationship of $x_0 < x_1 < x_2 < \ldots < x_{M'-1}$ and $d_0 \geq d_1 \geq d_2 \geq \ldots \geq d_{M'-1}$ (where M'=3). FIG. 14 shows a case with M=M' (=3) as an example, but M≠M' may also be applicable. For example, in the case with number #3 shown in FIG. 14, since multiplier $p_0 = 6 = 2^1 * 3^1 * 5^0$, cluster size $N' = p_0 X = 72 = 2^3 * 3^2 * 5^0$, satisfying a relationship of $(c_0+d_0)(=3) \geq (c_1+d_1)(=2) \geq (c_2+d_2)(=0)$. That is, in a cluster of vector length N'=72, it is possible to create combinations of column vectors which have a shorter cycle such as 2, 3, 4, 6, 8, 9, . . . and in which column vectors of the DFT matrix are made to be hierarchically partially orthogonal in lengths of a power of 2, power of 3, power of 4, . . . .

Furthermore, as described in <division method 1-3> of Embodiment 1, when the SC-FDMA signal is divided with partially orthogonal bandwidth B' corresponding to vector length N' which is a multiple of a prime number ($N' = a_0 x_0$ (where the prime number is $x_0$, coefficient $a_0$ is an integer equal to or greater than 1)), that is, when the SC-FDMA signal is divided assuming that $x_0$ is a minimum division unit and that the cluster size of each cluster is a length corresponding to a multiple of the minimum division unit, the multiplier (coefficient $a_0$) may be power $x_0^{d0}$ of prime number $x_0$ (here, $d_0$ is an integer equal to or greater than 0). This makes it possible to increase the number of combinations of column vectors which are hierarchically partially orthogonal in a cycle of a power of $x_0$ in a cluster having a length of $a_0 x_0 (= x_0^{d0+1})$ and thereby further reduce ISI more than <division method 1-3> of Embodiment 1.

Furthermore, as described in <division method 1-3> of Embodiment 1, when the SC-FDMA signal is divided with partially orthogonal bandwidth B' corresponding to vector length N' which is a multiple of a product of two or more prime numbers (e.g. $N' = b_0 (x_0 * x_1)$ (where $x_0$ and $x_1$ are prime numbers, coefficient $b_0$ is an integer equal to or greater than 1), that is, when the SC-FDMA signal is divided using ($x_0 * x_1$) as a minimum division unit and assuming the size of each cluster to be a length corresponding to a multiple of the minimum division unit, the multiplier (coefficient $b_0$) may be power $(x_0 * x_1)^{d0}$ of a product $(x_0 * x_1)$ of the prime numbers (here, $d_0$ is an integer equal to or greater than 0). This makes it possible to increase the number of combinations of column vectors which are hierarchically partially orthogonal in a cycle of powers of $x_0$, $x_1$ and $(x_0 * x_1)$ of a cluster having a length of $b_0 (x_0 * x_1)(=(x_0 * x_1)^{d0+1})$ and thereby further reduce ISI more than <division method 1-3> of Embodiment 1.

Embodiment 5

A case has been described in Embodiment 1 and Embodiment 4 where as shown in FIG. 1, the division section is connected to the DFT section of the terminal, the output signal (DFT output) of the DFT section is directly divided using the aforementioned division method and a plurality of clusters are thereby generated. By contrast, the present embodiment will describe a case where a shifting section is provided between the DFT section and the division section. To be more specific, the terminal according to the present embodiment causes the shifting section to cyclically frequency-shift DFT output (SC-FDMA signal (spectrum)) outputted from the DFT section, divide the SC-FDMA signal after the cyclical frequency shift among partially orthogonal bandwidths (lengths) and generate a plurality of clusters.

Figure 15:
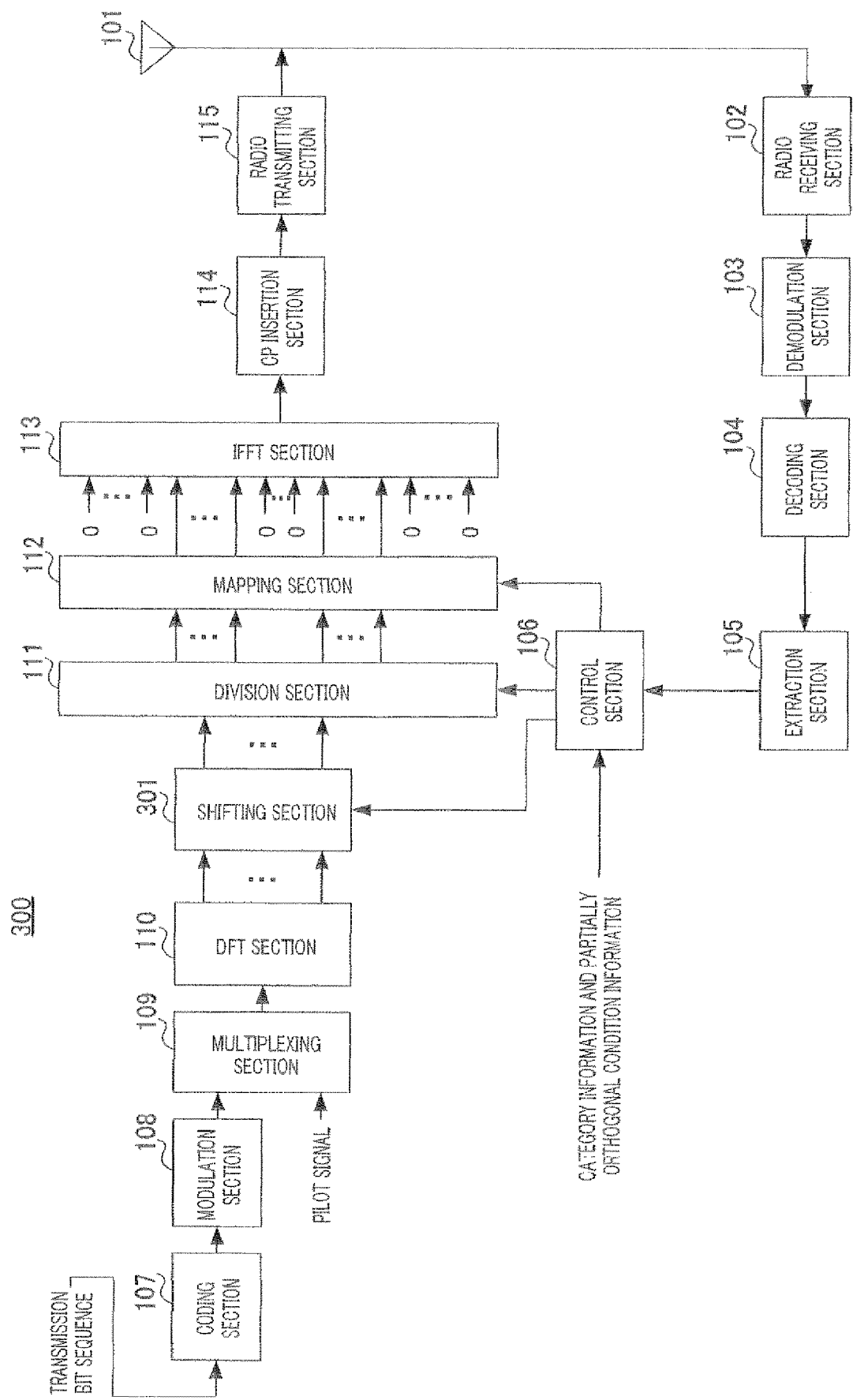
FIG. 15 is a block diagram of a terminal according to Embodiment 5 of the present invention.

FIG. 15 shows a configuration of a transmitting apparatus (terminal) according to the present embodiment. In terminal 300 shown in FIG. 15, the same components as those in Embodiment 1 (FIG. 1) will be assigned the same reference numerals and descriptions thereof will be omitted.

Shifting section 301 receives a frequency domain signal (SC-FDMA signal) generated by applying DFT processing to a time domain symbol sequence from DFT section 110 as input and receives an amount of shift (amount of cyclic frequency shift) in a frequency domain set by the base station (or terminal 300) from control section 106 as input. Shifting section 301 then cyclically frequency-shifts the SC-FDMA signal inputted from DFT section 110 within a DFT band (DFT size N) in DFT processing by DFT section 110 according to the amount of cyclic frequency shift inputted from control section 106. That is, shifting section 301 applies cyclic frequency shift to the SC-FDMA signal within the DFT band. Shifting section 301 may also be configured so as not to cyclically frequency-shift the SC-FDMA signal (spectrum) of the pilot symbol of the sequence in which the data symbol and pilot symbol inputted to shifting section 301 are time-multiplexed. Shifting section 301 outputs the cyclically frequency-shifted SC-FDMA signal to division section 111. Details of the cyclic frequency shifting processing on the SC-FDMA signal (spectrum) by shifting section 301 will be described later.

Division section 111 divides the cyclically frequency-shifted SC-FDMA signal inputted from shifting section 301 with partially orthogonal length (vector length) N' and generates a plurality of clusters using one of the division methods described in the aforementioned embodiments (e.g. Embodiment 1 or Embodiment 4).

Figure 16:
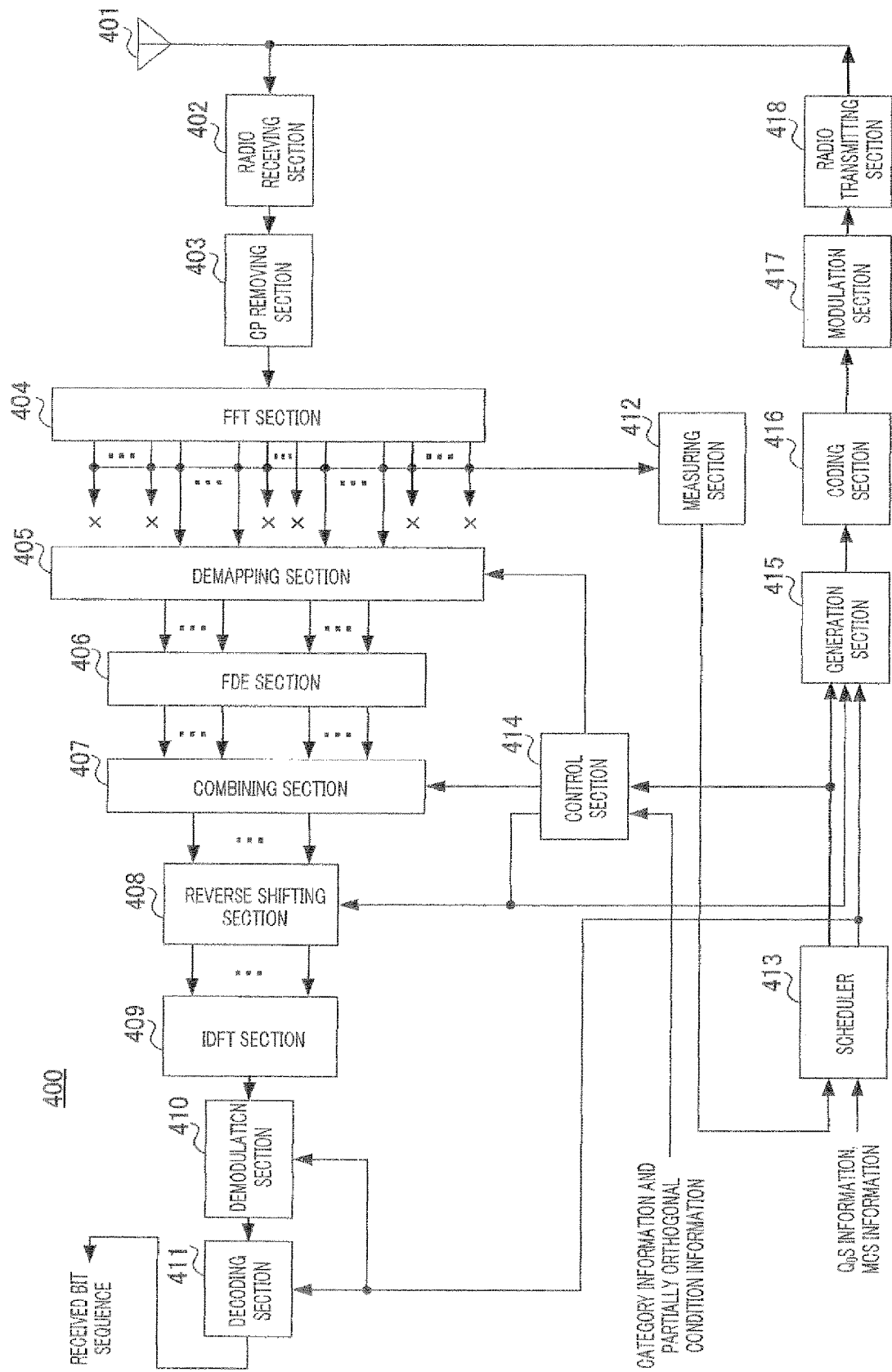
FIG. 16 is a block diagram of a base station according to Embodiment 5 of the present invention.

Next, FIG. 16 shows the configuration of a receiving apparatus (base station) according to the present embodiment. Base station 400 shown in FIG. 16 determines allocation of uplink frequency resources, parameters (cluster size and number of clusters or the like) about spectral division at each terminal and amount of cyclic frequency shift and reports the determined information to each terminal as information to be reported. Base station 400 may also report information on frequency resource allocation taking account of influences of spectral division and the amount of cyclic frequency shift based on parameters about spectral division to the terminal. Each terminal (terminal 300) then divides the cyclically frequency-shifted SC-FDMA signal (spectrum) based on parameters about spectral division included in the information reported from base station 400.

In the configuration of receiving apparatus (base station 400) shown in FIG. 16, the configuration except reverse shifting section 408, that is, the configuration in which an output signal from combining section 407 is directly inputted to IDFT section 409 corresponds to the configuration of the receiving apparatus (base station) (not shown) of Embodiment 1.

The receiving apparatus (base station 400) shown in FIG. 16 is comprised of antenna 401, radio receiving section 402, CP removing section 403, FFT section 404, demapping section 405, FDE section 406, combining section 407, reverse shifting section 408, IDFT section 409, demodulation section 410, decoding section 411, measuring section 412, scheduler 413, control section 414, generation section 415, coding section 416, modulation section 417 and radio transmitting section 418.

Radio receiving section 402 of base station 400 receives an uplink C-SC-FDMA signal transmitted from each terminal via antenna 401 and applies reception processing such as down-conversion, A/D conversion to the C-SC-FDMA signal. Radio receiving section 402 outputs the C-SC-FDMA signal subjected to the reception processing to CP removing section 403.

CP removing section 403 removes a CP added at the head of the C-SC-FDMA signal inputted from radio receiving section 402 and outputs the C-SC-FDMA signal after the removal of the CP to FFT (Fast Fourier Transform) section 404.

FFT section 404 applies FFT to the C-SC-FDMA signal after the removal of the CP inputted from CP removing section 403 to convert the C-SC-FDMA signal to frequency domain C-SC-FDMA signals, that is, subcarrier components (orthogonal frequency components). FFT section 404 outputs the subcarrier components after the FFT to demapping section 405. Furthermore, when a subcarrier component after the FFT is a pilot signal, FFT section 404 outputs the subcarrier component to measuring section 412.

Demapping section 405 demaps (extracts) a C-SC-FDMA signal (data signal) allocated to each subcarrier component (orthogonal frequency component) of a frequency resource used by a target terminal from the subcarrier components inputted from FFT section 404 based on frequency resource mapping information of the terminal inputted from control section 414. Demapping section 405 then outputs the demapped C-SC-FDMA signal to FDE section 406.

FDE section 406 calculates an FDE weight based on an estimate value of a frequency channel gain between each terminal and base station 400 estimated by an estimation section (not shown) and equalizes the C-SC-FDMA signals inputted from demapping section 405 in the frequency domain using the calculated FDE weight. FDE section 406 then outputs the signal after the FDE to combining section 407.

Combining section 407 combines the C-SC-FDMA signals (that is, C-SC-FDMA signals (spectra) after the FDE made up of a plurality of clusters) inputted from FDE section 406 in the frequency domain based on the cluster size and the number of clusters inputted from control section 414. Combining section 407 then outputs the combined C-SC-FDMA signal to reverse shifting section 408.

Reverse shifting section 408 cyclically frequency-shifts in the direction opposite to the direction of shifting section 301 of terminal 300 (that is, reverse cyclic frequency-shifts) the combined C-SC-FDMA signal (spectrum) after the FDE according to the amount of cyclic frequency shift inputted from control section 414 (the same amount of cyclic frequency shift as the amount of cyclic frequency shift used by shifting section 301 of terminal 300). When, for example, the amount of cyclic frequency shift of shifting section 301 of terminal 300 is $+z(-z)$, reverse shifting section 408 of base station 400 performs a $-z(+z)$ cyclic frequency shift on the combined signal after the FDE. Reverse shifting section 408 then outputs the C-SC-FDMA signal after the reverse cyclic frequency shift to IDFT section 409.

IDFT section 409 applies IDFT processing to the C-SC-FDMA signal inputted from reverse shifting section 408 (C-SC-FDMA signal (spectrum) combined after the FDE and subjected to a reverse cyclic frequency shift) and thereby transforms the C-SC-FDMA signal to a time domain signal. IDFT section 409 then outputs the time domain signal to demodulation section 410.

Demodulation section 410 demodulates the time domain signal inputted from IDFT section 409 based on MCS information (modulation scheme) inputted from scheduler 413 and outputs the demodulated signal to decoding section 411.

Decoding section 411 decodes the signal inputted from demodulation section 410 based on MCS information (coding rate) inputted from scheduler 413 and outputs the decoded signal as a received bit sequence.

On the other hand, measuring section 412 measures channel quality of each terminal in the frequency domain, for example, SINR (Signal-to-Interference plus Noise power Ratio) for each subcarrier of each terminal using pilot signals (pilot signals transmitted from each terminal) included in subcarrier components inputted from FFT section 404 and thereby generates channel quality information (CQI) of each terminal. Measuring section 412 then outputs the CQI of each terminal to scheduler 413.

Scheduler 413 calculates priority of allocation of uplink shared frequency resources (PUSCH: Physical Uplink Shared CHannel) to each terminal using inputted information on QoS (Quality of Service) or the like of each terminal. Scheduler 413 then allocates each subcarrier (or frequency resource block RB (Resource Block) made up of a plurality of subcarriers) to each terminal using the calculated priority and the CQI inputted from measuring section 412. PF (Proportional Fairness) or the like may be used as an algorithm used to allocate frequency resources. Furthermore, scheduler 413 outputs frequency resource allocation information of each terminal showing frequency resources of each terminal allocated using the above described method to control section 414 and generation section 415 and outputs control information (MCS information or the like) other than the frequency resource allocation information to demodulation section 410, decoding section 411 and generation section 415.

Control section 414 calculates the number of clusters and the cluster size of the terminal using the frequency resource allocation information of each terminal inputted from scheduler 413, category information of the terminal (information including the DFT size) and partially orthogonal condition information (information showing partially orthogonal condition (equation 1 or 2) of C-SC-FDMA). Furthermore, control section 414 calculates frequency resources to which C-SC-FDMA signals of each terminal are mapped based on the calculated number of clusters and cluster size. Control section 414 then outputs the calculated number of clusters and cluster size to combining section 407 and outputs the frequency resource mapping information showing frequency resources to which the C-SC-FDMA signals of each terminal are mapped to demapping section 405. Furthermore, control section 414 sets an amount of cyclic frequency shift used in reverse shifting section 408 and shifting section 301 of terminal 300 and outputs information on the set amount of cyclic frequency shift to reverse shifting section 408 and generation section 415.

Generation section 415 converts the frequency resource allocation information inputted from scheduler 413, control information (MCS information or the like) other than the frequency resource allocation information and information on the amount of cyclic frequency shift inputted from control section 414 to a binary control bit sequence to be reported to each terminal and thereby generates a control signal. Generation section 415 then outputs the generated control signal to coding section 416.

Coding section 416 codes the control signal inputted from generation section 415 and outputs the coded control signal to modulation section 417.

Modulation section 417 modulates the control signal inputted from coding section 416 and outputs the modulated control signal to radio transmitting section 418.

Radio transmitting section 418 applies transmission processing such as D/A conversion, amplification and up-conversion to the control signal inputted from modulation section 417 and transmits the signal subjected to the transmission processing to each terminal via antenna 401.

Next, details of cyclic frequency shifting processing on an SC-FDMA signal (spectrum) by shifting section 301 of terminal 300 will be described.

Since C-SC-FDMA performs precoding using a DFT matrix, even if DFT output (output signal of DFT processing) is cyclically shifted within a DFT band (DFT size N), it is possible to create a partially orthogonal relationship among column vectors at an arbitrary position of the DFT output as long as the cluster size of clusters generated through division is length N' that satisfies equation 1. The present embodiment takes advantage of this feature.

This will be described more specifically below. That is, a feature in a section where column vectors of the DFT matrix are partially orthogonal to each other will be described.

First, partially orthogonal conditions among column vectors of the DFT matrix in a segment of k=0 to N'−1 of vector length N (section: k=0 to N−1) will be described.

Two column vectors $f_i(k)(=f_i)$ and $(k)(=f_{i'})$ (where i'≠i) having different angular frequencies in the DFT matrix are defined as following equation 3.

[3]

$$\begin{cases} f_i(k) = \frac{1}{\sqrt{N}} e^{-j2\pi \frac{i}{N} k} \\ f_{i'}(k) = \frac{1}{\sqrt{N}} e^{-j2\pi \frac{i'}{N} k} \end{cases} \text{ for } k = 0 \sim N-1 \quad \text{(Equation 3)}$$

In equation 3, N represents a DFT size (the number of DFT points) and i, i'=0 to N−1. Here, of vector length N (section: k=0 to N−1), an inner product (partial cross correlation without time difference) of $f_i(k)$ and $f_{i'}(k)$ in partial vector length N' (segment: k=0 to N'−1) is as shown in following equation 4 (where N'<N).

[4]

$$\sum_{k=0}^{N'-1} f_i(k) f_{i'}^*(k) = \frac{1}{N} \sum_{i=0}^{N'-1} e^{-j2\pi \frac{i-i'}{N} k}$$

$$= \frac{1}{N} e^{-j\pi \frac{i-i'}{N}(N'-1)} \frac{\sin\left(\pi \frac{i-i'}{N} N'\right)}{\sin\left(\pi \frac{i-i'}{N}\right)} \quad \text{(Equation 4)}$$

Superscript * in equation 4 represents a complex conjugate. It is clear from equation 4 that two orthogonal column vectors, that is, two column vectors partially orthogonal at partial vector length N' (segment: k=0 to N'−1) are a combination of column vectors where exp(−j2π(i−i')k/N) of angular frequency 2π(i−i')/N in segment k=0 to N'−1 rotates at least one round. That is, when (i−i')N'/N is an integer where two column vectors $f_i(k)$ and $f_{i'}(k)$ are partially orthogonal to each other in a section of k=0 to N'−1. Therefore, a specific relationship as shown in equation 5 below exists between vector length N' (<N) in which arbitrary two different column vectors $f_i(k)$ and $f_{i'}(k)$ (where i'≠i) of the plurality of column vectors constituting a DFT matrix are partially orthogonal to each other and DFT size (column vector length) N of the DFT matrix.

[5]

$$N' = \left|\frac{I}{i-i'}\right| N = \frac{|I|}{|i-i'|} N \quad \text{(Equation 5)}$$

Here, I is a non-zero integer that satisfies |I|<|i−i'|. That is, when the cluster size is expressed by length N' of equation 5 (or equation 1), it is possible to create a partially orthogonal relationship between column vectors of DFT in the cluster.

Next, partially orthogonal conditions between column vectors of the DFT matrix in a segment of k=z to z+N'−1 of vector length N (section: k=0 to N−1) will be described. Reference character z is an arbitrary real number.

From equation 3, an inner product of $f_i(k)$ and $f_{i'}(k)$ in partial vector length N' (segment: k=z to z+N'−1) of vector length N (section: k=0 to N−1) is as shown in following equation 6) (where N'<N).

[6]

$$\sum_{k=z}^{z+N'-1} f_i(k) f_{i'}^*(k) = \frac{1}{N} \sum_{i=z}^{z+N'-1} e^{-j2\pi \frac{i-i'}{N} k} \quad \text{(Equation 6)}$$

$$= \frac{1}{N} e^{-j\pi \frac{i-i'}{N}(2z+N'-1)} \frac{\sin\left(\pi \frac{i-i'}{N} N'\right)}{\sin\left(\pi \frac{i-i'}{N}\right)}$$

$$= \frac{1}{N} e^{-j\pi \frac{i-i'}{N}(2z)} \times \text{(Equation 4)}$$

In equation 6, superscript * denotes a complex conjugate. From equation 6, since (1/N)exp(−jπ(i−i')(2z)/N)≠0, in order for equation 6 to be 0 requires equation 4 to be 0. Therefore, it is understandable that the condition for column vectors of the DFT matrix to be partially orthogonal to each other in segment k=z to z+N'−1 is also the same as equation 1 described in Embodiment 1 or equation 5 above (partially orthogonal condition in segment k=0 to N'−1).

That is, it is understandable that there is a feature that a partially orthogonal relationship can be created between column vectors at positions (positions of the band) of an arbitrary spectrum of the SC-FDMA signal (spectrum) which is the DFT output as long as the length (bandwidth) of clusters generated by dividing the SC-FDMA signal satisfies the condition of the partially orthogonal vector length N' (bandwidth B') of equation 1 or equation 2 (equation 5). Furthermore, length N' thereof may be cyclic within the DFT band. That is, if only the length (bandwidth) of the cluster satisfies length N', the partially orthogonal relationship between column vectors of the DFT matrix can be maintained, and therefore terminal 300 may apply a cyclic frequency shift to the DFT output in the DFT band.

Figure 17A:
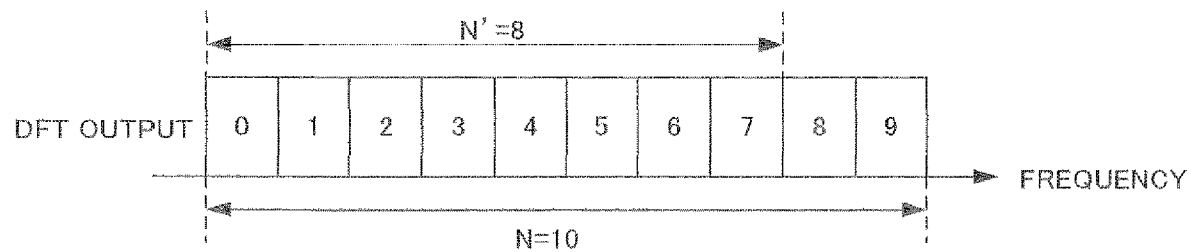
FIG. 17A is a diagram showing shifting processing according to Embodiment 5 of the present invention (when z=0)
Figure 17B:
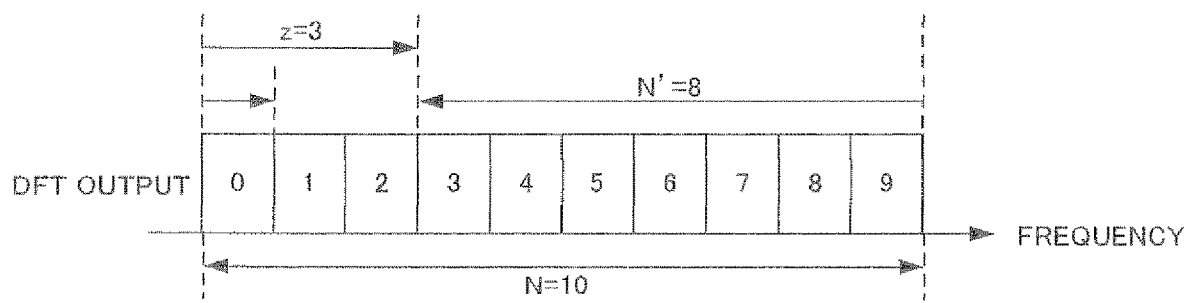
FIG. 17B is a diagram showing shifting processing according to Embodiment 5 of the present invention (when z=3)

FIG. 17A and FIG. 17B show a case where a segment of vector length N'=8 is set when DFT size (the number of points) N=10 (DFT output numbers 0 to 9). Furthermore, in FIG. 17A, a segment of length N'=8 is set to DFT output numbers 0 to 7 (that is, amount of cyclic frequency shift z=0), while in FIG. 17B, a segment of length N'=8 is set to DFT output numbers 3 to 9 and 0 (that is, z=3) cyclically shifted within the DFT band. Here, when length N' (=8) of the segment satisfies equation 1 (or equation 5), a partially orthogonal relationship can be created between column vectors within the band of DFT output numbers 0 to 7 in FIG. 17A and a partially orthogonal relationship can be created between column vectors within the band of DFT output numbers 3 to 9 and 0 in FIG. 17B.

Taking advantage of the above described feature, shifting section 301 of terminal 300 cyclically frequency-shifts the SC-FDMA signal which is the DFT output inputted from DFT section 110 by z points within the DFT band. Division section 111 then divides the SC-FDMA signal after the cyclic frequency shift with a partially orthogonal bandwidth using one of the division methods described in Embodiment 1 or Embodiment 3, and thereby generates a plurality of clusters.

Figure 18A:
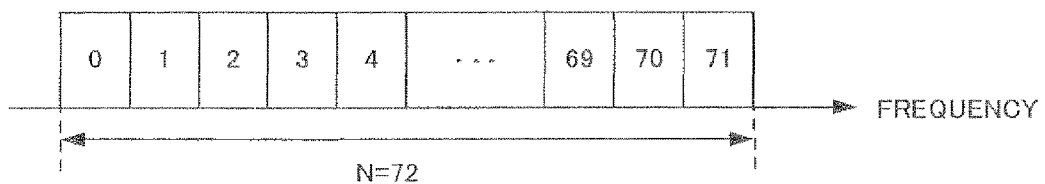
FIG. 18A is a diagram showing DFT output according to Embodiment 5 of the present invention.
Figure 18B:
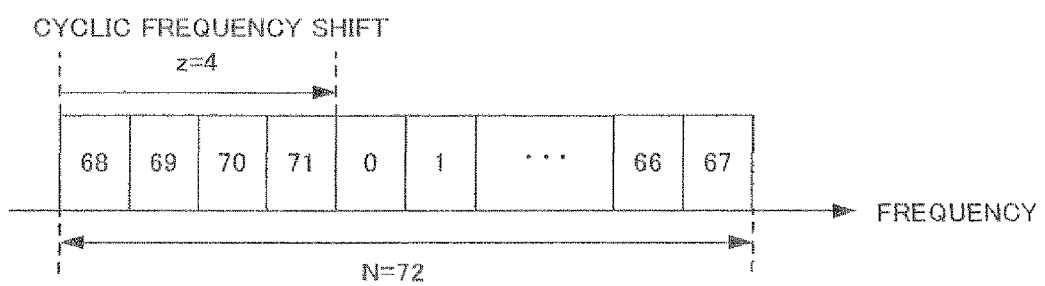
FIG. 18B is a diagram showing shifting processing according to Embodiment 5 of the present invention.
Figure 18C:
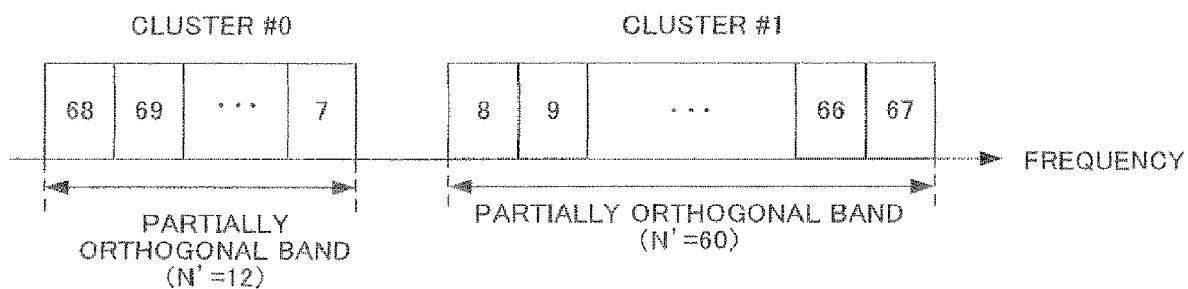
FIG. 18C is a diagram showing division processing and mapping processing according to Embodiment 5 of the present invention.

Here, FIGS. 18A to C show a series of processing steps in shifting section 301 and division section 111. In FIGS. 18A to C, assuming DFT size N=72 points (DFT output numbers 0 to 71), terminal 300 generates two clusters (cluster #0 and cluster #1). Furthermore, here, shifting section 301 cyclically shifts the DFT output from low to high frequencies. Furthermore, FIG. 18A shows 72-point DFT output (SC-FDMA signals) obtained after DFT section 110 performs DFT processing on a time domain symbol sequence.

Shifting section 301 applies a cyclic frequency shift with z=4 (subcarriers) to the DFT output shown in FIG. 18A within the DFT band of N=72 points. Thus, a signal as shown in FIG. 18B in which DFT output numbers 0 to 71 are cyclically shifted by z=4 in a direction from low to high frequencies (that is, DFT output numbers 68 to 71, 0 to 67) is obtained.

As shown in FIG. 18C, division section 111 then divides the signal of 72 points (DFT output numbers 68 to 71, 0 to 67) after the cyclic frequency shift by z=4 (subcarriers) shown in FIG. 18B into two clusters; cluster #0 (DFT output numbers 68 to 71, 0 to 7) having a partially orthogonal bandwidth (vector length N'=12) and cluster #1 (DFT output numbers 8 to 67) having a partially orthogonal bandwidth (vector length N'=60). Mapping section 112 then maps cluster #0 and cluster #1 shown in FIG. 18C to non-continuous frequency bands and thereby obtains C-SC-FDMA signals.

By this means, the present embodiment can improve flexibility of mapping of DFT output on frequency resources (subcarriers) while making column vectors of the DFT matrix partially orthogonal to each other within clusters. When, for example, there is always an interference signal with high power in specific frequency resources, the terminal may cyclically frequency-shift the DFT output before dividing the DFT output (SC-FDMA signal). Thus, by maintaining a partially orthogonal relationship in clusters, it is possible to prevent the DFT output mapped to specific resources from always receiving large interference while reducing ISI. That is, according to the present embodiment, the terminal can perform interference preventing control without changing positions of frequency resources allocated to the SC-FDMA signal.

In the present invention, the direction of a cyclic frequency shift may be a direction from low to high frequencies or a direction from high to low frequencies. That is, the value of cyclic frequency shift z may be plus (+) or minus (−).

Furthermore, a configuration of terminal 300 as shown in FIG. 15 has been described in the present embodiment in which the DFT section→shifting section→division section→mapping section are connected in that order. However, the terminal according to the present invention may also have a configuration (not shown) in which the DFT section→division section→shifting section→mapping section are connected in that order. In this case, the terminal may cyclically frequency-shift a plurality of subcarrier components belonging to each cluster over a plurality of clusters (a plurality of clusters after division not subjected to any cyclic frequency shift) and perform mapping similar to that in FIG. 18C on the plurality of clusters. By this means, even when the connection order of components of the terminal is changed, effects similar to those of the present embodiment can be obtained.

Furthermore, with regard to Fourier transform, instead of the configuration (FIG. 15) of realizing a frequency domain cyclic frequency shift described in the present embodiment, the terminal may also adopt a configuration of multiplying the time domain signal outputted from the IFFT section by phase rotation (and amplitude component) corresponding to a cyclic frequency shift in the frequency domain. That is, instead of the shifting section of the terminal shown in FIG. 15, a configuration (not shown) may also be adopted in which a multiplication section that multiplies the time domain signal outputted from the IFFT section by phase rotation (and amplitude component) corresponding to a cyclic frequency shift in the frequency domain is connected after the IFFT section. Effects similar to those of the present embodiment can be obtained in this case, too.

Furthermore, a configuration the base station as shown in FIG. 16 has been described in the present embodiment in which the demapping section→FDE section→combining section→reverse shifting section→IDFT section are connected in that order. However, the base station according to the present invention may also have a configuration (not shown) in which the demapping section→reverse shifting section→FDE section→combining section→IDFT section are connected in that order or demapping section→FDE section→reverse shifting section→combining section→IDFT section are connected in that order. In the case of the configuration, for example, in order of the demapping section→reverse shifting section→FDE section→combining section→IDFT section, the base station may cause the reverse shifting section to perform a reverse cyclic frequency shift on the demapped signal sequence, cause the FDE section to also perform a reverse cyclic frequency shift on the FDE weight and perform FDE on the demapped signal sequence after the reverse cyclic frequency shift using the FDE weight after the reverse cyclic frequency shift. On the other hand, in the case of the configuration in order of the demapping section→FDE section→reverse shifting section→combining section→IDFT section, the base station may cause the reverse shifting section to perform a reverse cyclic frequency shift on the signal sequence after the FDE and cause the combining section to combine a plurality of clusters after the reverse cyclic frequency shift mapped to non-continuous frequency bands. Even when the connection order of components of the base station is changed in this way, effects similar to those of the present embodiment can be obtained.

Furthermore, with regard to Fourier transform, instead of the configuration (FIG. 16) of performing reverse cyclic frequency shifting in the frequency domain described in the present embodiment, a configuration may also be adopted in which the time domain signal outputted from the IDFT section of the base station may be multiplied by phase rotation (and amplitude component) corresponding to the reverse cyclic frequency shift in the frequency domain. That is, a configuration (not shown) may also be adopted in which instead of the reverse shifting section shown in FIG. 16, a multiplication section that multiplies the time domain signal outputted from the IDFT section by phase rotation (and amplitude component) corresponding to the reverse cyclic frequency shift in the frequency domain is connected after the IDFT section. Effects similar to those of the present embodiment can be obtained in this case, too.

Figure 19:
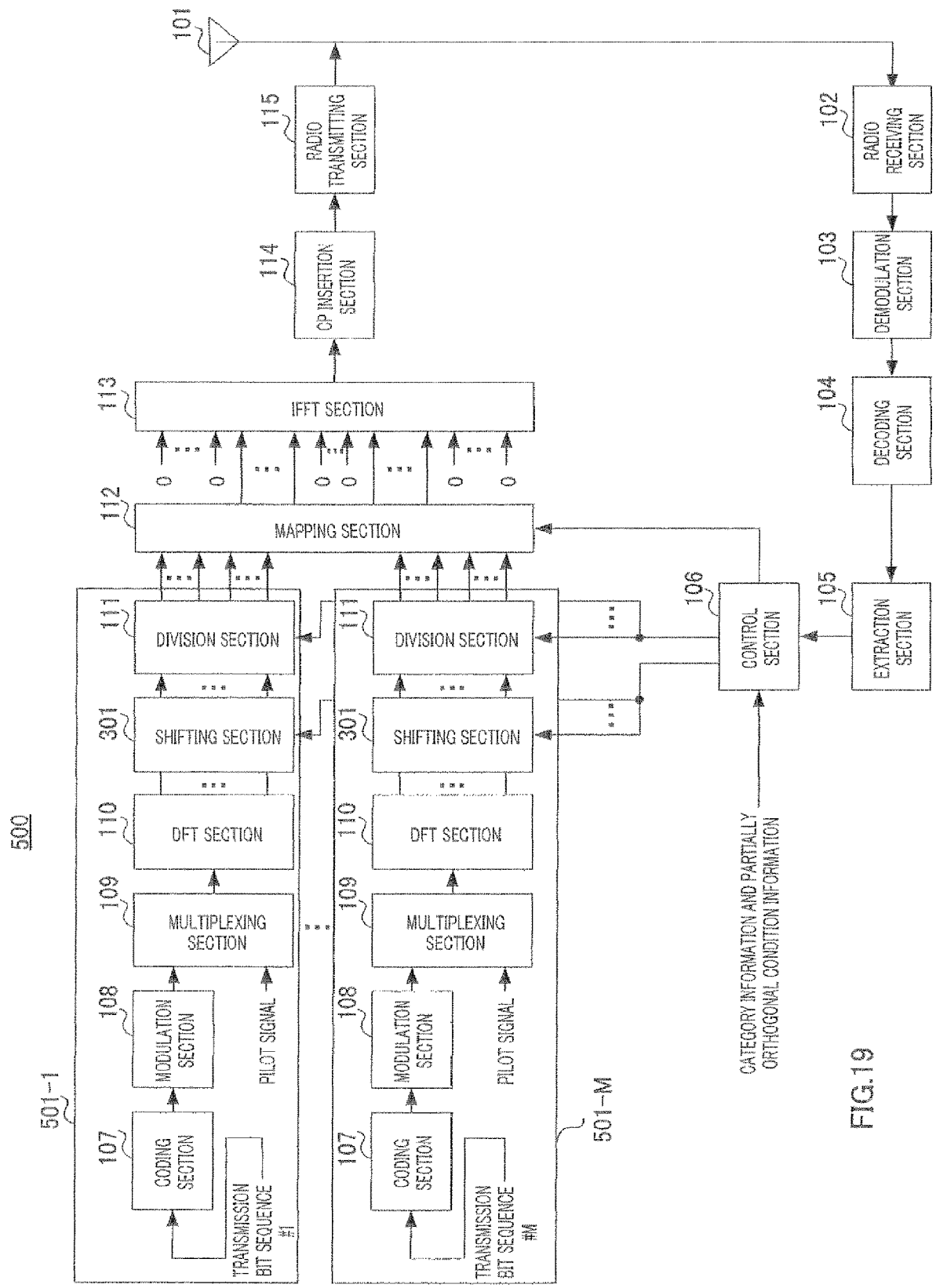
FIG. 19 is a block diagram of a terminal according to Embodiment 5 of the present invention.

Furthermore, in the present invention, when the terminal transmits C-SC-FDMA signals in parallel in the frequency domain, the terminal may provide a plurality of units made up of a coding section, modulation section, multiplexing section, DFT section, shifting section and division section as shown in FIG. 19. The terminal may individually set the amount of shift in each unit and apply a cyclic frequency shift to the DFT output of each unit. In terminal 500 shown in FIG. 19, M units 501-1 to 501-M are configured and each unit is individually provided with a coding section, a modulation section, a multiplexing section, a DFT section, a shifting section and a division section for a transmission bit sequence, and a case where M C-SC-FDMA signals are transmitted in parallel in the frequency domain is shown. By adopting the configuration shown in FIG. 19, in a radio channel having different radio wave propagation environments in different frequency bands such as a wideband radio channel configured of many multi-paths and having frequency selectivity, it is possible to improve flexibility of mapping of signals in each unit on frequency resources (subcarriers) by applying an individual cyclic frequency shift to each unit while making column vectors of the DFT matrix partially orthogonal to each other in each cluster of a C-SC-FDMA signal generated in each unit.

The amount of cyclic frequency shift may be shared among a plurality of units and control information on one common amount of cyclic frequency shift may be reported from the base station to the terminal (or from the terminal to the base station). Furthermore, the amount of individual cyclic frequency shift per unit may be set to the same value and control information on the amount of cyclic frequency shift of each unit may be reported from the base station to the terminal (or from the terminal to the base station) at the same time. When, for example, the same transmission format (e.g. the same MCS set or the same C-SC-FDMA division method (the number of clusters or cluster size or the like)) is used among a plurality of units, there is a correlation in required communication quality (e.g. SINR required to satisfy a certain error rate) between units. Therefore, sharing the amount of cyclic frequency shift (that is, setting the same amount of cyclic frequency shift) among a plurality of units can further improve a correlation in required communication quality between units and control transmission formats of the plurality of units at the same time and reliably. Furthermore, when one common amount of cyclic frequency shift is used, the amount of information require to report from the base station to the terminal (or from the terminal to the base station) can be reduced.

When, for example, a bundling technique is used whereby one ACK (acknowledgment) signal is fed back when the base station normally receives all transmission bit sequences (transport blocks) of the plurality of units or one NACK (negative acknowledgment) signal is fed back when even one error is detected by the base station from the plurality of transport blocks from the base station to the terminal, the above described amount of cyclic frequency shift setting method (method of setting the same amount of cyclic frequency shift among the plurality of units) may be used. That is, by setting the same amount of cyclic frequency shift among a plurality of units (that is, using the same setting method on cyclic frequency shifts), it is possible to correlate transport blocks of the plurality of units and their respective error producing mechanisms. Therefore, it is possible to reduce the probability that error-producing transport blocks and error-free transport blocks may be mixed among transport blocks of the plurality of units and reduce unnecessary retransmissions of transport blocks normally received by the base station.

Furthermore, the value of the amount of cyclic frequency shift z corresponding to the DFT output outputted from the DFT section of the terminal in the present invention may also be set to the same value as the length that satisfies the partially orthogonal vector length (bandwidth) corresponding to one of the division methods described in Embodiment 1 or Embodiment 4. Thus, partially orthogonal conditions similar to the partially orthogonal conditions for an SC-FDMA signal (spectrum) before a cyclic frequency shift are also applicable to an SC-FDMA signal (spectrum) after a cyclic frequency shift.

Furthermore, in the present invention, amount of cyclic frequency shift z may also be associated with a minimum division unit when dividing the SC-FDMA signal (spectrum). When, for example, the minimum division unit of the SC-FDMA signal (spectrum) is defined as $N_{min}$, the minimum amount of shift of amount of cyclic frequency shift z may likewise be assumed to be $N_{min}$. In this case, minimum amount of shift $N_{min}$ may be shared between transmitting and receiving apparatuses (terminal and base station) and multiple $kN_{min}$ (k is an integer) of the minimum amount of shift may be defined as amount of cyclic frequency shift z given to the DFT output. Thus, only multiplier (coefficient) k may be necessary as the control information on amount of cyclic frequency shift z reported from the base station to the terminal (or from the terminal to the base station). Furthermore, when control information (multiplier k) on amount of cyclic frequency shift z is reported, amount of cyclic frequency shift k may also be reported together with cluster division information (number of fractions or the like) or frequency resource allocation information. This allows the amount of information required to report the amount of cyclic frequency shift to be reduced.

Furthermore, when C-SC-FDMA signals to which the terminal applies a cyclic frequency shift are transmitted in parallel in the frequency domain, the amount of cyclic frequency shift may be relatively defined among C-SC-FDMA signals transmitted in parallel (e.g. among units 501-1 to 501-M of terminal 500 shown in FIG. 19). To be more specific, the difference between the amount of cyclic frequency shift of a C-SC-FDMA signal to be a reference and the amounts of cyclic frequency shift of other C-SC-FDMA signals may be defined as a relative amount of shift (differential amount of shift) and the relative amount of shift (differential amount of shift) may be reported from the base station to the terminal (or from the terminal to the base station). For example, a case will be described where an amount of cyclic frequency shift of a C-SC-FDMA signal mapped to a low frequency band is set to $z_0=5$ and an amount of cyclic frequency shift of a C-SC-FDMA signal mapped to a high frequency band is set to $z_1=10$. In this case, the difference (relative value)=$z_1-z_0=5$ between the amount of cyclic frequency shift of the C-SC-FDMA signal mapped to the low frequency band and the amount of cyclic frequency shift of the C-SC-FDMA signal mapped to the high frequency band may be reported together with amount of cyclic frequency shift $z_0=5$ of the C-SC-FDMA signal mapped to the low frequency band to be a reference as control information on the amount of cyclic frequency shift to be reported from the base station to the terminal (or from the terminal to the base station). This allows overhead of the amount of information required to report the amount of cyclic frequency shift to be reduced compared to the case where the amount of cyclic frequency shift for each C-SC-FDMA signal is reported individually. Although a case has been described here where amounts of cyclic frequency shift corresponding to two C-SC-FDMA signals are reported, the number of C-SC-FDMA signals to be transmitted in parallel is not limited to 2 but may be 3 or more.

Embodiment 6

According to the present embodiment, a terminal that performs MIMO transmission applies individual cyclic frequency shifts within a DFT band to SC-FDMA signals transmitted to different space resources (layers, antennas or streams) to which a plurality of codewords are mapped for every different space resource. The terminal then divides the signal of each space resource (layer, antenna or stream) with a partially orthogonal bandwidth (bandwidth corresponding to partially orthogonal vector length).

Figure 20:
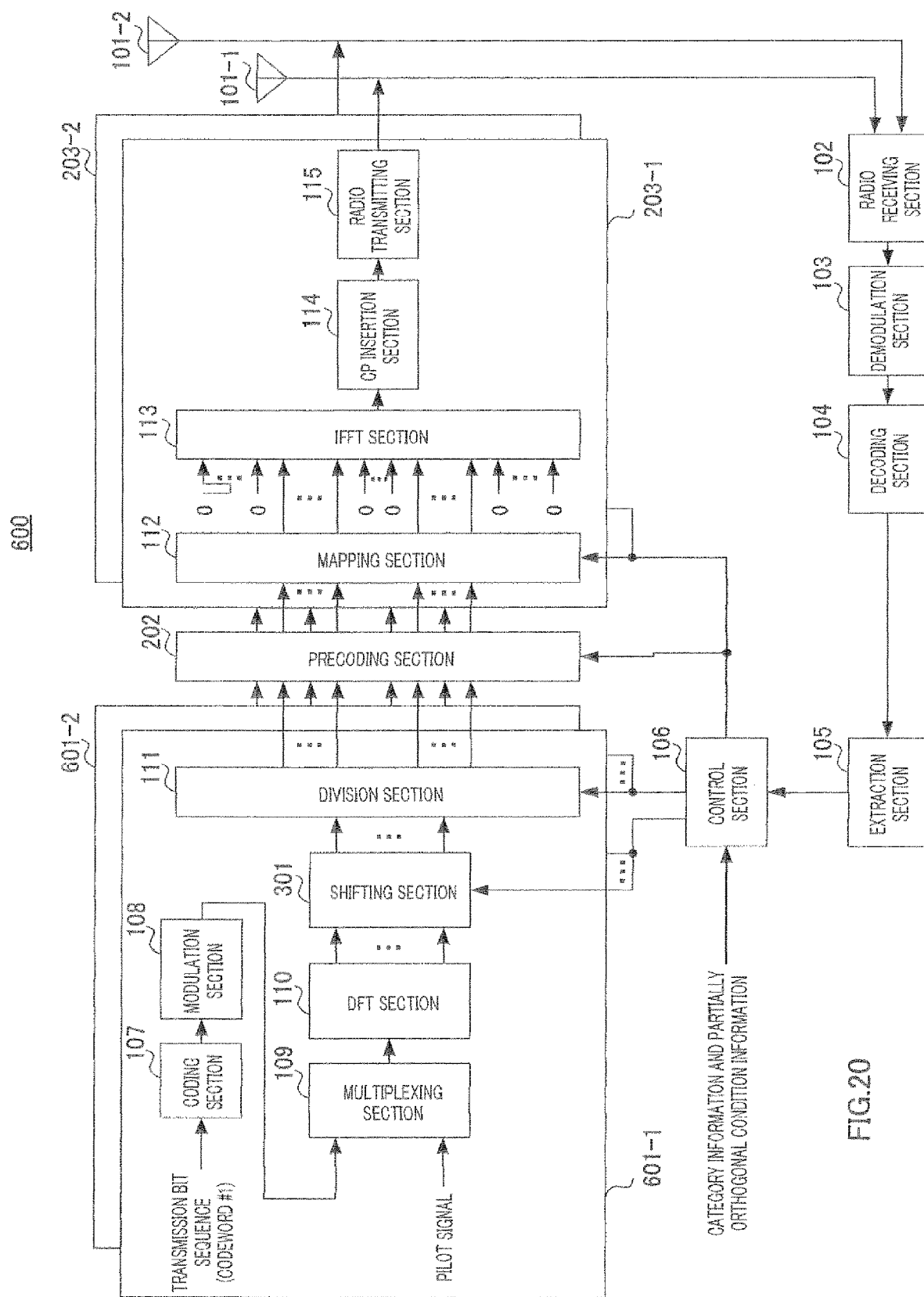
FIG. 20 is a block diagram of a terminal according to Embodiment 6 of the present invention.

FIG. 20 shows a configuration of the transmitting apparatus (terminal) according to the present embodiment. In terminal 600 shown in FIG. 20, the same components as those of Embodiment 2 (FIG. 9) will be assigned the same reference numerals and descriptions thereof will be omitted. Furthermore, terminal 600 shown in FIG. 20 is provided with two antennas that transmit C-SC-FDMA signals using two space resources as in the case of Embodiment 2. Terminal 600 shown in FIG. 20 differs from terminal 200 (FIG. 9) in Embodiment 2 in that C-SC-FDMA processing section 601 that generates an SC-FDMA signal (spectrum) transmitted through each space resource is individually provided with a shifting section 301 for each bit sequence (codeword) transmitted in parallel using space resources after DFT section 110.

In terminal 600 shown in FIG. 20, control section 106 outputs an individual amount of cyclic frequency shift corresponding to each C-SC-FDMA processing section 601 to each shifting section 301. There can be a case where an individual amount of cyclic frequency shift for C-SC-FDMA processing section 601 may be determined by the base station and the determined amount of cyclic frequency shift may be reported from the base station to the terminal or a case where the terminal may determine the amount of cyclic frequency shift and the determined amount of cyclic frequency shift may be reported from the terminal to the base station.

C-SC-FDMA processing sections 601-1 and 601-2 apply processing similar to that of coding section 107 to DFT section 110 of Embodiment 2 to inputted codewords (transmission bit sequences) and thereby generate SC-FDMA signals (spectra). Each DFT section 110 of C-SC-FDMA processing sections 601-1 and 601-2 outputs the generated SC-FDMA signal (spectrum) to each shifting section 301.

Shifting section 301 applies an individual cyclic frequency shift to the SC-FDMA signal (spectrum) inputted from DFT section 110 for each C-SC-FDMA processing section according to a codeword-specific (that is, for each C-SC-FDMA processing section) amount of cyclic frequency shift inputted from control section 106 in the same way as in Embodiment 5. Shifting section 301 then outputs the SC-FDMA signal (spectrum) after the cyclic frequency shift to division section 111.

Division section 111 divides the SC-FDMA signal (spectrum) after the cyclic frequency shift inputted from shifting section 301 with a partially orthogonal bandwidth using one of the division methods described in the above described embodiments (e.g. Embodiment 1 or Embodiment 4) and generates a plurality of clusters. Division section 111 of each C-SC-FDMA processing section 601 then outputs the plurality of clusters generated to precoding section 202.

Next, details of C-SC-FDMA processing in C-SC-FDMA processing section 601 of terminal 600 will be described.

Figure 21A:
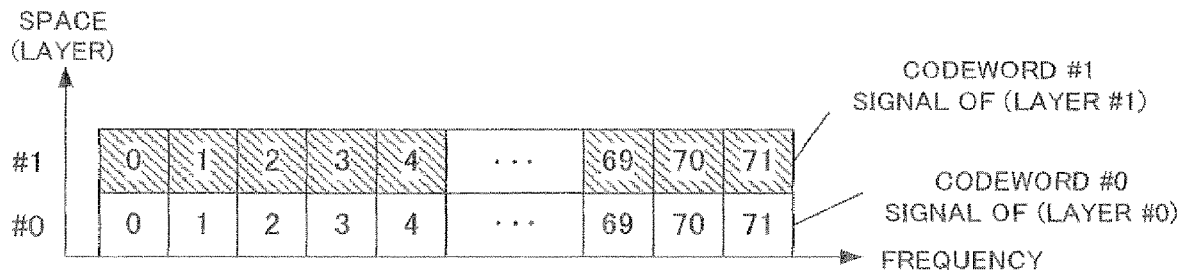
FIG. 21A is a diagram showing DFT output according to Embodiment 6 of the present invention.
Figure 21B:
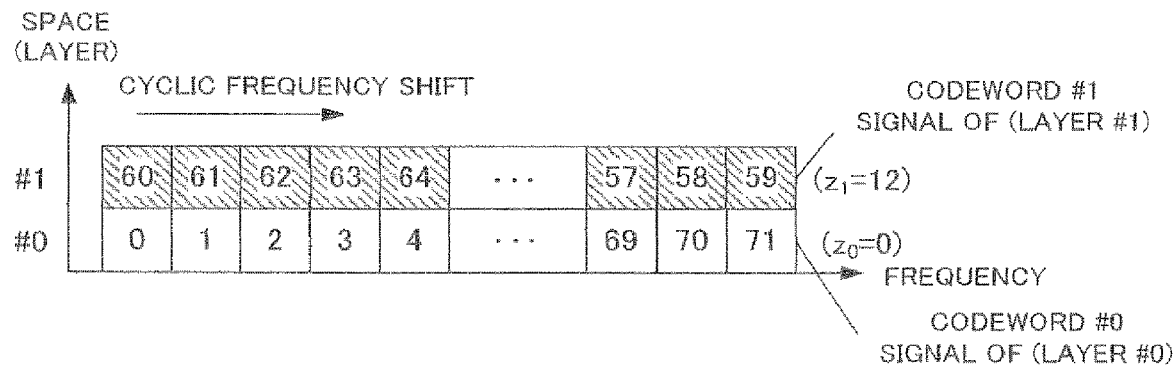
FIG. 21B is a diagram showing shifting processing according to Embodiment 6 of the present invention.
Figure 21C:
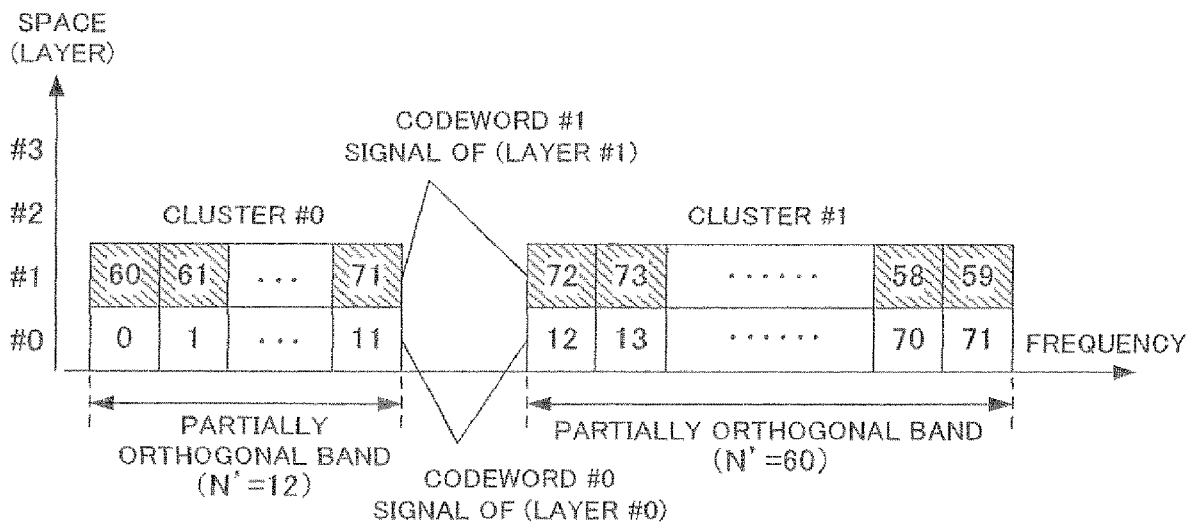
FIG. 21C is a diagram showing division processing and mapping processing according to Embodiment 6 of the present invention.

A case will be described below where as shown in FIGS. 21A to C, terminal 600 maps two codewords (codeword #0 and codeword #1) to two different space resources (here, these may be layer #0 and layer #1 or antenna, streams). Furthermore, in FIGS. 21A to C, assuming DFT size N=72 points (DFT output numbers 0 to 71), terminal 600 generates two clusters (cluster #0 and cluster #1). Furthermore, shifting section 301 cyclically shifts the DFT output from low to high frequencies.

FIG. 21A shows 72-point DFT output (SC-FDMA signal) obtained after each DFT section 110 of C-SC-FDMA processing sections 601-1 and 601-2 performs DFT processing on two codewords #0 and #1 respectively.

Each shifting section 301 of C-SC-FDMA processing sections 601-1 and 601-2 individually applies a cyclic frequency shift within the DFT band (DFT size N=72 points) to two SC-FDMA signals respectively (signal of codeword #0 and signal of codeword #1) shown in FIG. 21A. To be more specific, as shown in FIG. 21B, shifting section 301 of C-SC-FDMA processing section 601-1 applies a cyclic frequency shift with z=0 (without cyclic frequency shift) to the signal of codeword #0 transmitted through layer #0 (space resource #0). Furthermore, as shown in FIG. 21B, shifting section 301 of C-SC-FDMA processing section 601-2 applies a cyclic frequency shift with z=12 (with a cyclic frequency shift) to the signal of codeword #1 transmitted through layer #1 (space resource #1). That is, shifting section 301 applies a cyclic frequency shift to codewords (SC-FDMA signals) transmitted through a plurality of layers (space resources) within the DFT band for each of the plurality of space resources (layer, antenna or streams).

As shown in FIG. 21C, each division section 111 of C-SC-FDMA processing sections 601-1 and 601-2 divides the codeword (SC-FDMA signal) after the cyclic frequency shift into cluster #0 of vector length N'=12 and cluster #1 of vector length N'=60 and thereby generates two clusters.

By this means, in MIMO transmission, the present embodiment can flexibly perform frequency mapping adapted to the quality of each channel (link) of space resources (layer, antenna or stream) through which codewords are transmitted while maintaining a partially orthogonal relationship within the cluster of the codewords transmitted through each space resource, for each codeword (each space resource, each layer, each antenna or each stream or the like).

The present embodiment has described SU-MIMO in which transmitting and receiving apparatuses (terminal and base station) realize MIMO transmission using a plurality of antennas as an example. However, the present invention is also applicable to uplink and downlink MU-MIMO. For example, in downlink MU-MIMO transmission, different codewords mapped to different space resources (layers, antennas or streams) are codewords directed to different terminals. In this case, it is necessary to satisfy required quality that differs from one receiving apparatus (terminal) to another. For example, in the case of a cellular system such as mobile phone, communication quality of a terminal (receiving apparatus) located in a different place differs in great deal. As described above, according to the present embodiment, however, the transmitting apparatus (base station) applies an individual cyclic frequency shift to each codeword transmitted through each of space resources to which a plurality of codewords are mapped in different space resources (layers, antennas or streams). Thus, in the cluster of each codeword, it is possible to flexibly perform frequency mapping (cyclic frequency shift) adapted to the quality of each channel (link) of a space resource through which the codeword is transmitted for each codeword (each space resource, each layer, each antenna or each stream) while maintaining the partially orthogonal relationship within a cluster of each codeword.

A case has been described in the present embodiment where the transmitting apparatus (terminal) maps two codewords to two space resources (layers, antennas or streams) respectively. However, in the present invention, the transmitting apparatus (terminal) may also apply three or more codewords to three or more space resources (layers, antennas or streams).

Furthermore, in the present invention, amount of cyclic frequency shift $z_i$ individually set for each codeword (each layer, each antenna or each stream) may be associated with a minimum division unit when dividing an SC-FDMA signal (spectrum). When, for example, the minimum division unit of the SC-FDMA signal (spectrum) is defined as $N_{min}$, the minimum amount of shift of individual amount of cyclic frequency shift $z_i$ set for each codeword (each space resource, each layer or each stream) may also be likewise defined as $N_{min}$. Thus, it is possible to apply a partially orthogonal condition similar to the partially orthogonal condition corresponding to an SC-FDMA signal (spectrum) before a cyclic frequency shift to all clusters after the cyclic frequency shift.

Furthermore, in the present invention, amount of cyclic frequency shift $z_i$ individually set for each codeword (each layer, each antenna or each stream) may be set to a multiple of the cluster size having a minimum partially orthogonal bandwidth of the plurality of clusters generated by dividing the SC-FDMA signal. That is, amount of cyclic frequency shift $z_i$ may be associated with the bandwidth of the cluster having the minimum partially orthogonal bandwidth. When, for example, the cluster size having the minimum partially orthogonal bandwidth in a certain space resource (layer, antenna or stream) is assumed to be $B_{min}$, the amount of cyclic frequency shift in the space resource or another space resource may be set as $kB_{min}$ (k is an integer). This makes it possible to maintain an (partially) orthogonal relationship in the frequency domain between space resources (layers, antennas or streams) and at the same time reduce interference from different clusters of different space resources.

Furthermore, a case has been described in the present embodiment where an amount of cyclic frequency shift individually set for each codeword (each space resource, each layer, each antenna or each stream) is used. However, in the present invention, the amount of cyclic frequency shift individually set in each codeword (each space resource, each layer, each antenna or each stream) may also be relatively defined between codewords (between space resources, between layers, between antennas or between streams). To be more specific, a difference between the amount of cyclic frequency shift of a reference codeword (space resource, layer, antenna or stream) and the amount of cyclic frequency shift of another codeword (space resource, layer, antenna or stream) may be defined as a relative amount of shift (differential amount of shift) and the relative amount of shift (differential amount of shift) may be reported from the base station to the terminal (or from the terminal to the base station). For example, a case where the amount of cyclic frequency shift of codeword #0 is set to $z_0=5$ and the amount of cyclic frequency shift of codeword #1 is set to $z_1=10$ will be described. In this case, a difference (relative value)=$z_1-z_0=5$ between the amount of cyclic frequency shift of codeword #0 and the amount of cyclic frequency shift of codeword #1 may be reported together with amount of cyclic frequency shift $z_0=5$ of codeword #0 which serves as a reference, as control information on the amount of cyclic frequency shift to be reported from the base station to the terminal (or from the terminal to the base station). Thus, overhead of the amount of information required to report the amount of cyclic frequency shift may be reduced compared to a case where the amount of cyclic frequency shift of each codeword (space resource, layer, antenna or stream) is individually reported. Although a case has been described here where the amounts of cyclic frequency shift corresponding to two codewords are reported respectively, the number of codewords is not limited to 2, but may be 3 or more. Furthermore, a relative value (difference value) of amount of cyclic frequency shift between resources indicating space resources such as layer, antenna or stream may also be used instead of codewords.

A case has been described in the present embodiment where individual amounts of cyclic frequency shifts set for each codeword (space resource, layer, antenna or stream) are used. However, in the present invention, the amount of cyclic frequency shift may be shared among a plurality of codewords (space resources, layers, antennas or streams) so that one common amount of cyclic frequency shift may be used. Furthermore, the same amount of cyclic frequency shift may also be set among a plurality of codewords (space resources, layers, antennas or streams). When, for example, the transmitting apparatus (terminal) maps codewords having the same MCS to a plurality of codewords (space resources, layers, antennas or streams), the amount of cyclic frequency shift of each codeword (space resource, layer, antenna or stream) may be set to the same value (or using one common cyclic frequency shift) and the amount of cyclic frequency shift may be reported from the base station to the terminal (or from the terminal to the base station). Thus, codewords having substantially the same required quality mapped to a plurality of space resources (layers, antennas or streams) can be controlled at the same time and reliably. Furthermore, when one common amount of cyclic frequency shift is used, the amount of information required to report the amount of cyclic frequency shift from the base station to the terminal (or, from the terminal to the base station) can further be reduced.

Furthermore, Embodiment 2 has described the precoding method in MIMO transmission of dividing an SC-FDMA signal of each stream with a partially orthogonal bandwidth and multiplying signals mapped to frequency bands having the same partially orthogonal bandwidth (length) in the plurality of streams by the same spatial precoding matrix respectively. Thus, the present embodiment may also adopt a configuration in which the transmitting apparatus (terminal) cyclically frequency-shifts an SC-FDMA signal, then divides the SC-FDMA signal and multiplies signals of a plurality of space resources (layers, antennas or streams) mapped to frequency bands having the same partially orthogonal bandwidth (length) by the same spatial precoding matrix respectively. That is, the terminal according to the present invention may adopt a configuration combining Embodiment 2 and the present embodiment. This makes it possible to obtain effects similar to the respective effects of Embodiment 2 and the present embodiment.

Furthermore, a case has been described in the present embodiment where when the transmitting apparatus (terminal) transmits a plurality of codewords through a plurality of layers, one codeword is mapped to one space resource (layer) (that is, a codeword and a space resource (layer) have a one-to-one correspondence). However, the present invention is also applicable to a case where the transmitting apparatus (terminal) maps one codeword to a plurality of space resources (layers) (e.g. single codeword transmission of MIMO). For example, a case will be described where the terminal performs spatial multiplexing transmission on two codewords (codeword #0 and codeword #1) using four space resources (layer #0 to #3). In this case, the terminal may map a signal (modulated signal) of codeword #0 to two layers of layer #0 and layer #1 and map a signal (modulated signal) of codeword #1 to two layer of layer #2 and layer #3. In this case, the terminal may apply an individual cyclic frequency shift to each codeword using an amount of cyclic frequency shift individually set for each layer (space resource).

Figure 22A:
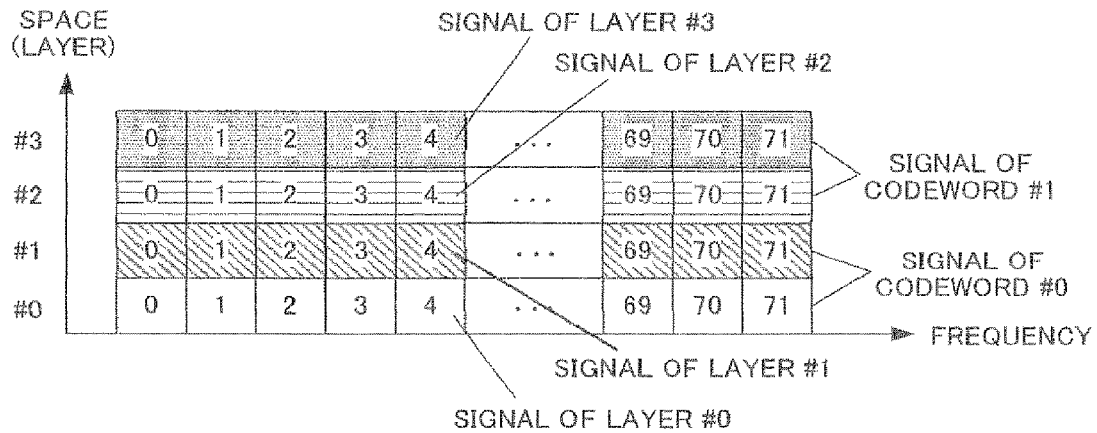
FIG. 22A is a diagram showing DFT output according to Embodiment 6 of the present invention.
Figure 22B:
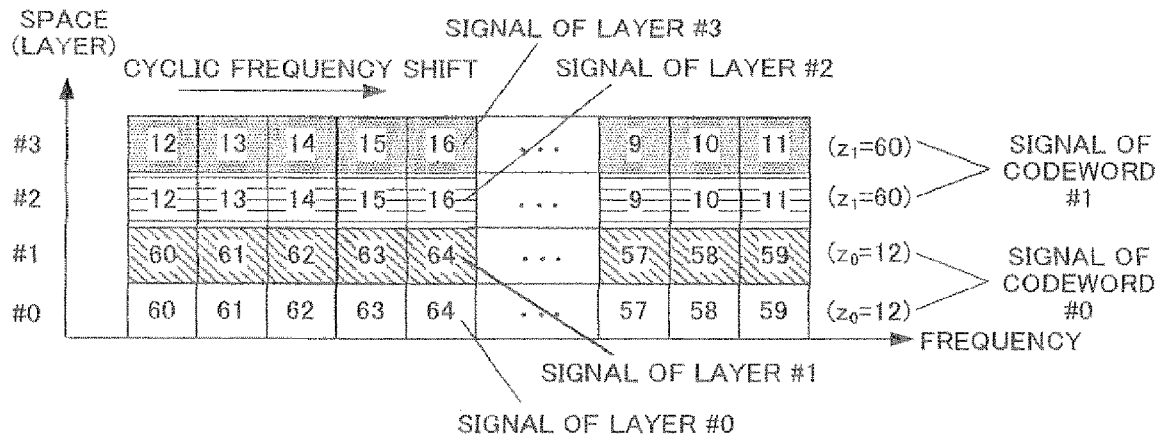
FIG. 22B is a diagram showing shifting processing according to Embodiment 6 of the present invention.
Figure 22C:
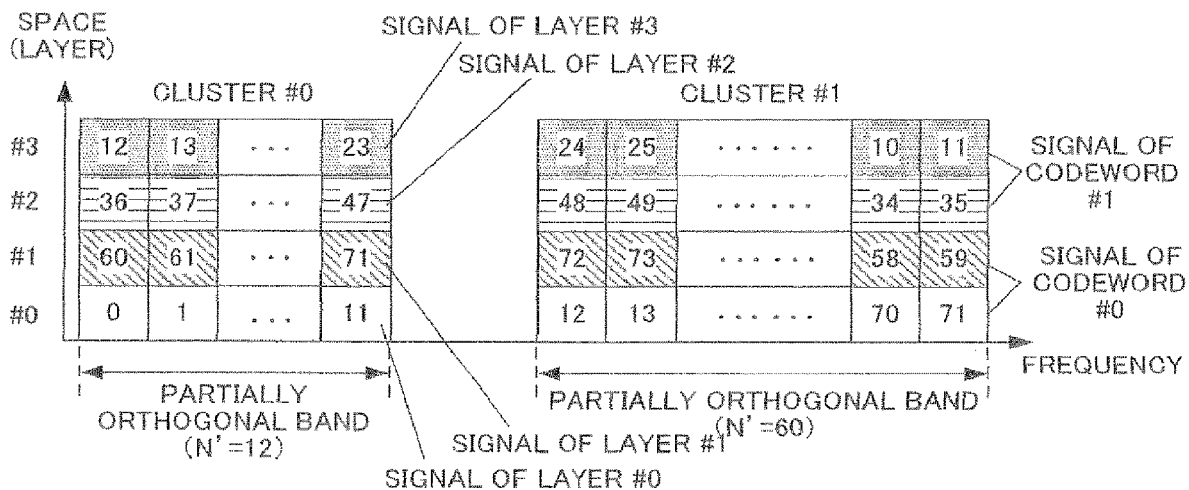
FIG. 22C is a diagram showing division processing and mapping processing according to Embodiment 6 of the present invention.

Furthermore, in the present invention, when mapping one codeword to a plurality of layers, the terminal may use the same amount of cyclic frequency shift among a plurality of layers (space resources) to which one codeword is mapped. For example, as shown in FIGS. 22A to C, a case will be described where the terminal performs spatial multiplexing transmission on two codewords (codeword #0 and codeword #1) using four layers (layers #0 to #3). In FIG. 22A, the terminal maps each codeword to two layers (space resources). Furthermore, as shown in FIG. 22B, the terminal sets the same amount of cyclic frequency shift between layers (space resources) to which the same codeword is mapped. For example, as shown in FIG. 22B, the terminal maps the signal of codeword #0 to two layers (space resources) of layer #0 and layer #1 and uses the same amount of cyclic frequency shift $z_0=12$ in two layers (layer #0 and layer #1). Likewise, as shown in FIG. 22B, the terminal maps the signal of codeword #1 to two layers (space resources) of layer #2 and layer #3 and uses the same amount of cyclic frequency shift $z_1=60$ in the two layers (layer #2 and layer #3). As shown in FIG. 22C, the terminal divides the signal after a cyclic frequency shift into two clusters (cluster #0 and cluster #1) having partially orthogonal bandwidths. Thus, since different modulated signals included in the same codeword mapped to different space resources (layers) are subjected to a cyclic frequency shift using the same amount of cyclic frequency shift, it is possible to equalize an apparent channel variation caused by the cyclic frequency shift among the same codewords mapped to different space resources (layers). Thus, it is possible to make a likelihood distribution of bits or symbols within the codeword uniform and reliably perform adaptive control such as adaptive modulation.

A case has been described above (e.g. FIG. 22) where the same amount of cyclic frequency shift is applied within the codewords mapped to different space resources (layers). However, the present invention may also adopt a configuration in which the same relative amount of cyclic shift is applied within codewords mapped to different space resources (layers) whereas different values of relative amount of cyclic shift are used among the codewords. When, for example, a case will be described where when two codewords (codeword #0 and codeword #1) are mapped to four space resources (layers #0 to #3), codeword #0 is mapped to layer #0 and layer #1 and codeword #1 is mapped to layer #2 and layer #3. Furthermore, suppose here, for example, that the amount of cyclic frequency shift of layer #0 which serves as a reference is 8, the relative amount of cyclic frequency shift in layer #0 and layer #1 to which codeword #0 is mapped is 5 and the relative amount of cyclic frequency shift in layer #2 and layer #3 to which codeword #1 is mapped is 20. In this case, the amount of cyclic frequency shift of layer #0 is 8, the amount of cyclic frequency shift of layer #1 (=amount of cyclic frequency shift of layer #0+relative amount of cyclic frequency shift) is 8+5=13, the amount of cyclic frequency shift of layer #2 (=amount of cyclic frequency shift of layer #1+relative amount of cyclic frequency shift) is 13+20=33 and the amount of cyclic frequency shift of layer #3 (=amount of cyclic frequency shift of layer #2+relative amount of cyclic frequency shift) is 33+20=53. Thus, by reporting a relative amount of cyclic frequency shift, it is possible to suppress overhead of control information on the amount of cyclic frequency shift, maintain the same communication quality within codewords and flexibly set the amount of cyclic frequency shift appropriate for codeword-specific communication quality among codewords.

When the terminal maps one codeword to a plurality of space resources (layers) as shown in, for example, FIG. 22, the present invention may use repetition signals for signals mapped to a plurality of layers. For example, in FIG. 22, the terminal may map a copy (repetition signal) of DFT output of codeword #0 (or codeword #1) mapped to layer #0 (or layer #2) to layer #0 and layer #1 (or layer #2 and layer #3).

Embodiment 7

A case has been described in Embodiment 6 where the terminal performs an individual cyclic frequency shift on each space resource (layer) in one-dimensional domain only in the frequency domain. By contrast, the present embodiment is different from Embodiment 6 in that the terminal performs a cyclic shift in a space domain in addition to the cyclic shift in the frequency domain and thereby performs a cyclic (space and frequency) shift in a two-dimensional domain of space domain and frequency domain.

To be more specific, the terminal according to the present embodiment applies a cyclic frequency shift to a plurality of DFT outputs (a plurality of codewords) transmitted to the plurality of space resources (layers) for each space resource in the frequency domain as in the case of Embodiment 6, and further applies a cyclic space (layer) shift to C-SC-FDMA signals (plurality of clusters) generated by dividing the plurality of DFT outputs (the plurality of codewords) transmitted through the plurality of space resources (layers) based on the unit of partially orthogonal bandwidths (e.g. clusters having partially orthogonal bandwidths) in the space domain (between space resources).

Figure 23:
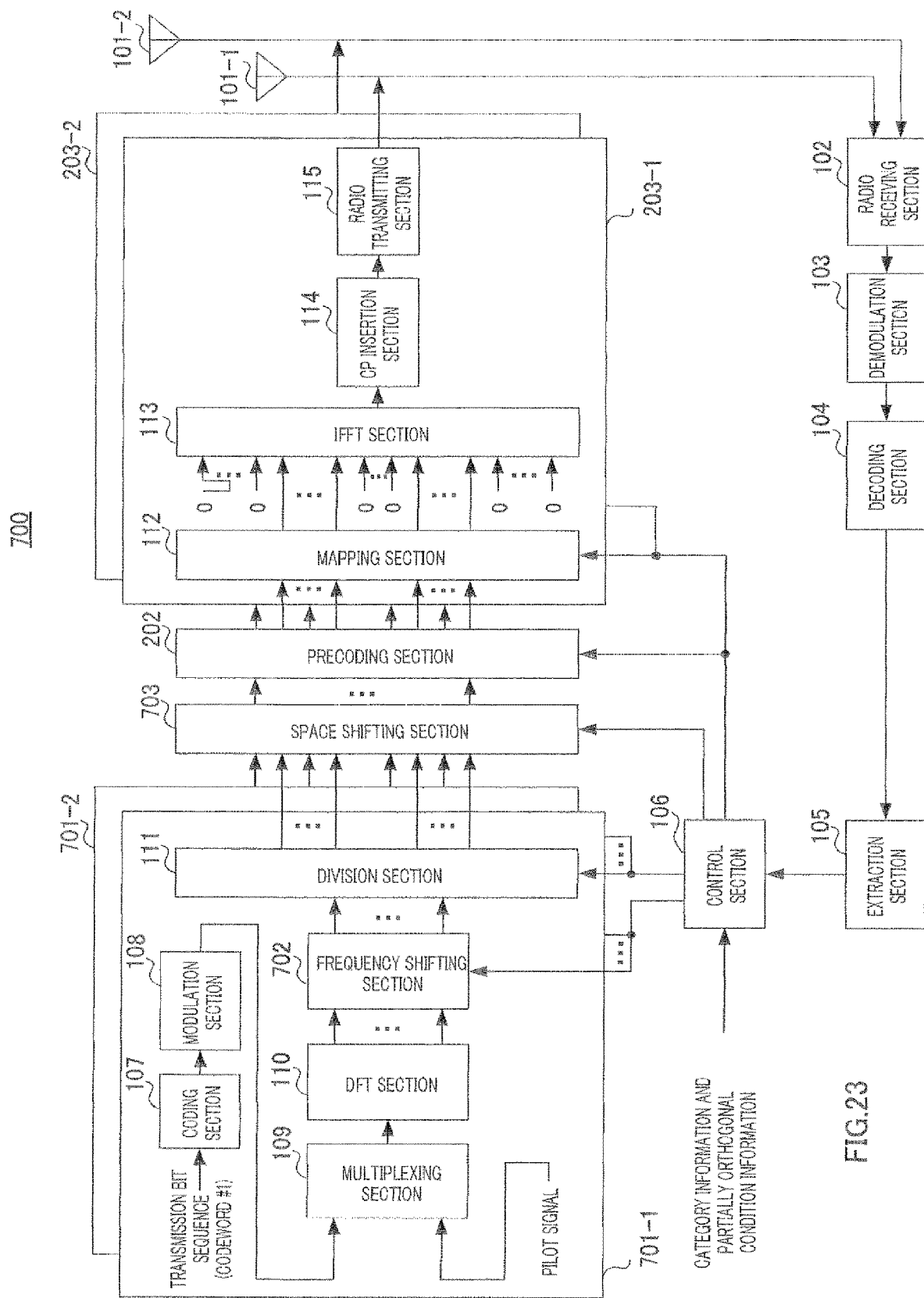
FIG. 23 is a block diagram of a terminal according to Embodiment 7 of the present invention.

FIG. 23 shows a configuration of a transmitting apparatus (terminal) according to the present embodiment. In terminal 700 shown in FIG. 23, the same components as those in Embodiment 6 (FIG. 20) will be assigned the same reference numerals and descriptions thereof will be omitted. Furthermore, terminal 700 shown in FIG. 23 is provided with two antennas that transmit C-SC-FDMA signals using two space resources as in the case of Embodiment 6. Furthermore, frequency shifting section 702 of C-SC-FDMA processing section 701 shown in FIG. 23 performs the same processing as that of shifting section 301 of C-SC-FDMA processing section 601 in terminal 600 (FIG. 20) of Embodiment 6.

Thus, terminal 700 shown in FIG. 23 is different from terminal 600 (FIG. 20) of Embodiment 6 in that space shifting section 703 is provided between division section 111 and precoding section 202.

In terminal 700 shown in FIG. 23, space shifting section 703 receives information on an amount of shift (hereinafter referred to as "amount of cyclic space shift") in the space resource region (layer) for each partially orthogonal bandwidth (e.g. cluster having a partially orthogonal bandwidth) from control section 106 as input. Furthermore, space shifting section 703 receives C-SC-FDMA signals (a plurality of clusters) subjected to individual cyclic frequency shift for each codeword (or each layer) from each division section 111 of C-SC-FDMA processing section 701 as input as in the case of Embodiment 6. Space shifting section 703 then applies a cyclic space shift to each cluster between space resources (layers) according to an individual amount of cyclic space shift for each partially orthogonal bandwidth (cluster). To be more specific, space shifting section 703 applies a cyclic space shift to C-SC-FDMA signals (a plurality of clusters) generated by dividing codewords (SC-FDMA signals) transmitted through a plurality of space resources (layers) in units of orthogonal bandwidth. Space shifting section 703 then outputs the clusters after the cyclic space shift to precoding section 202.

Next, details of the cyclic space shifting processing by space shifting section 703 of terminal 700 will be described.

A case will be described below where terminal 700 maps two codewords (codeword #0 and codeword #1) to two different space resources (here, layers) as in the case of Embodiment 6. Furthermore, C-SC-FDMA processing sections 701-1 and 701-2 of terminal 700 apply a cyclic frequency shift to codeword #1 and codeword #2 (FIG. 21B) shown in FIG. 21A as in the case of Embodiment 6, divide the SC-FDMA signal after the cyclic frequency shift with partially orthogonal bandwidths and generate two cluster of cluster #0 and cluster #1 (FIG. 21C). That is, terminal 700 performs cyclic shifting in one-dimensional domain of the frequency domain through the processing shown in FIG. 21B.

Figure 24:
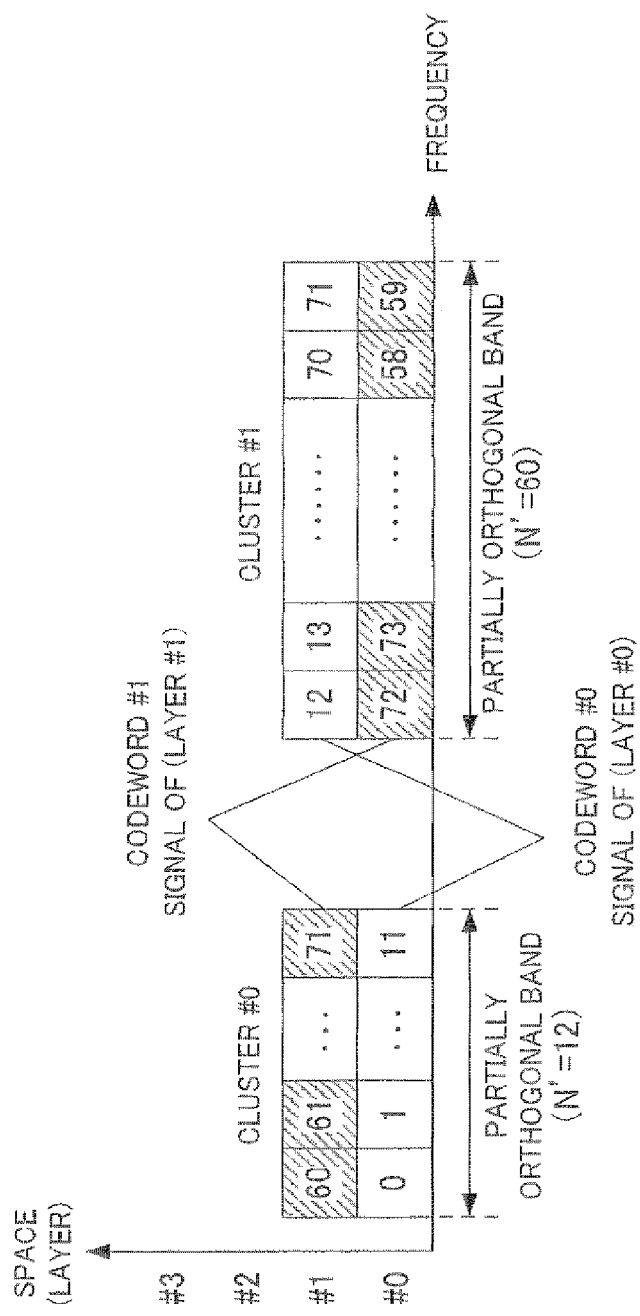
FIG. 24 is a diagram showing frequency shifting processing and space shifting processing according to Embodiment 7 of the present invention.

As shown in FIG. 24, space shifting section 703 then applies a cyclic space shift to each cluster (cluster #0 and cluster #1) after the cyclic frequency shift between space resources (layers) in units of partially orthogonal bandwidth, that is, for each cluster having a partially orthogonal bandwidth. In FIG. 24, an amount of cyclic space shift for cluster #0=0 (without cyclic space shift) and an amount of cyclic space shift for cluster #0=1 (with cyclic space shift). Thus, as shown in FIG. 24, space shifting section 703 applies a cyclic space shift to cluster #0 with an amount of cyclic space shift=0 (without cyclic space shift) in units of partially orthogonal bandwidth N'=12. Likewise, as shown in FIG. 24, space shifting section 703 applies a cyclic space shift to cluster #1 with an amount of cyclic space shift=1 in units of partially orthogonal bandwidth N'=60. As shown in FIG. 24, in cluster #1, a signal of codeword #0 is mapped to layer #1 and a signal of codeword #1 is mapped to layer #0. That is, terminal 700 performs a cyclic shift in one-dimensional domain of the space domain through the processing shown in FIG. 24.

By this means, according to the present embodiment, the terminal applies a cyclic space shift in units of partially orthogonal bandwidth in addition to the processing in Embodiment 6, and can thereby further improve the frequency diversity effect and space diversity effect while maintaining a partially orthogonal relationship between column vectors in the frequency domain.

A case has been described in the present embodiment where in terminal 700 shown in FIG. 23, frequency shifting section 702 applies a cyclic frequency shift to a frequency domain signal and space shifting section 703 then applies a cyclic space shift in the space domain. However, in the present invention, the order of processing of cyclic frequency shift and cyclic space shift in the terminal may be reversed. That is, the terminal according to the present invention may apply a cyclic space (layer) shift in the space domain to a signal and then apply a cyclic frequency shift in the frequency domain.

Furthermore, in the present invention, the terminal may perform only a cyclic space (layer) shift on a signal in one-dimensional domain of the space domain without performing any cyclic frequency shift in the frequency domain. That is, the terminal may apply a cyclic space (layer) shift to C-SC-FDMA signals (plurality of clusters) generated by dividing an SC-FDMA signal transmitted through a plurality of space resources in units of partially orthogonal bandwidths. This corresponds to a case where all amounts of cyclic frequency shift in each space resource (layer) are set to 0 in the present embodiment that performs cyclic shifting in the two-dimensional domain of the frequency domain and space domain. Alternatively, this corresponds to the configuration of transmitting apparatus (terminal 700) in FIG. 23 adapted such that frequency shifting section 702 is omitted and the DFT output (SC-FDMA signal) outputted from DFT section 110 is directly inputted to division section 111 without being subjected to any cyclic frequency shift. That is, the terminal may apply a cyclic space (layer) shift to the DFT output of each space resource (layer) to which no cyclic frequency shift in the frequency domain is applied, only in the space domain (between space resources) based on the unit of partially orthogonal bandwidths (e.g. clusters having partially orthogonal bandwidths). This makes it possible to improve space diversity effects while maintaining a partially orthogonal relationship within clusters in the frequency domain.

Figure 25:
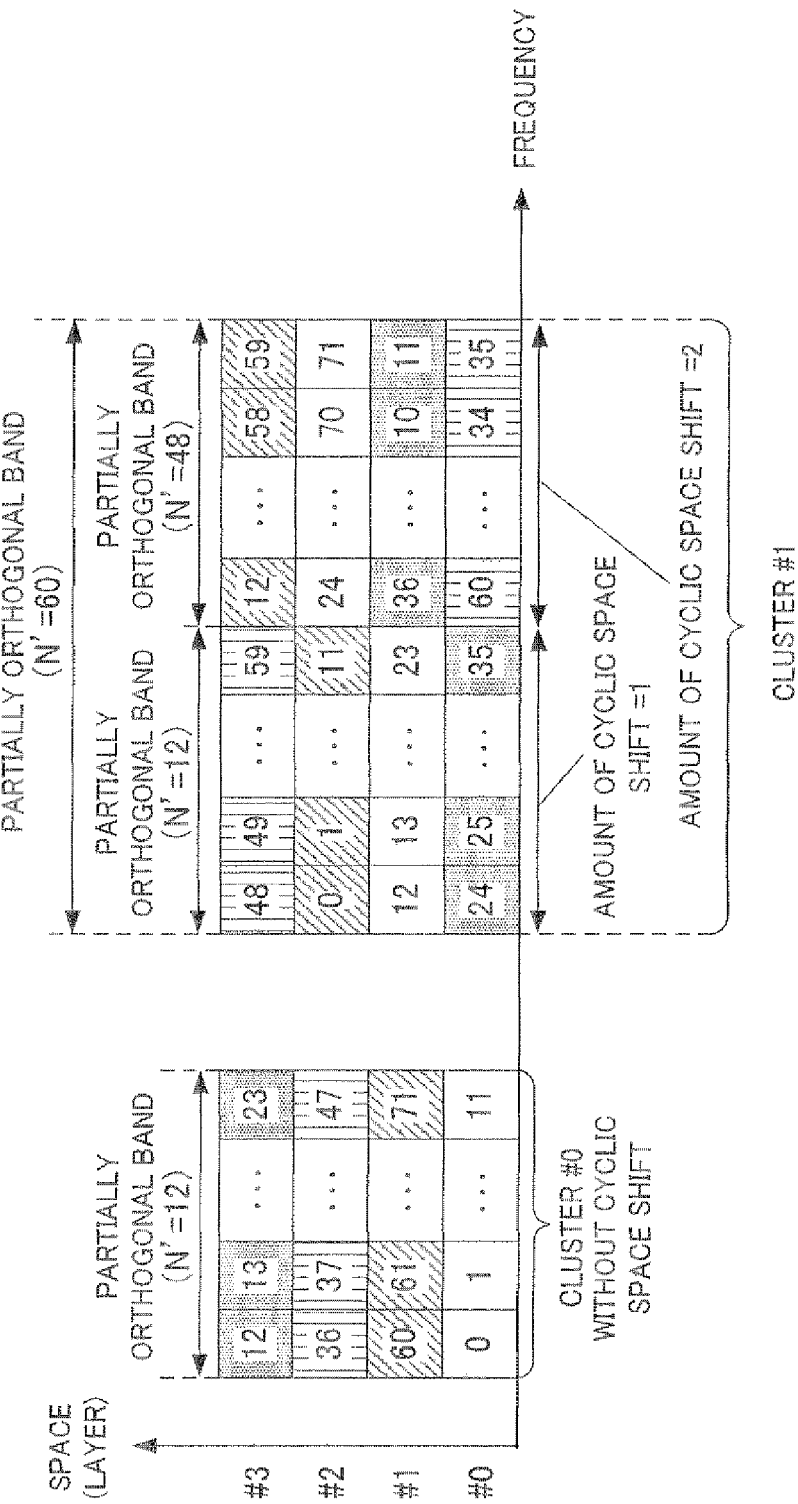
FIG. 25 is a diagram showing frequency shifting processing and space shifting processing according to Embodiment 7 of the present invention.

Furthermore, a case has been described in FIG. 24 of the present embodiment where the terminal performs cyclic space shifting on a plurality of clusters between space resources for each cluster having a length of partially orthogonal bandwidth. However, in the present invention, as shown in FIG. 25, the terminal may also apply a cyclic space (layer) shift to a plurality of clusters between space resources in units of bandwidths (lengths) partially orthogonal to each other in a shorter length than the cluster size (narrower bandwidth than the cluster bandwidth). In FIG. 25, the terminal applies different cyclic space (layer) shifts (amount of cyclic space shift=1 and 2) in the space domain every two partially orthogonal bandwidths (N'=12 and N'=48) in cluster #1 (N'=60). This makes it possible to increase apparent channel randomness in the cluster through a cyclic space shift while maintaining a partially orthogonal relationship between column vectors in the frequency domain and thereby further improve space diversity.

Furthermore, a case has been described in the present embodiment where the partially orthogonal bandwidth is used as the unit of the frequency domain to which a cyclic space (layer) shift is applied. However, the present invention may also use a multiple of a minimum partially orthogonal bandwidth of a plurality of cluster bandwidths as the unit of the frequency domain to which a cyclic space (layer) shift is applied. When, for example, the minimum partially orthogonal bandwidth is assumed to be $B_{min}$, the unit of the frequency domain to which a cyclic space shift is applied may be defined as $kB_{min}$ (k is an integer). The base station may determine the amount of cyclic space shift in units of $kB_{min}$, and report the determined amount of cyclic space shift to the terminal. By this means, by only performing simple control using a plurality of cluster bandwidths, it is possible to define the unit of the frequency domain to which a cyclic space (layer) shift is applied and also obtain effects similar to those of the present embodiment.

Furthermore, in the present invention, amount of cyclic space shift y in the unit of frequency domain (e.g. cluster unit having a partially orthogonal bandwidth) to which a cyclic space (layer) shift is applied may differ from one unit of frequency domain to which a cyclic space (layer) shift is applied to another. Moreover, the rotating direction of a cyclic space (layer) shift may be one of plus (+) and minus (−). That is, the amount of cyclic space shift may be one of +y and −y.

Furthermore, in the present invention, two amounts of shift (z and y) may be set by associating amount of cyclic frequency shift z with amount of cyclic space shift y. For example, amount of cyclic frequency shift $z_i$ of layer #i may be represented by a function of amount of cyclic space shift $y_i$ of cluster #i, or conversely, amount of cyclic space shift $y_i$ of cluster #i may be represented by a function of amount of cyclic frequency shift $z_i$ of layer #i. For example, such a definition may be possible; amount of cyclic space shift $z_i$=(amount of cyclic frequency shift $y_i$) mod (number of layers). Here "mod" represents a modulo operation. The receiving apparatus may report only amount of cyclic frequency shift $y_i$ to the transmitting apparatus and the transmitting apparatus may identify amount of cyclic space shift $z_i$ according to the above described function. This makes it possible to reduce the amount of information required to report two amounts of cyclic shift in the space domain and the frequency domain and at the same time improve the space diversity effect and the frequency diversity effect.

Furthermore, in the present invention, when identification information (flag) indicating whether or not to apply a cyclic space shift or identification information (flag) indicating whether or not to apply a cyclic frequency shift is reported from the receiving apparatus (base station) to the transmitting apparatus (terminal), the two pieces of identification information (flags) may be shared and one piece of the two-dimensional information indicating whether or not to apply a cyclic space shift and a frequency shift may be reported from the receiving apparatus to the transmitting apparatus. This makes it possible to reduce the amount of control information on the identification information and at the same time obtain a space diversity effect and a frequency diversity effect.

Furthermore, the present embodiment has described in FIG. 24 and FIG. 25, when two clusters (cluster #0 and cluster #1) are mapped to non-continuous frequency bands, the method for the terminal to perform a cyclic shift (two-dimensional shift) in two-dimensional domain of the frequency domain and space domain or the method for the terminal to perform a cyclic shift (one-dimensional shift) in one-dimensional domain of the space domain. However, the present invention may also be applicable to a case where a plurality of clusters are mapped to continuous frequency bands. When, for example, performing a two-dimensional shift in the frequency domain and space domain, the terminal cyclically frequency-shifts a plurality of DFT outputs in the frequency domain respectively, and then cyclically space (layer)-shifts the DFT output of each cyclically frequency-shifted space resource (layer) in the space domain (between space resources) based on the unit of the partially orthogonal bandwidths (e.g. clusters having partially orthogonal bandwidths) described in Embodiment 1 and Embodiment 4. The terminal may then map the signals cyclically shifted in the frequency domain and space domain to continuous frequency bands of each space resource (layer). Furthermore, when, for example, performing one-dimensional shifting in the space domain, the terminal cyclically space (layer)-shifts the plurality of DFT outputs based on the unit of the partially orthogonal bandwidths (e.g. clusters having partially orthogonal bandwidths) described in Embodiment 1 and Embodiment 4. After that, the cyclically space-shifted signals may be mapped to continuous frequency bands of the respective space resources (layers).

Embodiment 8

A case has been described in Embodiment 5 where the terminal applies an individual cyclic frequency shift to the DFT output (SC-FDMA signal) for each space resource (layer). By contrast, in the present embodiment, the terminal applies an individual cyclic frequency shift to the DFT output (SC-FDMA signal) within a DFT band in different time domains (for each different time resource). The terminal then divides cyclically frequency-shifted signal with a partially orthogonal bandwidth and thereby generates a plurality of clusters.

Figure 26:
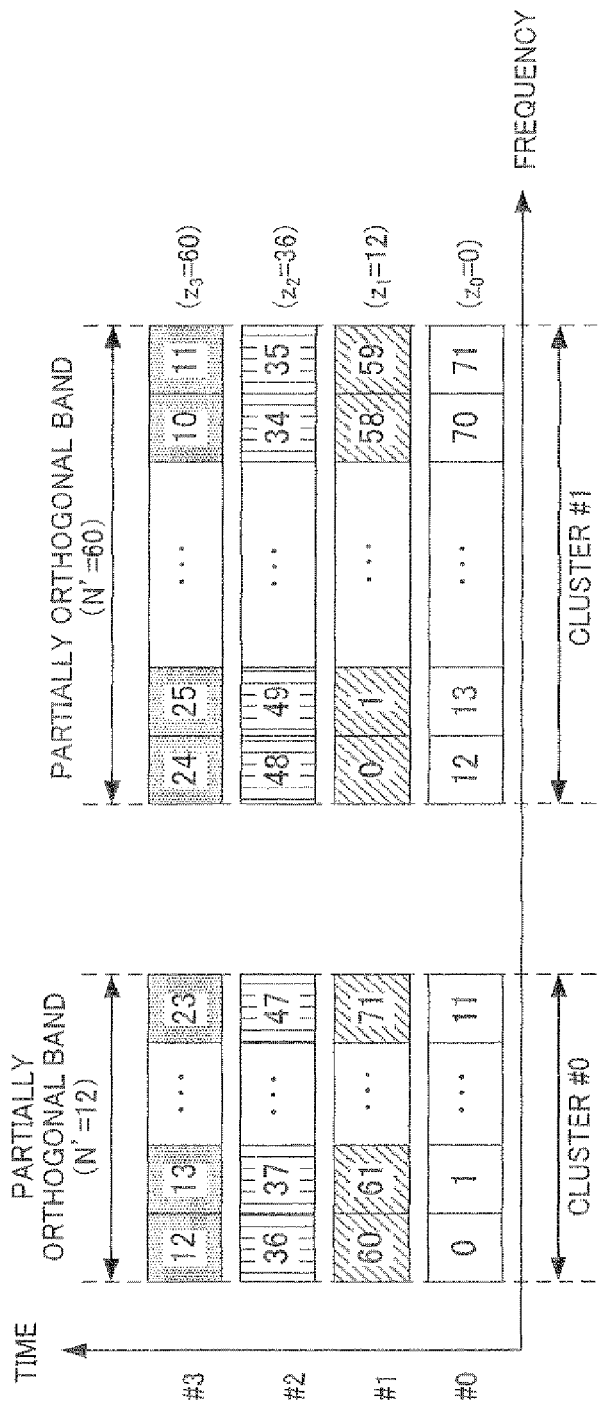
FIG. 26 is a diagram showing shifting processing according to Embodiment 8 of the present invention.

To be more specific, the terminal according to the present embodiment changes amount of cyclic frequency shift $z_i$ of a C-SC-FDMA signal transmitted at each time i in a DFT band (DFT size N=72 points in FIG. 26) as time advances while maintaining mapping positions in the frequency domain (frequency bands) of two clusters (cluster #0 and cluster #1) as shown in FIG. 26. For example, as shown in FIG. 26, amount of cyclic frequency shift $z_0$=0 at time #0, amount of cyclic frequency shift $z_1$=12 at time #1, amount of cyclic frequency shift $z_2$=36 at time #2 and amount of cyclic frequency shift $z_3$=60 at time #3. That is, the terminal applies a cyclic frequency shift to the DFT output (SC-FDMA signal) in different time domains (every different time resource) using different amounts of cyclic frequency shift in the DFT band (72 points). As shown in FIG. 26, the terminal then divides the DFT output after the cyclic frequency shift with a partially orthogonal bandwidth and generates two clusters: cluster #0 and cluster #1.

Thus, the present embodiment can improve the time diversity effect and frequency diversity effect while maintaining partial orthogonality between column vectors of the DFT matrix within clusters without changing frequency bands to which the DFT output (SC-FDMA signal) is allocated (while maintaining mapping positions (frequency band) in the frequency domain).

The amount of cyclic frequency shift may be changed using a symbol unit, slot unit, subframe unit, frame unit or retransmission unit or the like as the time unit.

The embodiments of the present invention have been described so far.

A case has been described in the above embodiments using the term of "column vector of a DFT matrix" where the terminal divides DFT output (an SC-FDMA signal) in a length (bandwidth) which is partially orthogonal among column vectors and generates a plurality of clusters (C-SC-FDMA signals). Here, the DFT matrix is a symmetric matrix. For example, each element of an n-th column vector of an N×N DFT matrix is identical to each element of an n-th row vector. Thus, in the present invention, even when using a matrix transposed from a DFT matrix as a precoding matrix, the terminal may divide a precoded signal with a length (bandwidth) partially orthogonal among row vectors of the DFT matrix. That is, the SC-FDMA signal division method described in the above embodiments may be applied to a signal precoded by a transpose matrix of the DFT matrix. Thus, even when using such a matrix transposed from the DFT matrix as a precoding matrix, effects similar to those in the above embodiments can be obtained.

Furthermore, the present invention may also use a complex conjugate matrix of the DFT matrix or a complex conjugate transpose matrix of the DFT matrix (Hermitian transpose matrix of the DFT matrix) as the precoding matrix. Here, the complex conjugate matrix of the DFT matrix and the complex conjugate transpose matrix of the DFT matrix (Hermitian transpose matrix of the DFT matrix) are symmetric matrixes. Therefore, each element of an n-th column vector of a complex conjugate matrix of an N×N DFT matrix (or complex conjugate transpose matrix (Hermitian transpose matrix of the DFT matrix)) is identical to each element of an n-th row vector. Thus, partially orthogonal conditions of equation 1 and equation 2 can be applied to the complex conjugate transpose matrix of the DFT matrix (Hermitian transpose matrix of the DFT matrix), and therefore the terminal may divide a precoded signal with the partially orthogonal length (bandwidth) described in the above embodiments. That is, the SC-FDMA signal division method described in the above embodiments may be applied to the signal precoded by the complex conjugate matrix of the DFT matrix or the complex conjugate transpose matrix of the DFT matrix (Hermitian transpose matrix of the DFT matrix). This makes it possible to obtain effects similar to those in the above embodiments even when using the complex conjugate matrix of the DFT matrix or complex conjugate transpose matrix of the DFT matrix (Hermitian transpose matrix of the DFT matrix) as the precoding matrix.

Furthermore, the present invention may also use an inverse matrix of the DFT matrix as the precoding matrix. The inverse matrix of the DFT matrix is equivalent to the complex conjugate transpose matrix of the DFT matrix (Hermitian transpose matrix of the DFT matrix). Therefore, when using the inverse matrix of the DFT matrix as the precoding matrix, the SC-FDMA signal division method described in the above embodiments may be applied to a signal precoded by the inverse matrix of the DFT matrix. This makes it possible to obtain effects similar to those in the above embodiments even when using the inverse matrix of the DFT matrix as the precoding matrix.

A terminal configuration (e.g. FIG. 9 and FIG. 20) has been shown in above Embodiments 2 and 6 in which the DFT section→division section→precoding section are connected in that order. However, the present invention may also adopt a terminal configuration in which the DFT section→precoding section→division section are connected in that order. In this case, the terminal transforms respective transmission symbol sequences in which pilot signals are multiplexed from the time domain to frequency domain signals through DFT processing by the DFT section and then performs linear precoding on each subcarrier frequency domain signal through the precoding section (e.g. multiplying two DFT output signals in a certain subcarrier by a precoding matrix expressed in matrix form). The terminal may then perform division processing on the SC-FDMA signal for the precoded frequency-domain signal component by the division section using one of the division methods of the above embodiments.

Furthermore, a case has been described in the above embodiments where an SC-FDMA signal is divided with a partially orthogonal bandwidth in the frequency domain. However, the present invention may also be applied to MIMO transmission in which a signal is spread in the time domain through direct sequence code division multiple access (DS-CDMA) or the like using a DFT matrix (transpose matrix of DFT matrix, complex conjugate matrix of DFT matrix, complex conjugate transpose matrix of the DFT matrix or inverse matrix of DFT matrix) and the spread signals are code-multiplexed in the space domain. In this case, a signal obtained through the spreading of the DFT matrix (transpose matrix of the DFT matrix, complex conjugate matrix of the DFT matrix, complex conjugate transpose matrix of the DFT matrix or inverse matrix of the DFT matrix) in the time domain and code multiplexing in the space domain may be divided with a partially orthogonal bandwidth as in the case of the above embodiments and the respective divided signals may be mapped to discontinuous time resources or space resources. Thus, it is possible to obtain effects similar to those in the above embodiments.

Furthermore, above Embodiments 1 to 8 may also be used in combination with each other.

Furthermore, a case has been described in the above embodiments where the radio communication apparatus according to the present invention is provided for terminal 100 (FIG. 1), terminal 200 (FIG. 9), terminal 300 (FIG. 15), terminal 500 (FIG. 19), terminal 600 (FIG. 20) or terminal 700 (FIG. 23), but the radio communication apparatus according to the present invention may also be provided for the base station.

Furthermore, the terminal may also be referred to as UE (User Equipment: UE) and the base station may also be referred to as Node B or BS (Base Station).

Furthermore, the present invention has been described as an antenna in the above embodiments, but the present invention is likewise applicable to an antenna port.

The antenna port refers to a logical antenna made up of one or a plurality of physical antennas. That is, the antenna port does not always refer to one physical antenna but may refer to an array antenna made up of a plurality of antennas or the like.

For example, 3GPP LTE does not define of how many physical antennas an antenna port is made up, but defines the antenna port as a minimum unit that the base station can transmit different reference signals.

Furthermore, the antenna port may also be defined as a minimum unit for multiplying a precoding vector weight.

Moreover, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-242716, filed on Sep. 22, 2008, and Japanese Patent Application No. 2009-201740, filed on Sep. 1, 2009, including the specifications, drawings and abstracts are incorporated herein by reference in their entirety.

INDUSTRIAL APPLICABILITY

The present invention is applicable to a mobile communication system or the like.

The invention claimed is:

1. A communication system comprising:
   a communication apparatus including
      a Discrete Fourier Transform (DFT) transformer which transforms a time-domain signal into a frequency-domain signal with a DFT size that is a product of powers of a plurality of values, the plurality of values being integer numbers that are greater than 1 and are different from each other, exponents for the plurality of values being a set of non-negative integers;
      a mapper which maps the frequency-domain signal on a plurality of frequency bands, each frequency band being located at a position separate from position(s) of other(s) of the plurality of frequency bands, wherein a size of each of the plurality of frequency bands is a product of two or more powers of prime numbers or a multiple of the product of the two or more powers of prime numbers, each of the prime numbers being an integer number that is greater than 1 and the prime numbers being different from each other, exponents for the prime numbers being a set of non-negative integers; and
      a signal generator which generates a single carrier-frequency division multiple access (SC-FDMA) time-domain signal from the mapped signal; and
   a base station including
      a receiver which receives the SC-FDMA time-domain signal;
      a combiner which generates the frequency-domain signal from the SC-FDMA time-domain signal; and
      a transformer which transforms the frequency-domain signal into the time-domain signal with an inverse Discrete Fourier Transform (IDFT) having the DFT size.

2. The communication system according to claim 1, wherein a number of the plurality of frequency bands is two, and a size of one of the two frequency bands is a multiple of a product of two or more powers of prime numbers.

3. The communication system according to claim 1, wherein the prime numbers are selected in order from a smaller prime number.

4. The communication system according to claim 1, wherein a size of all of the plurality of frequency bands is a multiple of a product of two or more powers of prime numbers.

5. The communication system according to claim 1, wherein a first exponent for a first prime number is equal to or greater than a second exponent for a second prime number that is greater than the first prime number.

6. The communication system according to claim 1, wherein a size of each of the plurality of frequency bands is one minimum division unit or multiple minimum division units, wherein the minimum division unit is a minimum number of subcarriers that form each of the plurality of frequency bands and is a product of two or more powers of prime numbers.

7. The communication system according to claim 6, wherein a size of all of the plurality of frequency bands is a multiple of the minimum division unit.

8. The communication system according to claim 7, wherein the base station further comprises:
   a transmitter which transmits allocation information indicating a frequency position of each of the plurality of frequency bands, the frequency position being indicated in terms of the minimum division unit.

9. The communication system according to claim 1, wherein the base station further comprises:
   a transmitter which transmits allocation information including the size of at least one of the plurality of frequency bands.

* * * * *